US007619791B2

(12) United States Patent
Itoyama et al.

(10) Patent No.: US 7,619,791 B2
(45) Date of Patent: Nov. 17, 2009

(54) IMAGE FORMING METHOD AND IMAGE FORMING DEVICE

(75) Inventors: Motoyuki Itoyama, Kyoto (JP); Syouichi Fujita, Kashiba (JP); Hirofumi Sakita, Tenri (JP); Shuichi Morikuni, Yamatokoriyama (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 709 days.

(21) Appl. No.: 10/547,338

(22) PCT Filed: Mar. 2, 2004

(86) PCT No.: PCT/JP2004/002590

§ 371 (c)(1), (2), (4) Date: Sep. 1, 2005

(87) PCT Pub. No.: WO2004/079458

PCT Pub. Date: Sep. 16, 2004

(65) Prior Publication Data

US 2006/0152775 A1 Jul. 13, 2006

(30) Foreign Application Priority Data

Mar. 4, 2003 (JP) ............................ 2003-057548
Aug. 25, 2003 (JP) ............................ 2003-300511

(51) Int. Cl.
*H04N 1/46* (2006.01)
*G03G 15/10* (2006.01)
*G03G 15/22* (2006.01)

(52) U.S. Cl. .......................... 358/504; 347/19; 347/79; 347/81; 347/188; 347/189; 347/191; 347/192; 347/236; 347/246; 347/253; 358/1.1; 358/1.9; 358/1.13; 358/501; 399/29; 399/50; 399/51; 399/53; 399/55; 399/56; 399/58; 399/59; 399/60; 399/61; 399/64; 399/69; 399/94; 399/97

(58) Field of Classification Search .................. 347/19, 347/79, 81, 188, 189, 191, 192, 194, 236, 347/246, 252, 253; 358/1.9, 501, 504; 399/50, 399/51, 53, 55, 56, 58, 59, 60, 61, 64, 69, 399/94, 97
See application file for complete search history.

(56) References Cited

U.S. PATENT DOCUMENTS 4,141,646 A * 2/1979 Soma et al. .................. 399/38

(Continued)

FOREIGN PATENT DOCUMENTS

JP 4-97183 A 3/1992

(Continued)

*Primary Examiner*—King Y Poon
*Assistant Examiner*—Richard Z Zhu
(74) *Attorney, Agent, or Firm*—Birch, Stewart, Kolasch & Birch, LLP

(57) ABSTRACT

A reference developing image is formed on a photoreceptor drum under an image forming condition measured in advance, and the density of this reference developing image is detected. A development bias voltage is corrected based on the detection result, and when a correction value of the development bias voltage exceeds a predetermined range, a reference output voltage of an ATC sensor for detecting the density of toner in a developing device is corrected based on the detected value of humidity around the developing device, the frequency of use of the apparatus, and the agitation stress of developer.

29 Claims, 34 Drawing Sheets

U.S. PATENT DOCUMENTS 5,126,789 A * 6/1992 Fukuchi et al. ............... 399/18
5,164,771 A * 11/1992 Suzuki et al. ................. 399/46
5,216,470 A * 6/1993 Asanuma et al. .............. 399/63
5,539,500 A * 7/1996 Hamamichi et al. ........... 399/97
5,619,308 A * 4/1997 Kinoshita et al. ............. 399/48
5,644,351 A * 7/1997 Matsumoto et al. ......... 347/194
5,826,136 A * 10/1998 Saiko et al. ................... 399/49
5,966,557 A * 10/1999 Wada .......................... 399/43
6,047,147 A * 4/2000 Kato et al. .................... 399/55
6,058,275 A * 5/2000 Kodama ...................... 399/46
6,064,837 A * 5/2000 Hashimoto et al. ............ 399/50
6,249,299 B1 * 6/2001 Tainer ........................ 347/191
6,944,410 B2 * 9/2005 Naito et al. ................... 399/27

FOREIGN PATENT DOCUMENTS

JP 4-329562 A 11/1992
JP 5-142932 A 6/1993
JP 9-258546 A 10/1997
JP 10-213928 A 8/1998
JP 11-249408 A 9/1999
JP 2001-92237 A 4/2001
JP 2001-117279 A 4/2001
JP 2001-305808 A 11/2001

* cited by examiner

IMAGE FORMING METHOD AND IMAGE FORMING DEVICE

This application is the national phase under 35 U.S.C. § 371 of PCT International Application No. PCT/JP2004/002590 which has an International filing date of Mar. 2, 2004 and designated the United States of America.

TECHNICAL FIELD

The present invention relates to an image forming method and an image forming apparatus such as an electrophotographic type copying machine, a laser printer or a facsimile machine for use in implementing the image forming method, and more particularly relates to an image forming method and an image forming apparatus including toner density detecting means for measuring the permeability of developer in a developing device for developing an electrostatic latent image by a two-component developer composed of toner and carrier, and controlling the amount of toner supplied to the developing device, based on the difference between an output voltage value corresponding to the toner density detected by the toner density detecting means and a reference output voltage value, so that the output voltage value becomes equal to the reference output voltage value.

BACKGROUND ART

A conventional image forming apparatus has a photoreceptor drum for carrying an electrostatic latent image in the main body of the apparatus, and forms an electrostatic latent image by uniformly charging the surface of the photoreceptor drum with a charging device and then exposing the surface in accordance with image information. The electrostatic latent image formed on the surface of the photoreceptor drum is developed into a toner image (developing image) by the developing device, and the toner image is transferred to a transfer material transported according to a timing. Next, the transfer material is separated from the photoreceptor drum by a separating device, and the toner image on the transfer material is fixed by a fixing unit.

In the developing device for use in such a conventional image forming apparatus, a two-component developer composed of toner and carrier is widely used as the developer, and generally the toner is made of colored thermoplastic particles and the carrier is made of ferromagnetic particles such as iron powder.

In the two-component developer composed of toner and carrier, the weight % of toner is several %, and the toner in the developer is consumed every time an electrostatic latent image on the photoreceptor drum is developed. It is therefore necessary to hold the weight percentage of toner (namely, the toner density) in the developer within a predetermined range by supplying toner by an amount corresponding to the consumed amount.

Hence, the image forming apparatus is constructed to detect the toner density and control the toner density to an appropriate value.

FIG. 1 is a block diagram showing the structure of an image forming apparatus. The toner density in the developer stored in a developing device 4 is detected by a magnetic type (permeability measurement type) toner density sensor (ATC sensor) 10, and a CPU (Central Processing Unit) 13 controls the supply of toner from a toner cartridge 8 by driving a toner cartridge drive motor 21 that is toner supplying means, according to the information about the toner density detected by the ATC sensor 10.

FIG. 2 is a graph showing the relationship between the toner density (wt %) and the output voltage value (V) of the ATC sensor 10. When the CPU 13 detects a decrease in the toner density in the developer in the developing unit 4 from the output voltage value of the ATC sensor 10, the CPU 13 drives the toner cartridge drive motor 21 and supplies toner to the developing device 4 through the toner cartridge 8. As a result of this supply, when the toner density increases and the output voltage value of the ATC sensor 10 becomes lower than a reference value (reference output voltage value) V0 shown in FIG. 2, for example, 2.5 V, the CPU 13 stops the toner cartridge drive motor 21 to stop the supply of toner from the toner cartridge 8, and holds the toner density in the developer in the developing device 4 at 4.0 wt % (reference value V0), for example.

However, since the two-component developer has an environmental dependency, in a high humidity state, the toner density in the developer increases and the charge amount decreases, and consequently toner scattering, adhesion of toner in a non-image area, a broken image, etc. occur, and the image quality is lowered. On the other hand, in a low humidity state, the toner density in the developer decreases and the charge amount increases, and consequently the image density decreases and the image quality is lowered due to occurrence of blurred characters, for example.

Moreover with an increase in the copy volume and an increase in the developer agitation time, the developer deteriorates, the toner density increases compared to the initial density (at the time the apparatus was installed and the developer was replaced) due to this deterioration, and the charge amount decreases. Consequently, toner scattering, adhesion of toner to a non-image area, a broken image, etc., occur, and there arises a problem that the image quality is lowered.

In order to solve the above-mentioned problems, a technique is disclosed (in Japanese Patent Application Laid-Open No. 2001-922237) to always hold the toner density in the developer at a uniform value by providing a humidity sensor, correcting a change in the toner density due to a humidity change by changing the reference output voltage value of the ATC sensor 10 according to the humidity change, counting the developer agitation time, and adding a change in the output voltage value of the ATC sensor 10 to a correction value corresponding to the humidity change in accordance with a deteriorated state of the developer caused by the agitation of the developer.

In recent years, with the development of techniques for achieving high image quality, there is a tendency towards a decrease in the particle diameter of toner, and a toner having an average particle diameter of 8 μm or less and a shaper particle diameter distribution has been developed. Accordingly, there is a tendency towards a decrease in the particle diameter of carrier. Further, in order to reduce the toner consumption per copy, it has been proposed to increase the density (content) of pigment in the toner, which was between 5 and 6% conventionally, to 8 to 20% or so.

Thus, with a decrease in the particle diameter of toner and carrier, the specific area of the developer per unit weight becomes larger. Further, with an increase in the pigment density, a change in the behavior of the developer against a change in humidity environment becomes larger accordingly.

In Japanese Patent Application Laid-Open No. 2001-92237, as shown in FIG. 2, when the humidity changes to the higher humidity side, a correction is made to increase the reference value V0 for controlling the toner density to Vb, whereas when the humidity changes to the lower humidity side, a correction is made to decrease the reference value V0 to Vc.

In the image forming apparatus according to Japanese Patent Application Laid-Open No. 2001-92237, when the humidity changes, a toner patch image is formed on a photoreceptor drum under a preset image forming condition as an actual condition for changing the reference output voltage value of the ATC sensor 10, and the CPU 13 corrects a development bias voltage value to hold the image density at a uniform value, based on a density detection result of a photo sensor 12 for detecting the density of the toner patch image, stores the corrected development bias voltage value, and then changes the reference output voltage value of the ATC sensor 10 when the corrected development bias voltage value changes to a predetermined value or larger.

In this toner density correction method, when the state where the difference between a development bias voltage value determined in this image density correction and a development bias voltage value determined in the previous image density correction is not more than a predetermined value occurs repeatedly, the reference output voltage value is not changed even though there is a change in humidity environment, and an appropriate correction of the toner density is not performed.

FIG. 3 is a graph showing the relationship between the output voltage value of the ATC sensor 10 and the developer agitation time. As shown in FIG. 3, even when the toner density is uniform, the output voltage value of the ATC sensor 10 increases with an increase in the agitation time of the developer in the developing device 4. It is considered that this phenomenon occurs due to a phenomenon (spent toner) in which the toner firmly adheres around the carrier. When the toner is supplied by controlling the toner density without considering the increase amount of the output voltage value of the ATC sensor 10, the toner density rises with an increase in the developer agitation time, and the charge amount decreases. Consequently, toner scattering, adhesion of toner to a non-image area, a broken image, etc. occur, and there arises a problem that the image quality is lowered.

In the image forming apparatus according to Japanese Patent Application Laid-Open No. 2001-92237, in accordance with the agitation time of the developer, the reference output voltage value of the ATC sensor 10 is changed by adding a correction value based on a change in the output voltage value of the ATC sensor 10 corresponding to the deteriorated state of the developer of the ATC sensor 10 to a correction value corresponding to a humidity change, and thereby controlling the toner density appropriately. However, this image forming apparatus does not take into account an increase in the output voltage value of the ATC sensor 10 caused by the above-mentioned spent toner. In other words, even when the agitation time increases, if the humidity decreases, control is performed to decrease the reference output voltage value without considering the influence of spent toner, and consequently there arises a problem that the toner density increases.

Moreover, there is a difference in the agitation stress of developer per unit time depending on the frequency of use of the image forming apparatus for copying or printing by the user. The difference in the agitation stress of developer per unit time causes a difference in the charge amount of toner, and consequently causes a difference in the output voltage value of the ATC sensor 10 regardless of the same toner density. If the frequency of use is such that the agitation stress per unit time is low, the toner density in the developer increases and the charge amount of toner decreases, and consequently toner scattering, adhesion of toner to a non-image area, a broken image, etc. occur, and the image quality is lowered. On the other hand, when the frequency of use is such that the agitation stress per unit time is high, the toner density in the developer decreases and the charge amount of toner increases, and consequently the image density decreases and the image quality is lowered due to occurrence of blurred characters, for example.

DISCLOSURE OF THE INVENTION

The present invention has been made with the aim of solving the above problems, and it is an object of the present invention to provide an image forming method and an image forming apparatus capable of holding a toner density appropriately, stabilizing the developability and forming a satisfactory image by correcting a toner density reference value based on a correction value of the currently set value with respect to an initial value of the set value of an image forming condition to accurately meet an environment change of humidity.

Another object of the invention is to provide an image forming method capable of holding the toner density appropriately, stabilizing the developability and forming a satisfactory image by correcting a toner density reference value against changes in the toner density and developability caused by a difference in the frequency of use of an image forming apparatus.

Still another object of the invention is to provide an image forming method capable of preventing a decrease in the efficiency of printing operation of an image forming apparatus and an abrupt change in the printed image density by making the correction at one time when performing the correction to decrease the supply amount of toner, or making the correction gradually when performing the correction to increase the supply amount of toner.

Yet another object of the invention is to provide an image forming method capable of preventing excessive correction of the toner density reference value by determining whether or not a detection value outputted by toner density detecting means has reached the toner density reference value after correction, and correcting the toner density reference value when a determination is made that the detection value has reached the toner density reference value after correction.

A further object of the invention is to provide an image forming method capable of performing image formation with better image density by correcting the set value of an image forming condition when a determination is made that the detection value has reached the toner density reference value after correction, and thereby correcting the set value of the image forming condition again when the developability is optimized by the control of toner supply.

Further, it is an object of the invention to provide an image forming method capable of correcting the toner density more appropriately, stabilizing the developability and forming a satisfactory image by storing a developer agitation time since an initial time of the developer contained in a developing device, correcting the toner density reference value by using a correction value corresponding to the stored developer agitation time, making a correction by taking into account an increase in a voltage value due to spent toner caused by an increase in the agitation time when the detection value is the voltage value outputted by the toner density detecting means, for example, and making the correction by taking into account all of the humidity change, agitation stress of developer based on the frequency of use of the image forming apparatus, and deterioration of the developer based on the developer agitation time.

A further object of the invention is to provide an image forming method capable of obtaining a satisfactory printed image density by correcting the image forming condition by one or a plurality of corrections on a development bias voltage value applied to develop an electrostatic latent image, a charging voltage value for charging a photoreceptor, a transfer voltage value for transferring a developing image to a transfer material, and an exposure amount for exposing the photoreceptor, and capable of correcting the toner density reference value based on the result of correcting the set value of the image forming condition when correction is necessary.

Further, it is an object of the invention to provide an image forming method capable of forming a high-definition, high-quality image with less dirt on the back side in a state where there is less toner scattering in the device by making the average particle diameter of toner within a range of 4 to 7 μm.

A further object of the invention is to provide an image forming method capable of forming an image with high fixing performance at a low copying cost by making the content of pigment in the toner between 8 and 20%.

A further object of the invention is to provide an image forming apparatus capable of holding a good color balance by incorporating a developing device containing developers of a plurality of colors.

According to the present invention, there is provided an image forming method for forming an image using an image forming apparatus comprising: developing means for containing a two-component developer including toner and carrier; toner density detecting means for detecting a toner density in the developing means; humidity detecting means for detecting humidity information around the developing means; toner supply means for supplying the toner to the developing means; toner supply control means for controlling the toner supply means by comparing an output value from the toner density detecting means with a toner density reference value stored in memory means; and image density correction control means for forming a reference developing image based on a set value of a predetermined image forming condition, detecting a density of the formed reference developing image and correcting the set value, the method being characterized by comprising: a determination step for determining whether or not a set value of an image forming condition has been corrected beyond a predetermined range with respect to an initial value; a humidity detection step for detecting humidity by the humidity detecting means when a determination is made in the determination step that a correction value with respect to the initial value exceeds the predetermined range; a correction value determination step for determining a correction value of the toner density reference value, based on the humidity detected in the humidity detection step; and a step of correcting the toner density reference value using the correction value of the toner density reference value determined in the correction value determination step.

In this invention, since the toner density reference value is corrected based on a correction value of the currently set value with respect to the initial value of the set value of the image forming condition instead of a correction value of the currently set value with respect to the previous set value of the image forming condition, the developability changes gradually based on a humidity change. Therefore, even when the correction value of the currently set value with respect to the previous set value of the image forming condition is small, it is possible to correct the toner density, always and certainly hold the toner density in the developing device appropriately, stabilize the developability and form stable high-quality images.

Moreover, it is possible to avoid oversight of time at which correction of the toner density reference value against a humidity change is necessary, and it is possible to prevent the toner density reference value from being corrected more than necessary.

Furthermore, with a decrease in the particle diameter of toner and carrier and an increase in the content of pigment, it is possible to certainly deal with a large change in the developability caused by a humidity change.

According to the invention, the determination step is a first determination step for determining whether or not a correction value with respect to the initial value of the set value of the image forming condition is equal to or larger than a comparative reference value, and comprises a second determination step for determining that the correction value is negative when a determination is made in the first determination step that the correction value is not equal to or larger than the comparative reference value, and determining whether or not an absolute value of the correction value is equal to or larger than the comparative reference value, and the humidity detection step is a step of detecting humidity when a determination is made in the first determination step or the second determination step that the absolute value of the correction value is equal to or larger than the comparative reference value.

In this invention, it is possible to perform the correction based on humidity at more appropriate time.

According to the present invention, the comparative reference value differs depending on whether the correction value of the set value of the image forming condition is positive or negative.

In this invention, by determining a comparative reference value for a positive correction value and for a negative correction value based on various experiments, it is possible to execute more appropriate correction and form more stable, high-quality images.

The present invention comprises a humidity change determination step for determining whether or not the humidity detected in the humidity detection step has changed and become lower by an amount equal to or larger than a predetermined value from the humidity when the toner density reference value was corrected previously, when a determination is made in the first determination step that the correction value is equal to or larger than the comparative reference value, wherein when a determination is made in the humidity change determination step that the humidity has changed and become lower by an amount equal to or larger than the predetermined value, a correction value of the toner density reference value is determined based on the changed value to increase a supply amount of toner by the correction value determination step.

In this invention, in the case where a correction for increasing the image density of the image forming condition is performed, when the supply amount of toner is increased when the humidity changes to a lower humidity side, it is possible to effectively increase the toner density in the developing device, hold the toner density appropriately and stabilize the developability.

The present invention comprises: a humidity change determination step for determining whether or not the humidity detected in the humidity detection step has changed and become lower by an amount equal to or larger than a predetermined value from the humidity when the toner density reference value was corrected previously, when a determination is made in the first determination step that the correction value is equal to or larger than the comparative reference value; and a step of determining a correction value of the toner density reference value to increase a supply amount of toner, when a determination is made in the humidity change determination step that the humidity change is a change within the predetermined value.

In this invention, when the humidity change is not large and the frequency of use of the image forming apparatus is such that the agitation stress per unit time is high, it is possible to prevent a decrease in the toner density, hold the toner density appropriately and stabilize the developability by performing a frequency-of-use correction to increase the supply amount of toner.

According to the present invention, the above-described step is a step of determining the correction value by a correction value of the image forming condition.

In this invention, since the degree of agitation stress is recognized by the correction value of the set value of the image forming condition and the correction is performed based on this, it is possible to make the frequency-of-use correction more appropriately.

The present invention comprises a humidity change determination step for determining whether or not the humidity detected in the humidity detection step has changed and become higher by an amount equal to or larger than a predetermined value from the humidity when the toner density reference value was corrected previously, when a determination is made in the second determination step that the correction value of the image forming condition is negative and the absolute value of the correction value is equal to or larger than the comparative reference value, wherein when a determination is made in the humidity change determination step that the humidity has changed and become higher by an amount equal to or larger than the predetermined value, a correction value of the toner density reference value is determined based on the changed value to decrease a supply amount of toner.

In this invention, in the case where the correction for decreasing the image density of the image forming condition is performed, when the supply amount of toner is decreased when the humidity changes to a higher humidity side, it is possible to effectively decrease the toner density, hold the toner density appropriately and stabilize the developability.

The present invention comprises: a humidity change determination step for determining whether or not the humidity detected in the humidity detection step has changed and become higher by an amount equal to or larger than a predetermined value from the humidity when the toner density reference value was corrected previously, when a determination is made in the second determination step that the correction value of the image forming condition is negative and the absolute value of the correction value is equal to or larger than the comparative reference value; and a step of determining a correction value of the toner density reference value to decrease a supply amount of toner when a determination is made in the humidity change determination step that the humidity change is a change within the predetermined value.

In this invention, when the humidity change is not large and the frequency of use of the apparatus is such that the agitation stress of developer per unit time is low, it is possible to make the frequency-of-use correction to decrease the supply amount of toner, prevent an increase in the toner density, hold the toner density appropriately and stabilize the developability.

According to the present invention, the above-described step is a step of determining the correction value by a correction value of the image forming condition.

In this invention, since the degree of agitation stress is recognized by the correction value of the image forming condition and the correction is performed based on this, it is possible to make the frequency-of-use correction more appropriately.

According to the present invention, when making the correction to decrease the supply amount of toner, the correction is performed at one time.

The correction for decreasing the supply amount of toner is a correction in the direction of decreasing the toner density. For example, when the detection value is an output voltage value of the toner density detecting means, the toner is consumed by the printing operations and the output voltage value that is the detection value increases gradually. Therefore, in this invention, by making the correction of the toner density reference value at one time, it is possible to hold the toner density appropriately without causing a decrease in the efficiency of printing operation and an abrupt change in the printed image density.

According to the present invention, when making the correction to increase the supply amount of toner, the correction is performed gradually.

The correction for increasing the supply amount of toner is a correction in the direction of increasing the toner density. For example, when the detection value is an output voltage value of the toner density detecting means, the output voltage value that is the detection value decreases by supplying the toner while executing the printing operation. Therefore, in this invention, by making the above-mentioned correction gradually, it is possible to hold the toner density appropriately without causing a decrease in the efficiency of printing operation and an abrupt change in the printed image density.

The present invention comprises a step of determining whether or not a detection value outputted by the toner density detecting means has reached the toner density reference value after correction, when the toner density reference value is corrected, wherein when a determination is made in this step that the detection value has reached the toner density reference value after correction, the correction of the toner density reference value is executed.

In this invention, it is possible to prevent excessive correction of the toner density reference value.

The present invention comprises a step of determining whether or not a detection value outputted by the toner density detecting means has reached the toner density reference value after correction, when the toner density reference value is corrected, wherein when a determination is made in this step that the detection value has reached the toner density reference value after correction, the correction of the set value of the image forming condition is executed.

In this invention, by correcting the set value of the image forming condition again when the developability is optimized by the control of toner supply, it is possible to perform image formation with better image density.

The present invention comprises: a step of storing a developer agitation time since an initial time of the developer contained in the developing means; and a step of correcting the toner density reference value using a correction value corresponding to the developer agitation time stored in the above step.

In this invention, when the detection value is an output voltage value of the toner density detecting means, for example, it is possible to make the correction that takes into account an increase in the output voltage value of the toner density detecting means due to spent toner caused by an increase in the developer agitation time, and it is possible to prevent an increase in the toner density and a decrease in the charge amount.

Moreover, by making the correction that takes into account all the humidity change, agitation stress of developer depending on the frequency of use of the apparatus and deterioration of the developer depending on the developer agitation time, it is possible to correct the toner density more appropriately and form a satisfactory image.

Thus, it is possible to solve the problems of two-component developer made of toner and carrier with small particle diameter, which are caused by a change in the environment of using the apparatus over a long time and the difference in the frequency of use of the apparatus by the user.

According to the present invention, the correction of the image forming condition is one or a plurality of corrections on a development bias voltage value applied to develop an electrostatic latent image, a charging voltage value for charging a photoreceptor, a transfer voltage value for transferring the developing image to a transfer material, and an exposure amount for exposing the photoreceptor.

In this invention, it is possible to obtain a satisfactory printed image density, and it is possible to certainly correct the toner density reference value based on the result of correcting the set value of the image forming apparatus when correction is necessary.

The present invention comprises: a step of measuring an elapsed time since forming an image; a step of determining whether or not the measured elapsed time exceeds a predetermined time; and a step of determining a correction value of the toner density reference value based on the elapsed time, regardless of an output value from the toner density detecting means, when a determination is made in the determination step that the elapsed time exceeds the predetermined time.

In this invention, by determining a correction value based on the elapsed time regardless of the output value from the toner density detecting means when a determination is made that the elapsed time since forming an image exceeds a predetermined value, it is possible to prevent a phenomenon such as precipitation and aggregation of developer in the developing means, prevent the developer density from becoming uneven, and prevent the correction value from being determined based on a density different from the actual density detected by the toner density detecting means.

The present invention comprises: a step of measuring an elapsed time since forming an image; and a step of determining a correction value of the toner density reference value, based on a previous output value from the toner density detecting means and the elapsed time.

In this invention, by determining a correction value based on the previous output value from the toner density detecting means at the time the image forming process was started, etc. and the elapsed time since forming an image, it is possible to prevent a phenomenon such as precipitation and aggregation of developer in the developing means, prevent the developer density from becoming uneven, and prevent the correction value from being determined based on a density different from the actual density detected by the toner density detecting means.

The present invention comprises: a step of measuring a continuous supply time in which the toner is continuously supplied since the start of toner supply; a step of determining whether or not the measured continuous supply time exceeds a predetermined time; and a step of restricting forming an image when a determination is made in the determination step that the continuous supply time exceeds the predetermined time.

In this invention, by performing a process, such as temporarily interrupting forming an image when the continuous supply time exceeds the predetermined time, it is possible to prevent a delay in the supply of toner when images with high coverage rate such as black solid images were continuously formed.

The present invention comprises: a step of measuring an accumulated elapsed time required for an image forming process after supplying toner; a step of determining whether or not the measured accumulated elapsed time exceeds a predetermined time; and a step of starting to supply a predetermined amount of toner by the toner supply means, regardless of an output value from the toner density detecting means, when a determination is made in the determination step that the accumulated elapsed time exceeds the predetermined time.

In this invention, by supplying a predetermined amount of toner regardless of the output value from the toner density detecting means when the accumulated elapsed time since the supply of toner exceeds a predetermined time, it is possible to prevent a decrease in the image density that occurs when images with low coverage rate are continuously printed.

The present invention comprises: a step of returning the accumulated elapsed time to an initial value without supplying toner, when the output value of the toner density detecting means is smaller by a predetermined amount than the toner density reference value determined in the correction value determination step.

In this invention, since the clear process of returning the accumulated elapsed time to the initial value without supplying the toner is performed when the output value of the toner density detecting means is smaller by a predetermined amount than the toner density reference value determined in the correction value determination step, when the toner density output value is near the toner density reference value, the toner supply is prohibited and the accumulated elapsed time is cleared, and therefore it is possible to prevent excessive supply of toner.

The present invention comprises a step of returning the accumulated elapsed time to an initial value when the correction value of the toner density reference value determined in the correction value determination step is positive.

In this invention, when the correction value of the toner density reference value determined in the correction value determination step is positive, the clear process for returning the measured accumulated elapsed time to the initial value is performed, and therefore when the toner density reference value is corrected to the positive side, it becomes higher than the previous toner density reference value. However, since the accumulated elapsed time is cleared, it is possible to prevent the accumulated elapsed time from exceeding the predetermined time, and prevent the toner from being supplied excessively.

The present invention comprises a step of interrupting the measurement of the accumulated elapsed time until the toner density detected by the toner density detecting means reaches the toner density reference value after correction, after supplying toner by the toner supply means based on the toner density reference value after correction, when the correction value of the toner density reference value determined in the correction value determination step is positive.

In this invention, when the correction value of the toner density reference value determined in the correction value determination step is positive, the measurement of the accumulated elapsed time is temporarily interrupted, and therefore when the toner density reference value is corrected to the positive side, it becomes higher than the previous toner density reference value. However, since the measurement of the accumulated elapsed time is temporarily interrupted, it is possible to prevent the accumulated elapsed time from exceeding the predetermined time, and prevent the toner from being supplied excessively.

According to the present invention, an average particle diameter of toner is within a range of 4 to 7 μm.

In this invention, it is possible to form a high-definition, high-quality image with less dirt on the back side in a state in which there is less toner scattering in the device.

According to the present invention, the content of pigment in toner is within 8 to 20%.

In this invention, it is possible to reduce the copying cost and perform image formation with high fixing performance.

According to the present invention, there is provided an image forming apparatus including: developing means for containing a two-component developer including toner and carrier; toner density detecting means for detecting a toner density in the developing means; humidity detecting means for detecting humidity information around the developing means; toner supply means for supplying toner to the developing means; toner supply control means for controlling the toner supply means by comparing an output value from the toner density detecting means with a toner density reference value stored in memory means; and image density correction control means for forming a reference developing image based on a set value of a predetermined image forming condition, detecting a density of the formed reference developing image and correcting the set value, the apparatus being characterized by comprising: means for determining whether or not a set value of an image forming condition has been corrected beyond a predetermined range with respect to an initial value; means for detecting a humidity change by monitoring an output of the humidity detecting means when the above means determines that a correction value with respect to the initial value exceeds the predetermined range; means for determining a correction value of the toner density reference value, based on the humidity change detected by the above means; and means for correcting the toner density reference value using the correction value determined by the above means.

The image forming apparatus of the present invention has strength against an environmental change, durability, and causes less change in the image density.

The present invention comprises a developing device for containing developers of a plurality of colors.

In this invention, it is possible to hold a good color balance.

The present invention further comprises detachable toner container means for containing toner to be supplied by the toner supply means, wherein the toner container means includes a recording unit for recording information about use status.

In this invention, by including a memory unit such as an IC memory in the toner container means, such as a toner cartridge, and recording the information about the use status, such as “unused”, “in use” and “used”, in the memory unit, it is possible to detect the use status of toner and operate the image forming apparatus according to the use status. It is thus possible to prevent the image density from becoming unstable immediately after the replacement of the toner container means, for example, and it is further possible to prevent a situation where image formation is started when the used toner container means is still attached.

The image forming apparatus according to the present invention comprises means for measuring an accumulated time required for supply by the toner supply means; and means for recording the use status based on the measured accumulated time in the recording unit of the toner container means.

In this invention, by recording the used status determined based on the accumulated time required for the supply as the information about the use status of toner, it is possible to accurately estimate the used amount of toner.

The image forming apparatus according to the present invention comprises: means for reading the information about the use status recorded in the recording unit of the toner container means; and means for changing a preset operating condition when the read information about the use status is information indicating an unused status.

In this invention, when a determination is made based on the information about the use status read from the recording unit of the toner container means that the toner container means is unused and brand new, the condition of the toner supply means, for example, the drive frequency, is changed. Therefore, even when blocking that tends to happen in the brand new toner container means occurs and there is a possibility of a lack of drive torque during operation, it is possible to improve the torque and perform appropriate operation by automatically changing the operating condition such as the drive frequency.

BEST MODE FOR CARRYING OUT THE INVENTION

The following description will specifically explain this invention based on the drawings illustrating some embodiments thereof.

Embodiment 1

Figure 1:
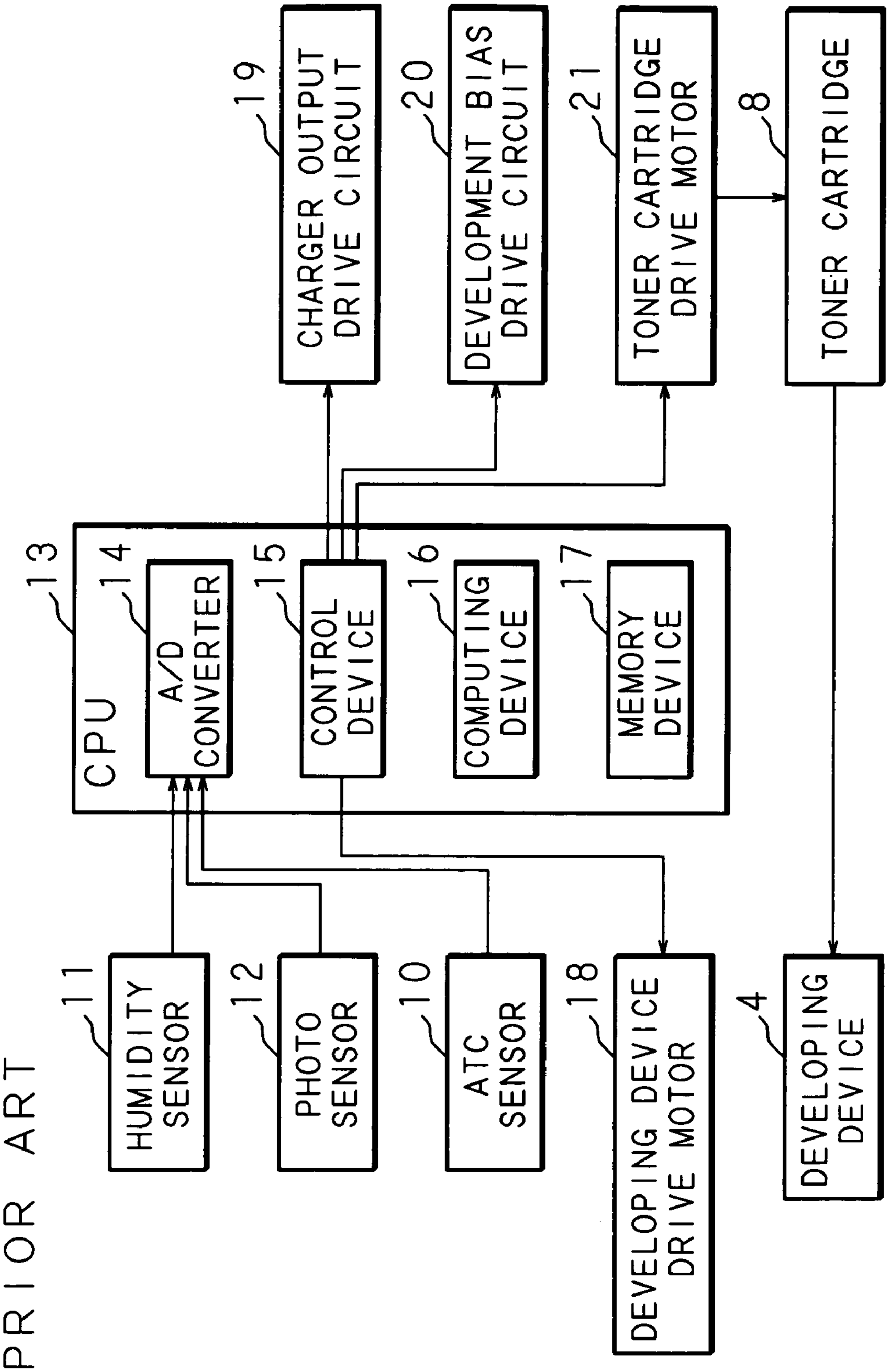
FIG. 1 PRIOR ART
FIG. 1 is a block diagram showing the structure of an image forming apparatus.
Figure 2:
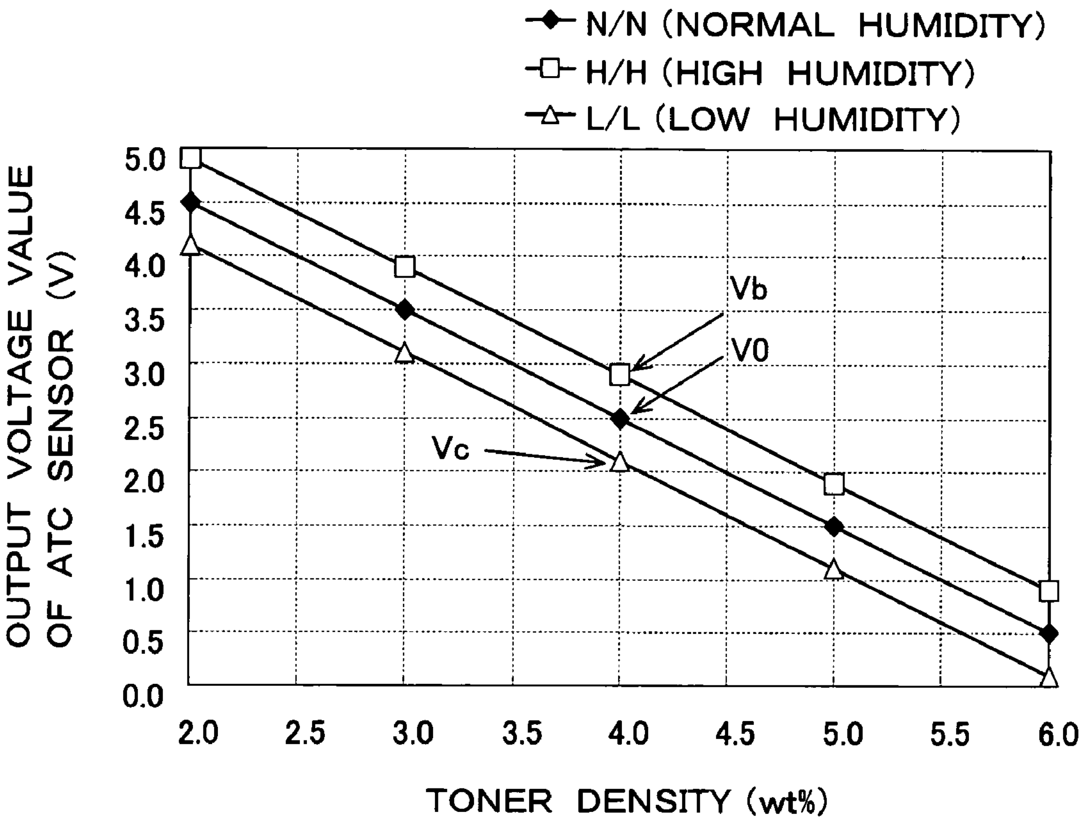
FIG. 2 PRIOR ART
FIG. 2 is a graph showing the relationship between the toner density (wt %) and the output voltage value (V) of an ATC sensor.
Figure 3:
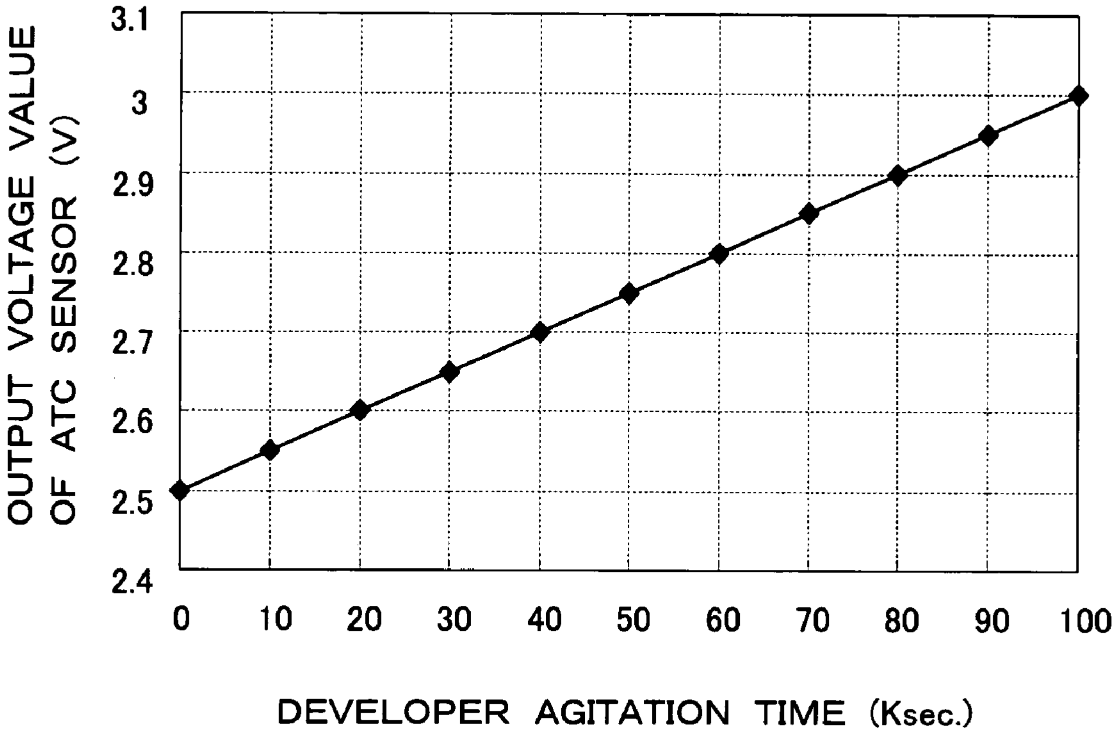
FIG. 3 PRIOR ART
FIG. 3 is a graph showing the relationship between the output voltage value of the ATC sensor and the developer agitation time.
Figure 4:
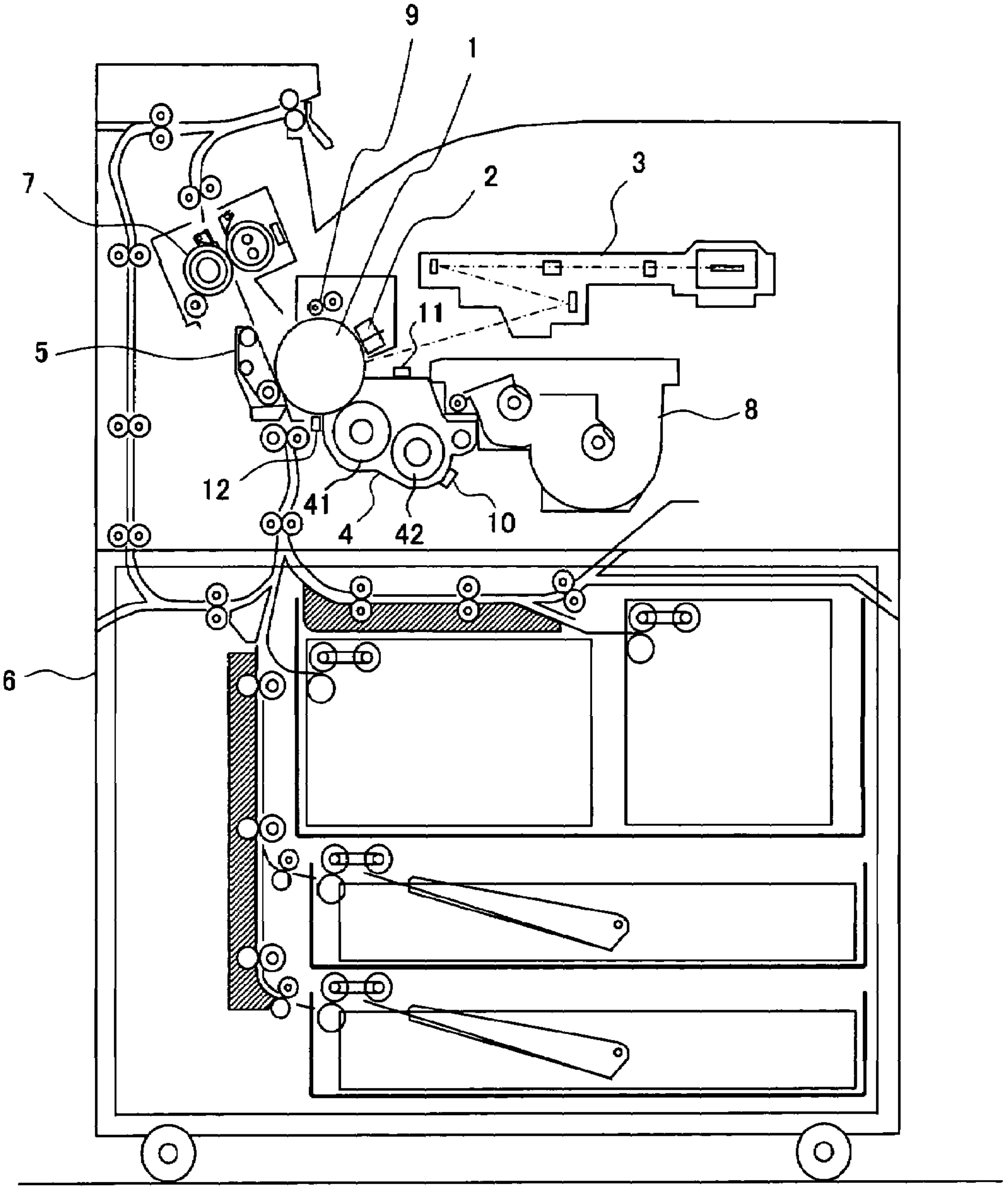
FIG. 4 is a cross sectional view showing an image forming apparatus of Embodiment 1 of the present invention.

FIG. 4 is a cross sectional view showing an image forming apparatus of Embodiment 1 of the present invention.

This image forming apparatus comprises a photoreceptor drum 1, a charging device 2, an exposure device 3, a developing device 4, a transfer device 5, a sheet feeding device 6, a fixing device 7, a toner cartridge 8, a cleaning device 9, an ATC sensor 10, a humidity sensor 11, and a photo sensor 12.

Figure 5:
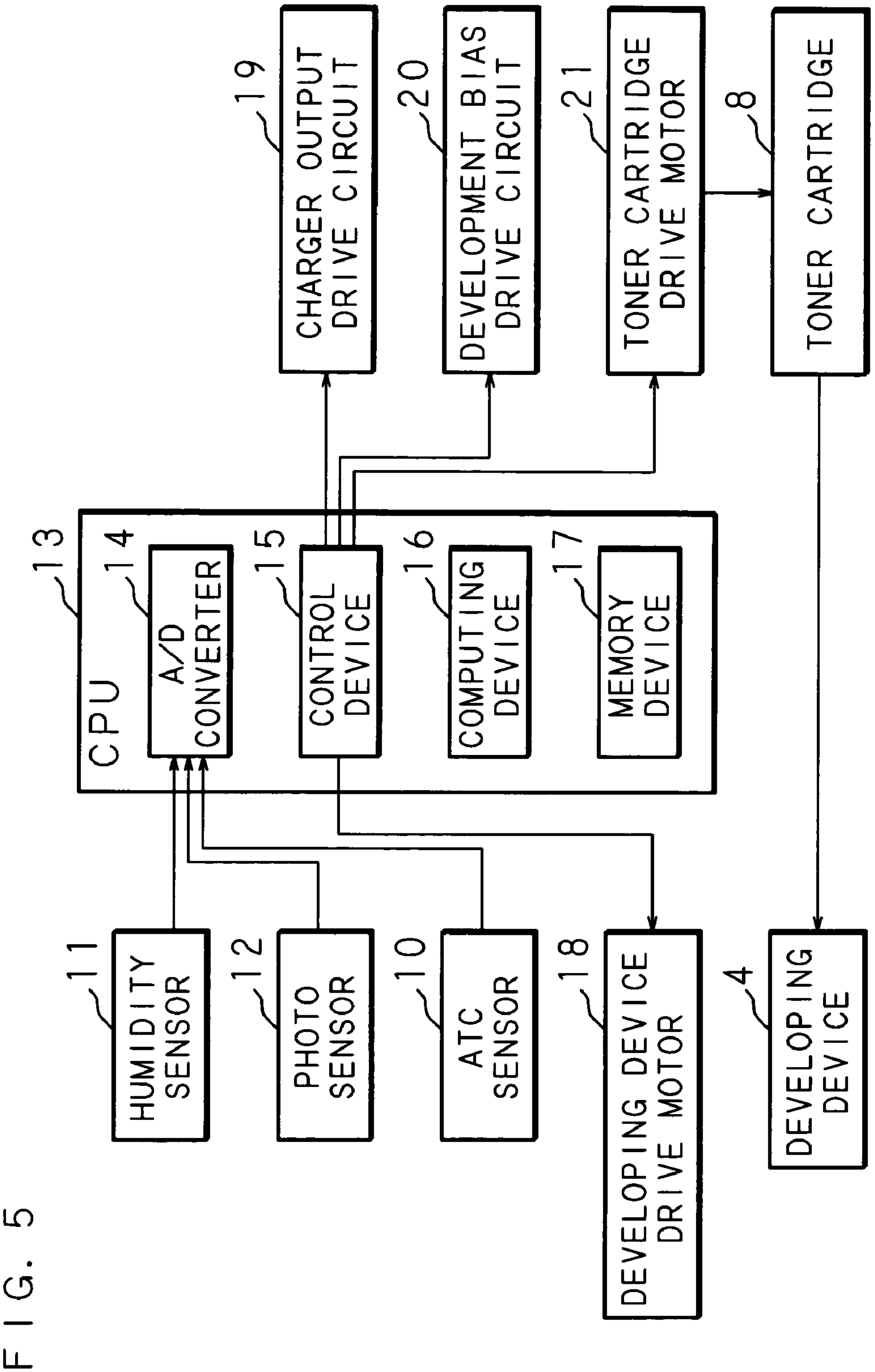
FIG. 5 is a block diagram showing the structure of the image forming apparatus of Embodiment 1 of the present invention.

FIG. 5 is a block diagram showing the structure of the image forming apparatus of Embodiment 1 of the present invention.

A CPU 13 constituting a control unit comprises an A/D converter 14 for converting analog output voltage values of the ATC sensor (toner density sensor) 10, humidity sensor 11 and photo sensor 12 into digital output voltage values; a control device 15 for controlling a charger output drive circuit 19, a development bias drive circuit 20, a developing device drive motor 18 and a toner cartridge drive motor 21; a memory device 17; and a computing device 16 for performing computation using the information from the respective sensors, data stored in the memory device 17, etc.

The ATC sensor 10 detects the toner density in a developer in the developing device 4, and outputs a voltage corresponding to the toner density as a detection signal to the CPU 13.

Figure 6:
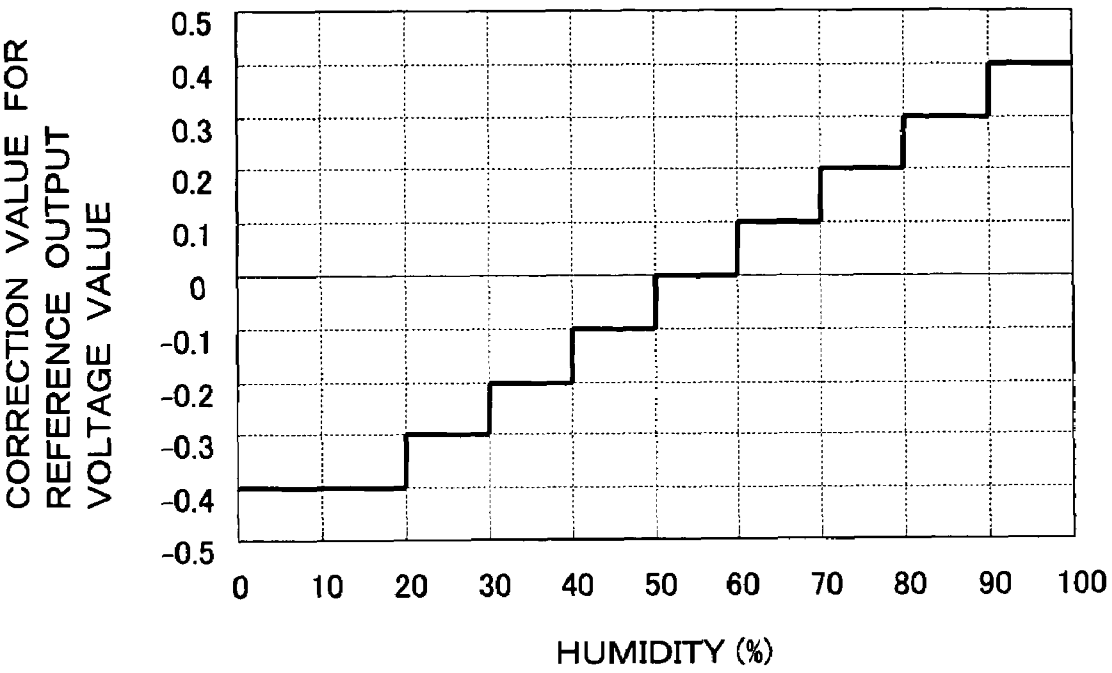
FIG. 6 is a graph showing the correction values for the reference output voltage value within the respective humidity ranges.

The humidity sensor 11 is provided in the vicinity of the developing device 4, and detects relative humidity in the image forming apparatus. Further, in the memory device 17 of the CPU 13, table data about toner density correction values for the relative humidity (correction values for the reference output voltage value of the ATC sensor 10) as shown in FIG. 6 is stored in advance, and the CPU 13 corrects the reference output voltage value based on the table data.

The photo sensor 12 detects the density of a toner patch image created during a later-described image density correction.

The CPU 13 controls the toner cartridge drive motor 21 based on the detection signal of the ATC sensor 10 during a copy or print job. Moreover, the CPU 13 controls the charger output drive circuit 19 and the development bias drive circuit 20 during the later-described image density correction.

Next, the operation of the image forming apparatus constructed as described above will be explained.

First, the surface of the photoreceptor drum 1 is charged to one polarity by corona discharge of the charging device 2, and an electrostatic latent image is formed on the surface of the photoreceptor drum 1 by the irradiation of the exposure device 3.

A developer is supplied from the developing device 4 to the surface of the photoreceptor drum 1 carrying the electrostatic latent image, and the electrostatic latent image is visualized into a developer image.

The developer image is transferred to a sheet by the transfer device 5. The sheet to which the developer image has been transferred is transported to the fixing device 7, and the developer image is fused by the application of heat and pressure. After transferring the developer image, the residual toner on the surface of the photoreceptor drum 1 is removed by the cleaning device 9, and then the surface of the photoreceptor drum 1 is charged again by the charging device 2.

Further, in the developing device 4, a non-magnetic sleeve 41 is driven and rotated facing the photoreceptor drum 1, and an agitation roller 42 agitates toner and carrier constituting the developer in the developing device 4 and charges toner. The developer is transported by the function of a magnet secured in the non-magnetic sleeve 41, and only toner in the developer moves to the surface of the photoreceptor drum 1.

Therefore, only toner in the developer device 4 is consumed by the execution of the image forming process. Thus, an output voltage value corresponding to the toner density in the developer in the developing device 4 is detected by the ATC sensor 10, the toner supply motor is rotated by comparing the detected output voltage value with a reference output voltage value pre-stored as a toner density reference value in the memory device 17, and the toner stored in the toner cartridge 8 is supplied to the developing device 4. In other words, the CPU 13 controls the supply amount of toner so that the toner density in the developing device 4 detected by the ATC sensor 10 becomes equal to the toner density reference value.

On the other hand, when the power supply is on and under a predetermined condition, the CPU 13 periodically interrupts the image forming process, and executes an image density correction (process control). In this image density correction, a toner patch image is formed on the surface of the photoreceptor drum 1, and the density of the toner patch image is detected by the photo sensor 12. As described above, an output signal of the photo sensor 12 is converted into digital data by the A/D converter 14. The CPU 13 controls the charger output drive circuit 19, development bias drive circuit 20, etc. based on the output data from the photo sensor 12, and changes the state of parameters affecting the image formation.

In other words, a plurality of electrostatic latent images of different surface potentials are formed on the surface of the photoreceptor drum 1 by changing the output voltage value of the charging device 2 and the development bias voltage value, and a plurality of toner patch images of different densities are formed by visualizing the electrostatic latent images by the developing device 4. These densities are detected by the photo sensor 12, and the development bias voltage value of a toner patch image that matches the reference value is employed as the development bias voltage value in the image forming process performed thereafter.

Note that the image forming condition in the image forming process to be changed is not limited to the development bias voltage value which is directly and closely related to the toner density, and may be the exposure amount of the exposure device 3, the charger output voltage value, the transfer output voltage value of the transfer charger, etc.

The memory device 17 in the CPU 13 stores the number of copies and the agitation time of the developer since the initial state such as the replacement of the developer and the installation of the image forming apparatus. The control device 15 causes the computing device 16 to compute correction values corresponding to the number of copies and the agitation time of the developer stored in the memory device 17, controls the reference output voltage value, and also causes the computing device 16 to compute a correction value for the reference output voltage value of the ATC sensor 10 according to a change in humidity detected by the humidity sensor 11 and control the reference output voltage value.

The toner used in this embodiment is a non-magnetic powder obtained by mixing and dispersing a colorant such as carbon into a resin such as styrene acryl as a main resin, and pulverizing and classifying the mixture. In order to improve the flowability, a super plasticizer such as hydrophobic alumina is added, and the volume average particle diameter of toner is preferably 4 to 7 μm. When the volume average particle diameter is larger than 7 μm, the toner density is always controlled to an appropriate value by a reference output voltage value correction method according to this embodiment, but such a toner is not suitable for the formation of high quality images, particularly images of 1200 DPI or higher, and may cause broken characters and a decrease in resolution due to the large particle diameter.

On the other hand, when the volume average particle diameter is smaller than 4 μm, high quality image formation is maintained, but problems such as dirt on the back side due to scattering of toner in the device may be caused by the too small particle diameter. Further, compared with the volume average particle diameter of 4 to 7 μm, the specific surface area per unit volume is larger, and accordingly the behavior of the developer changes significantly against a change in humidity environment, and it becomes difficult to manage the toner density at the end of the life of the developer.

Meanwhile, the density (content) of the colorant (pigment) such as carbon in toner used in this embodiment is preferably 8 to 20%. When the density of pigment is lower than this range, the toner consumption per copy increases and causes a rise in the unit cost of copying. In contrast, when the density of the pigment exceeds 20%, the resin amount in toner decreases, and therefore the fixing performance to a transfer material such as paper deteriorates, and thus the density higher than 20% is not preferable.

In this embodiment, reversal development for forming a toner image in an exposed portion is performed, and therefore when the photoreceptor drum 1 has negative polarity, the charged polarity of toner is negative.

Note that the charged polarity of toner is not limited to negative, and the present invention may use toner having positive charged polarity.

Moreover, as the main resin, it is possible to use polyester, epoxy, polystyrene, acryl-based resins, etc. It may be possible to color the toner by using silica, titanium oxide, pigments, dyes, etc. as additives.

Further, it may be possible to use toners manufactured by a polymerization method and a micro capsule method as well as a pulverizing method. Additionally, in order to improve the separation performance at the time of fixing, polyethylene and polypropylene wax may be added.

The following description will explain a humidity correction method for the toner density when the humidity changes in the above-described image forming apparatus.

FIG. 6 is a graph showing the correction values for the reference output voltage value within the respective humidity ranges. For example, when the humidity changes from a range of 50 to 60% to a range of 80 to 90%, the toner supply is controlled by a value obtained by adding 0.3 V to the reference output voltage value. These values vary depending on the characteristics of toner and carrier, and corresponding numerical values are determined by tests, etc.

The data corresponding to this graph is stored in the memory device 17 in the CPU 13, and it is possible to find the humidity correction value for the reference output voltage value based on this data whenever monitoring the output voltage value of the humidity sensor 11.

In this embodiment, a toner patch image is formed on the photoreceptor drum 1 under a preset image forming condition, and, based on the density detection result of the photo sensor 12 for detecting the density of the toner patch image, the control device 15 corrects the development bias voltage to hold the image density at a uniform value, and when the absolute value of the correction value of the development bias voltage when correcting the image density is larger than the initial value at the time of the installation of the image forming apparatus by a predetermined amount or more, the above-mentioned humidity correction is performed.

Figure 7:
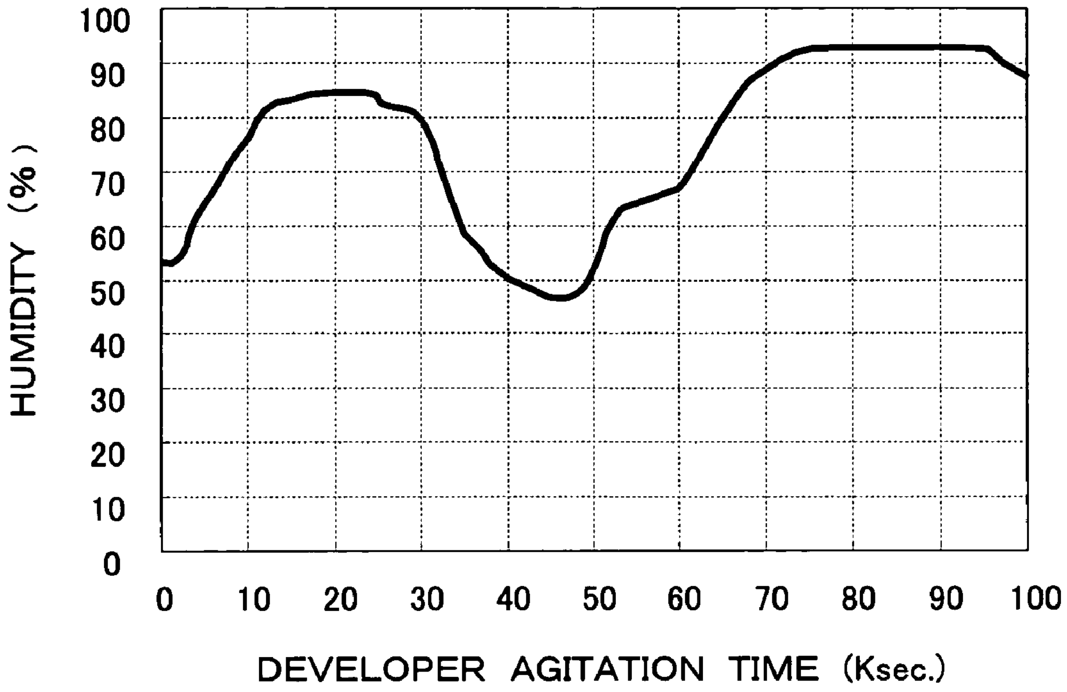
FIG. 7 is a graph showing the relationship between the state of use (developer agitation time) of the image forming apparatus and humidity.
Figure 8:
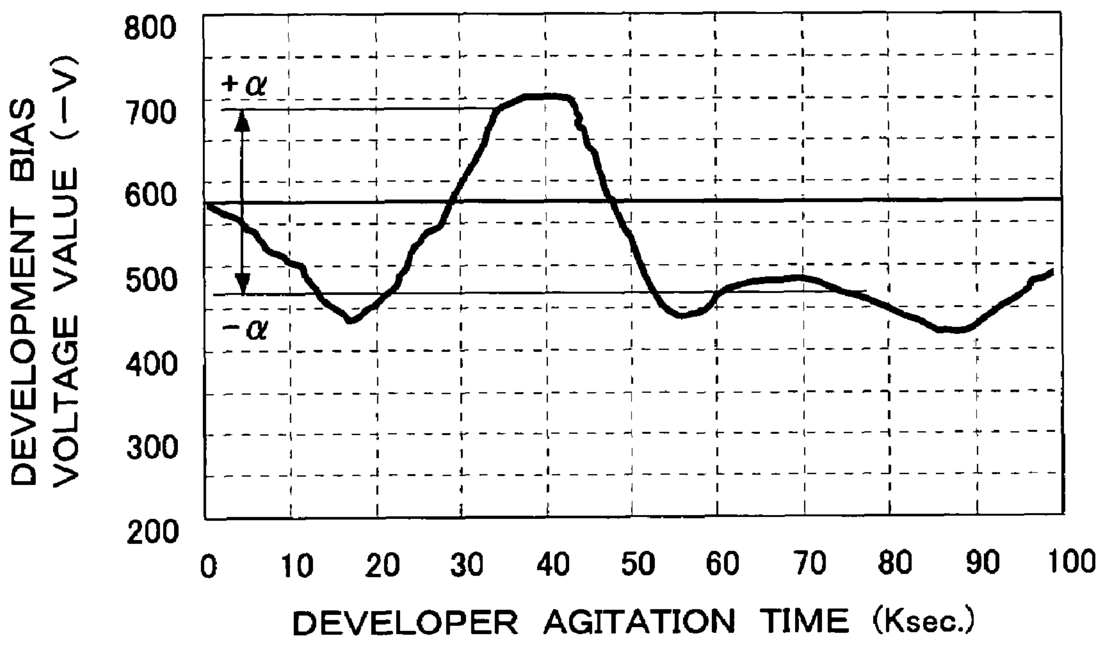
FIG. 8 is a graph showing the relationship between the state of use (developer agitation time) of the image forming apparatus and the development bias voltage value under the image density correction control.
Figure 9:
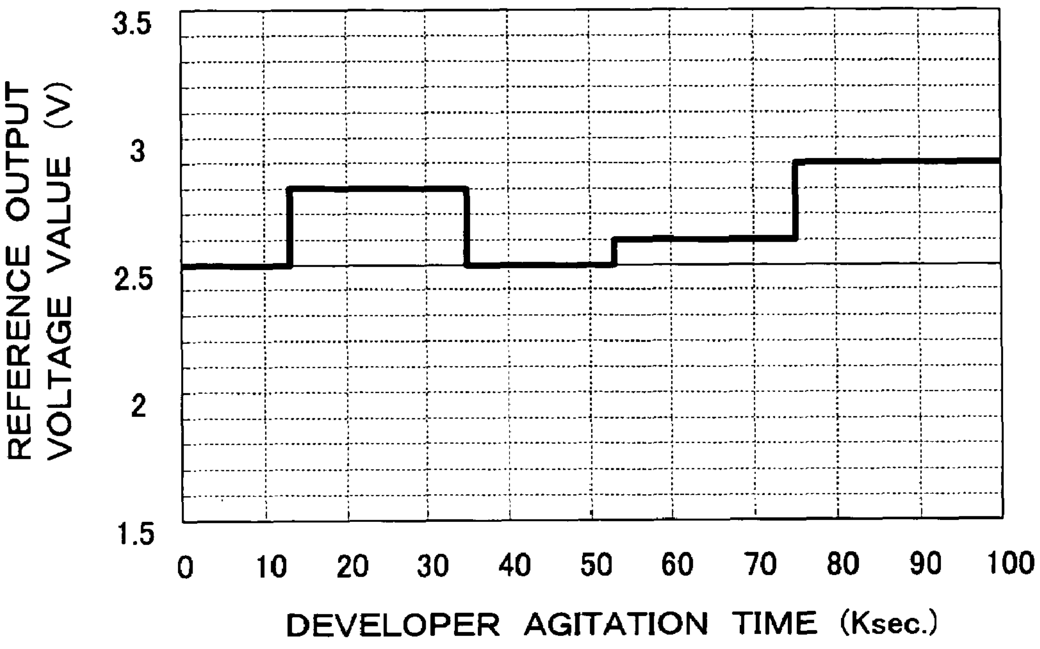
FIG. 9 is a graph showing the relationship between the state of use (developer agitation time) of the image forming apparatus and the reference output voltage value.

FIG. 7 is a graph showing the relationship between the state of use (developer agitation time) of the image forming apparatus and humidity, FIG. 8 is a graph showing the relationship between the state of use (developer agitation time) of the image forming apparatus and the development bias voltage value (Vbias) under the image density correction control, and FIG. 9 is a graph showing the relationship between the state of use (developer agitation time) of the image forming apparatus and the reference output voltage value.

In FIG. 8, the initial value of the development bias voltage value is set at 575 V, and a is set at 110 V In FIG. 9, the reference output voltage value is set at 2.5 V Needless to say, these values are set at appropriate values depending on each image forming apparatus.

In the case where a printing operation is performed, when the developer agitation time has passed 13 Ksec, the correction value in the process control operation becomes −α or less when the initial value of the development bias voltage value is 0. At this time, since the humidity is within a range of 80 to 90%, the correction value 0.3 V is added to the reference output voltage value according to FIG. 6, and the reference output voltage value is controlled to 2.8 V thereafter.

Next, when 35 Ksec has passed, the correction value of the development bias voltage value exceeds +α. At this time, since the humidity is within a range of 50 to 60% similarly to the initial time, the correction value is 0 V as shown in FIG. 6, and the reference output voltage value is reset to 2.5 V.

Next, when 53 Ksec has passed, the correction value of the development bias voltage value in the process control operation becomes equal to or less than −α. At this time, since the humidity is within a range of 60 to 70%, the correction value 0.1 V is added to the reference output voltage value according to FIG. 6, and the reference output voltage value is controlled to 2.6 V thereafter.

When 75 Ksec has passed, the correction value of the development bias voltage value in the process control operation becomes equal to or less than −α. At this time, since the humidity is within a range of 90 to 100%, the correction value 0.4 V is added to the reference output voltage value according to FIG. 6, and the reference output voltage value is controlled to 2.9 V thereafter.

Table 1 below shows whether or not the humidity correction process is executed.

TABLE 1

| Whether there is a change in relative humidity range | Δ Vbias | Whether humidity correction is executed |
|---|---|---|
| No | +α (direction of increasing developability) | No |
| | ⁻α to +α | No |
| | ⁻α (direction of decreasing developability) | No |
| Yes Changed to a humidity range on the higher humidity side | +α (direction of increasing developability) | No |
| | ⁻α to +α | No |
| | ⁻α (direction of decreasing developability) | Executed |
| Yes Changed to a humidity range on the lower humidity side | +α (direction of increasing developability) | Executed |
| | ⁻α to +α | No |
| | ⁻α (direction of decreasing developability) | No |

As shown in Table 1, when there is no change in humidity range, the humidity correction is not performed regardless of the correction value of the development bias voltage value in the process control operation. Moreover, when the correction value of the development bias voltage value is within a range of +α to −α, the humidity correction is not performed regardless of a change in humidity.

On the other hand, when the humidity changes to a humidity range on the higher humidity side, the control differs depending on the correction value of the development bias voltage value in the process control operation.

For example, when the correction value of the development bias voltage value in the process control operation is larger than +α, when the humidity changes to a humidity range on the higher humidity side, the humidity correction is not performed. A correction in the direction of increasing the development bias voltage value in the process control operation is a correction to increase the image density because the current image density is low. However, as shown in FIG. 6, the correction performed when the humidity changes to the higher humidity side is a correction to increase the reference output voltage value, and when this correction is made, the toner density is corrected in the direction of decreasing the toner density. When the toner density is decreased, the image density is corrected in a decreasing direction, and therefore the effect of the correction of the development bias voltage value by the process control operation is cancelled out. In order to solve this controversy, the humidity correction is not performed in this case.

On the other hand, when the correction value of the development bias voltage value in the process control operation is −α or less and the humidity changes to a humidity range on the higher humidity side, the humidity correction is performed. A correction in the direction of decreasing the development bias is a correction to decrease the image density because the image density is high. Moreover, a correction performed when the humidity changes to the higher humidity side is a correction to increase the reference output voltage value, and when this correction is performed, the toner density is corrected in the direction of decreasing the toner density. The decrease in the toner density acts in the direction of decreasing the image density. Since there is no controversy in the principle between these corrections, the humidity correction is performed in such a case.

When the development bias correction value of the process control operation is between +α and −α, the humidity correction is not performed even when the humidity range changes to either side as described above.

When the correction value of the development bias voltage value in the process control operation is larger than +α, when the humidity changes to a range on the lower humidity side, the humidity correction is performed. The correction in the direction of increasing the development bias voltage value is a correction to increase the image density because the image density is low. Moreover, a correction performed when the humidity changes to a range on the lower humidity side is a correction for decreasing the reference output voltage value, and when this correction is performed, the toner density is corrected in the direction of increasing the toner density. The increase in the toner density acts in the direction of increasing the image density. Since there is no controversy in the principle between these corrections, the humidity correction is performed in such a case.

On the other hand, when the correction value of the development bias voltage value in the process control operation is −α or less and the humidity changes to a range on the lower humidity side, the humidity correction is not performed. A correction in the direction of decreasing the development bias is a correction for decreasing the image density because the image density is high. However, the correction performed when the humidity changes to the lower humidity side is a correction for decreasing the reference output voltage value, and when this correction is performed, the toner density is corrected in the direction of increasing the toner density. Consequently, since the effect of the correction of the development bias voltage value in the process control operation is cancelled out, the humidity correction is not performed in this case to solve such a controversy.

Figure 10:
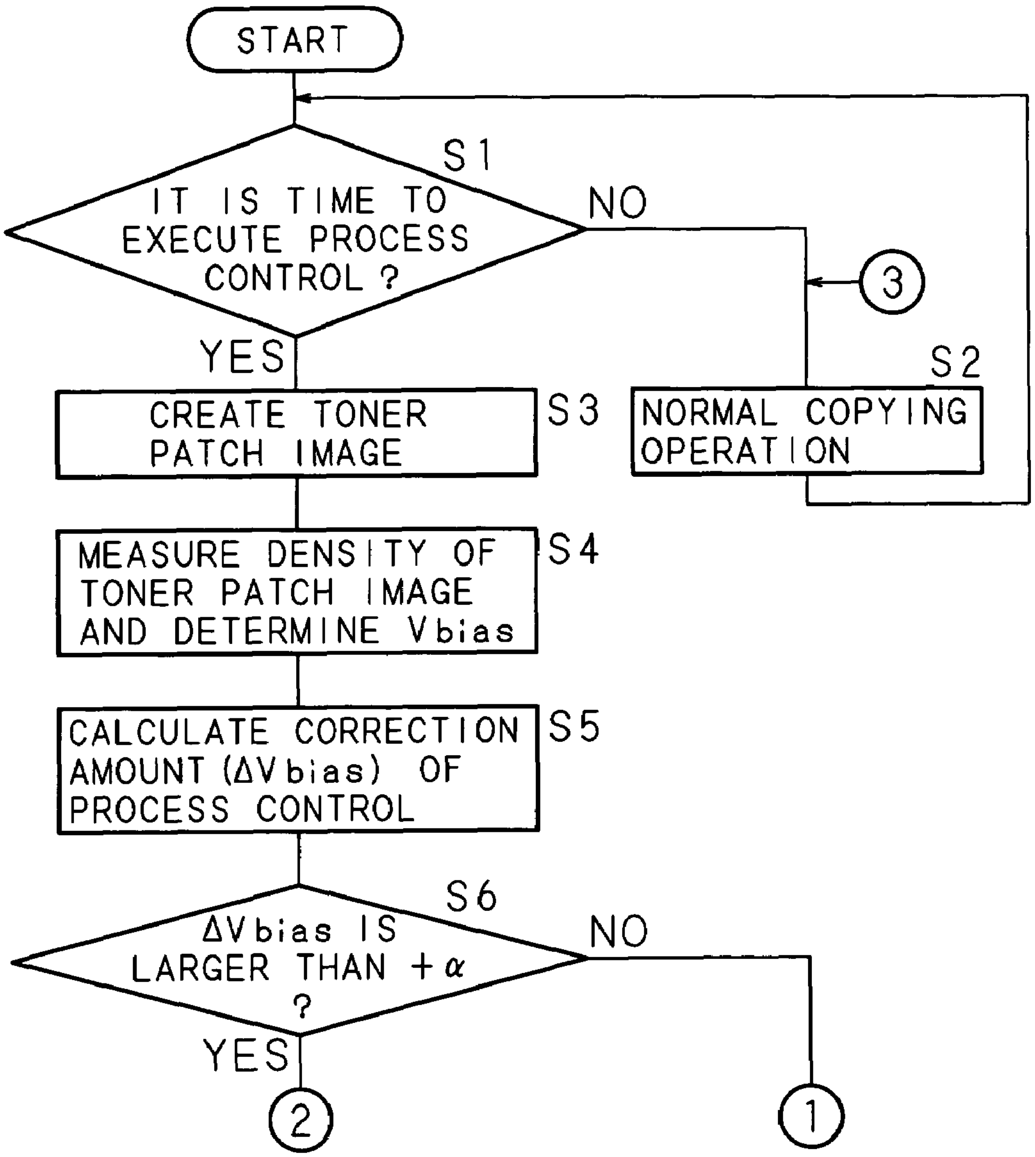
FIG. 10 is a flowchart showing the processing steps of correcting the reference output voltage value of a control device of Embodiment 1.
Figure 11:
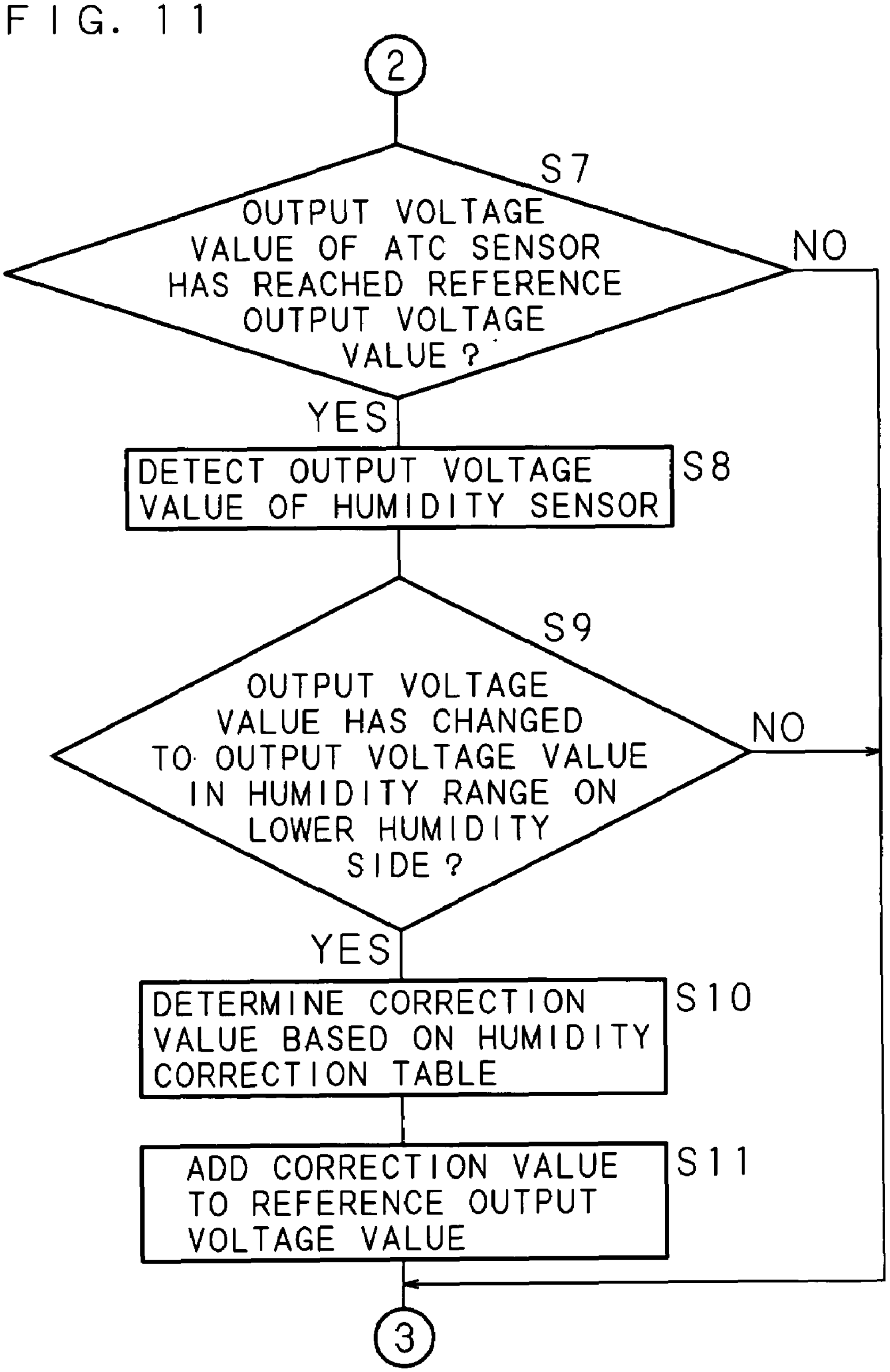
FIG. 11 is a flowchart showing the processing steps of correcting the reference output voltage value of the control device of Embodiment 1.
Figure 12:
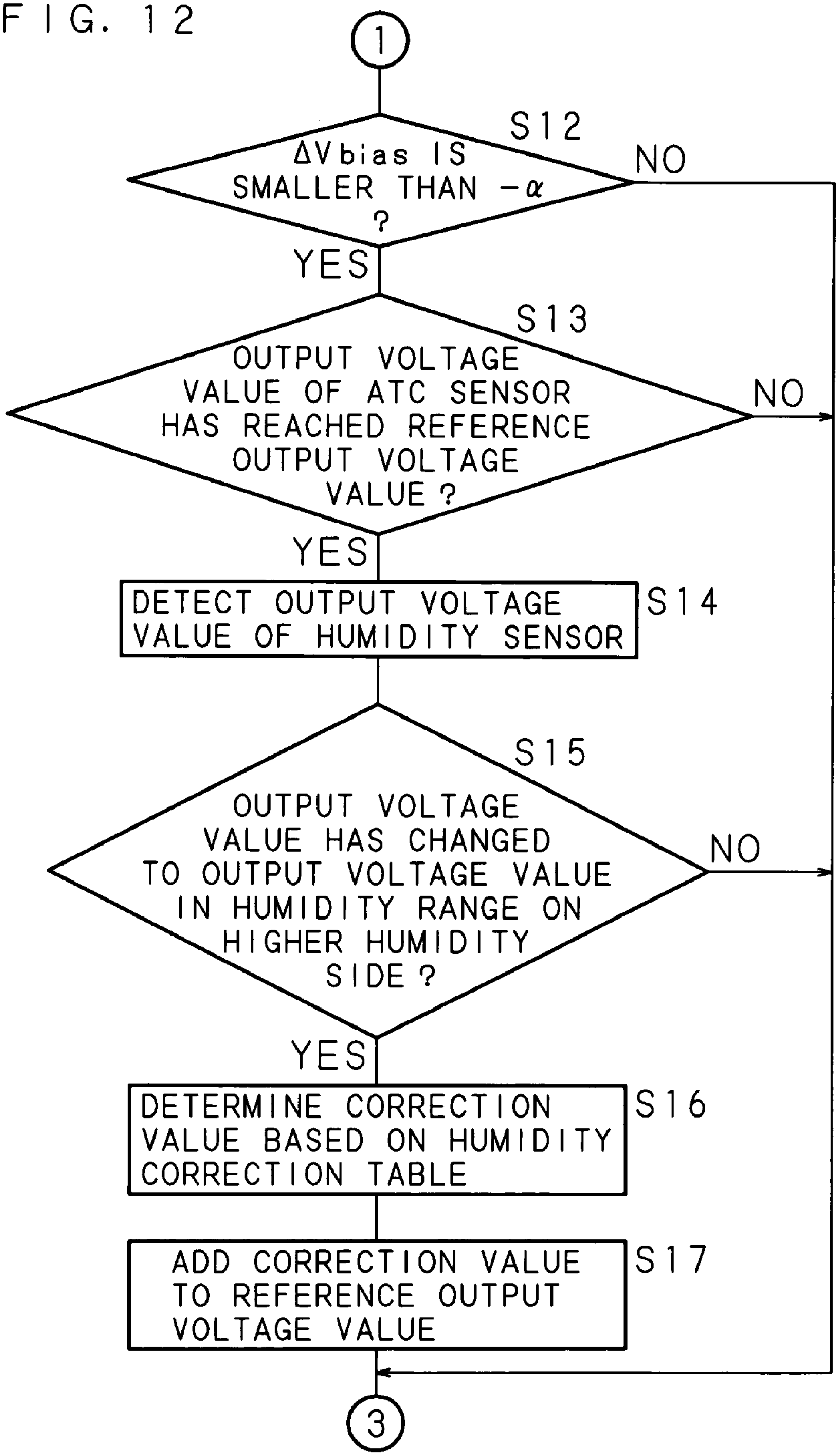
FIG. 12 is a flowchart showing the processing steps of correcting the reference output voltage value of the control device of Embodiment 1.

FIGS. 10 through 12 show a flowchart illustrating the processing steps of correcting the reference output voltage value by the control device 15 of Embodiment 1.

When the power supply is turned on to start processing, the CPU 13 of the image forming apparatus determines whether or not it is the time to execute the process control (step S1). The time to execute the process control is the time at which control is required, such as when the power supply is turned on, after elapse of a predetermined time since the power supply was turned on, or a preset timing such as after finishing a predetermined number of copies.

In step S1, when a determination is made that it is not the time to execute the process control, the normal copying operation is repeated until the execute time (step S2).

In step S1, when a determination is made that it is the time to execute the process control, the charging, exposure, and development processes are performed on the photoreceptor drum 1, and a toner patch image for density measurement is created on the photoreceptor drum 1 (step S3). A plurality of electrostatic latent images of different surface potentials are formed on the surface of the photoreceptor drum 1 by changing the charger output voltage value and the development bias voltage value, and a plurality of toner patch images of different densities are created by visualizing the electrostatic latent images by the developing device 4.

Next, the optical densities of the created toner patch images are measured by the photo sensor 12 (step S4). These densities are detected by the photo sensor 12, and a development bias voltage value (Vbias) corresponding to a toner patch image that matches the reference value is employed as a development bias voltage value for the image forming process performed thereafter.

Next, the difference between the employed development bias voltage value of the process control and the initial value of the development bias voltage value stored in the memory device 17, namely, a correction amount (ΔVbias), is calculated (step S5).

Next, a determination is made as to whether or not the ΔVbias is larger than a predetermined amount +α (step S6). A correction in the direction of increasing the development bias voltage is a correction to increase the image density because the image density is low.

In step S6, when the ΔVbias is determined to be larger than +α, the procedure proceeds to step S7, and then a determination is made as to whether or not, after the reference output voltage value was changed, the output voltage value of the ATC sensor 10 has reached the changed reference output voltage value (step S7). In step S7, when a determination is made that the output voltage value has not reached the reference output voltage value, the procedure is returned to step S2 without changing the reference output voltage value, and the normal copying operation is repeated until the next process control execute time.

In step S7, when a determination is made that the output voltage value has reached the reference output voltage value, the output voltage value of the humidity sensor 11 is detected (step S8), and a determination is made as to whether or not the detected output voltage value has changed to an output voltage value in a humidity range on the lower humidity side (step S9).

In step S9, when the detected output voltage value has changed to an output voltage value in a humidity range on the lower humidity side, a correction value is determined based on the humidity correction table stored in the memory device 17 (step S10), a new reference output voltage value is calculated by adding the correction value to the reference output voltage value (step S11), and then the processing is returned to step S2. In this case, since the correction value is a negative value, a correction is made in the direction of decreasing the reference output voltage value. In step S9, when the detected output voltage value has not changed to an output voltage value in a humidity range on the lower humidity side, the procedure is returned to step S2.

In step S6, when the ΔVbias is determined to be smaller than +α, the procedure proceeds to step S12, and then a determination is made as to whether not the ΔVbias is smaller than a predetermined value −α.

In step S12, when the ΔVbias is determined to be smaller than −α, for example, when the ΔVbias is −110 V when −α is set to −100 V, the procedure proceeds to step S13.

For example, when the ΔVbias is −90 V and between +α and −α, the procedure is returned to step S2 without correcting the reference output voltage value.

In step S13, a determination is made as to whether or not, after the reference output voltage value was changed, the output voltage value of the ATC sensor 10 has reached the changed reference output voltage value.

In step S13, when a determination is made that the output voltage value has not reached the reference output voltage value, the procedure is returned to step S2 without changing the reference output voltage value, and the normal copying operation is repeated until the next process control execute time.

In step S13, when a determination is made that the output voltage value has reached the reference output voltage value, the output voltage value of the humidity sensor 11 is detected (step S14), and a determination is made as to whether or not the detected output voltage value has changed to an output voltage value in a humidity range on the higher humidity side (step S15).

In step S15, when a determination is made that the detected output voltage value has changed to an output voltage value in a humidity range on the higher humidity side, a correction value is determined based on the humidity correction table stored in the memory device 17 (step S16), a new reference output voltage value is calculated by adding the correction value to the reference output voltage value (step S17), and then the procedure is returned to step S2. In this case, since the correction value is a positive value, a correction is made in the direction of increasing the reference output voltage value.

In step S15, when the detected output voltage value has not changed to an output voltage value in a humidity range on the higher humidity side, the procedure is returned to step S2. When executing the image density correction, the CPU 13 detects the output voltage value of the humidity sensor 11, compares the current humidity with the humidity at the previous correction of the reference output voltage value, and determines whether or not there is a humidity change more than a predetermined range. When there is no humidity change more than the predetermined range, of course the humidity correction is not executed.

When the humidity changes to the higher humidity side, the charge amount of toner usually decreases, and the developability increases. Therefore, the image density correction decreases the development bias voltage value to decrease the developability.

In this embodiment, when the development bias voltage value is decreased from the initial value by −α V or less, a correction value obtained from the humidity correction table is added to the reference output voltage value. However, when the correction value of the development bias voltage value is within −α V, or when the correction is made in the direction of increasing the development bias voltage value, the humidity correction is not executed.

When the humidity changes to the lower humidity side, the charge amount of toner usually increases, and the developability decreases. Therefore, the image density correction increases the development bias voltage value to increase the developability.

In this embodiment, when the development bias voltage value is increased from the initial value by +α V or more, a correction value obtained from the humidity correction table is added to the reference output voltage value. However, when the correction value of the development bias voltage value is within +α, or when the correction is made in the direction of decreasing the development bias voltage, the humidity correction is not executed or when the development bias voltage value is increased from the initial value by +α V or more, a humidity correction is performed.

In this embodiment, when the development bias voltage value is decreased from the initial value by −α V or less, or when the development bias voltage value is increased from the initial value by +α V or more, the humidity correction is performed. Although the value of α is determined by various experiments, the value of α may differ between the correction of increasing the reference output voltage value and the correction of decreasing it. Consequently, the timing of executing a correction of the reference output voltage value becomes more appropriate, and it is possible to perform stable, high-quality image formation.

In this embodiment, even when a change in the developability caused by a humidity change is small, the humidity correction is made on the reference output voltage value, and it is possible to always hold the toner density at an appropriate value, make the image density uniform and obtain a satisfactory image. With this structure, it is possible to avoid oversight of timing at which correction of the reference output voltage value is required, and it is possible to prevent the reference output voltage value from being corrected more than necessary.

In this embodiment, the correction of the reference output voltage value is performed once, and when the reference output voltage value is changed, the correction of the reference output voltage value is not newly executed until the output voltage value of the ATC sensor 10 reaches the changed reference output voltage value. When the correction of the reference output voltage value is newly executed before the output voltage value of the ATC sensor 10 reaches the reference output voltage value, the correction is excessive for the intended purposes of optimizing the toner density and equalizing the image density, and causes an inappropriate toner density and lowers the image quality.

When the correction of the reference output voltage value is executed as described above, the reference output voltage value is changed by the correction amount, but, of course, the actual output voltage value of the ATC sensor 10 does not immediately reach the reference output voltage value.

Figure 13:
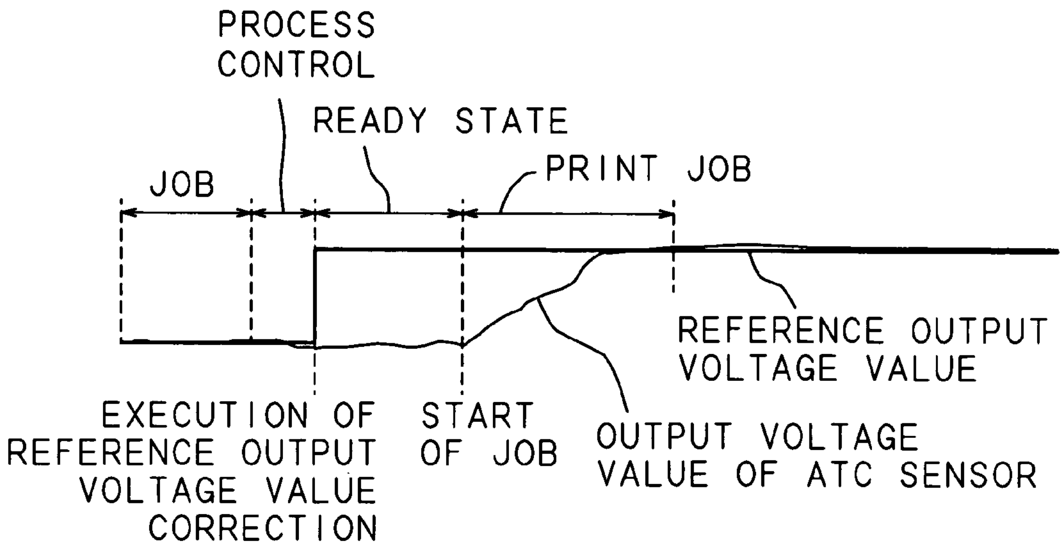
FIG. 13 is a graph showing changes in the output voltage value of the ATC sensor and the reference output voltage value when a correction for increasing the reference output voltage value was executed in Embodiment 1.

FIG. 13 is a graph showing changes in the output voltage value of the ATC sensor 10 and the reference output voltage value when a correction for increasing the reference output voltage value was executed in Embodiment 1. When executing the humidity correction to increase the reference output voltage value, the reference output voltage value is changed at one time.

The correction for increasing the reference output voltage value is a correction in the direction of decreasing the toner density. Thus, the toner in the developer is consumed by printing, and the output voltage value of the ATC sensor 10 gradually increases. The output voltage value of the ATC sensor 10 reaches the corrected reference output voltage value when printing has been performed on some sheets, and regular toner supply control is performed.

Moreover, when the output voltage value of the ATC sensor 10 reaches the changed reference output voltage value, it may be possible to perform the image density correction again. With this image density correction, when the developability becomes the changed developability, an optimum printed image density is obtained.

Figure 14:
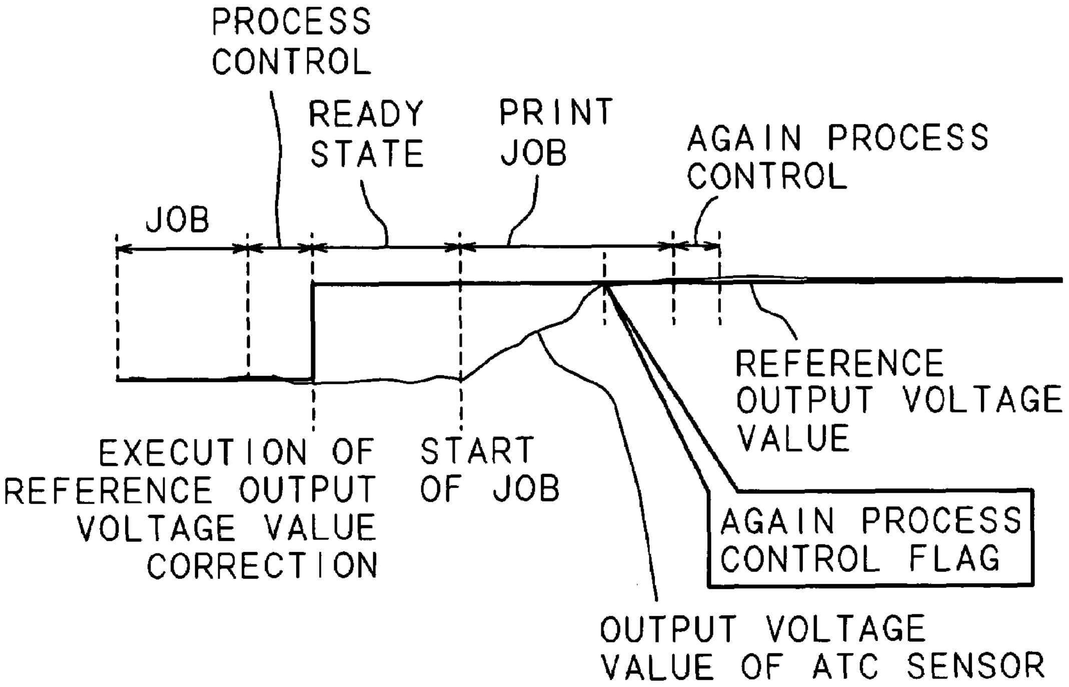
FIG. 14 is a graph showing changes in the output voltage value of the ATC sensor and the reference output voltage value when a correction for increasing the reference output voltage value was executed in Embodiment 1.

FIG. 14 is a graph showing changes in the output voltage value of the ATC sensor 10 and the reference output voltage value in this case.

The toner in the developer is consumed by printing, the output voltage value of the ATC sensor 10 gradually increases, and the output voltage value of the ATC sensor 10 reaches the corrected reference output voltage value when printing was performed on some sheets. At this time, the image density correction is performed again, and the image forming condition is changed to an optimum condition. Thereafter, regular toner density supply control is performed.

Figure 15:
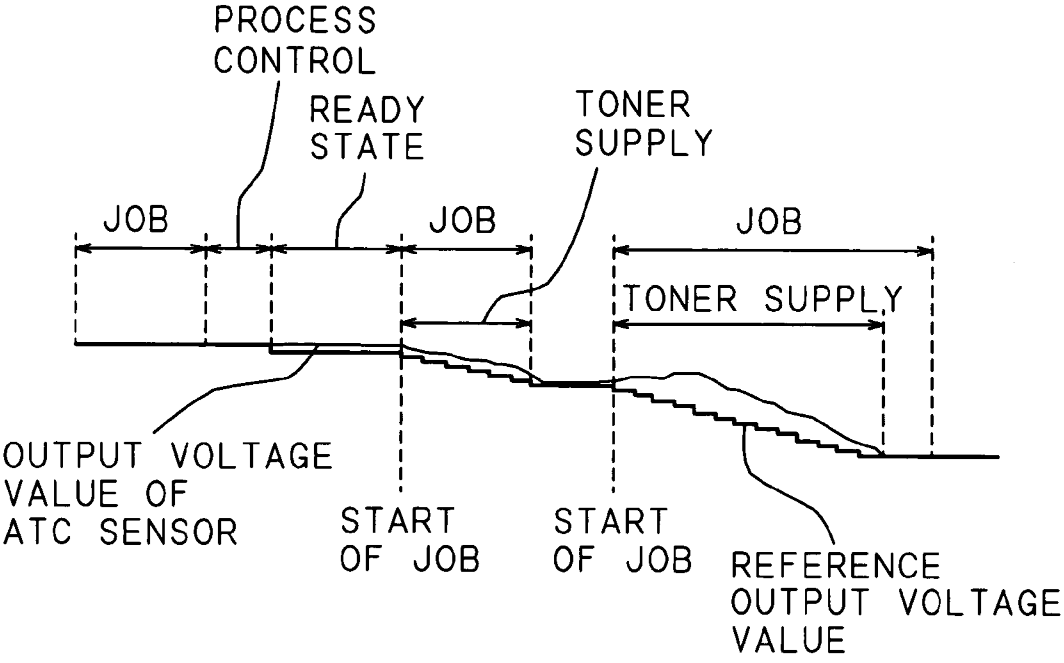
FIG. 15 is a graph showing changes in the output voltage value of the ATC sensor and the reference output voltage value when a correction for decreasing the reference output voltage value was executed in Embodiment 1.

FIG. 15 is a graph showing changes in the output voltage value of the ATC sensor 10 and the reference output voltage value when a correction for decreasing the reference output voltage value is executed in Embodiment 1.

When executing the humidity correction to decrease the reference output voltage value, the reference output voltage value is changed gradually.

The correction for decreasing the reference output voltage value is a correction in the direction of increasing the toner density. Thus, toner is further supplied into the developer, the supply of toner is performed while executing the printing operation, the output voltage value of the ATC sensor 10 reaches the reference output voltage value, and regular toner density supply control is performed.

Moreover, when the output voltage value of the ATC sensor 10 reaches the changed reference output voltage value, it may be possible to perform the image density correction again. With this image density correction, when the developability becomes the changed developability, an optimum printed image density is obtained.

Figure 16:
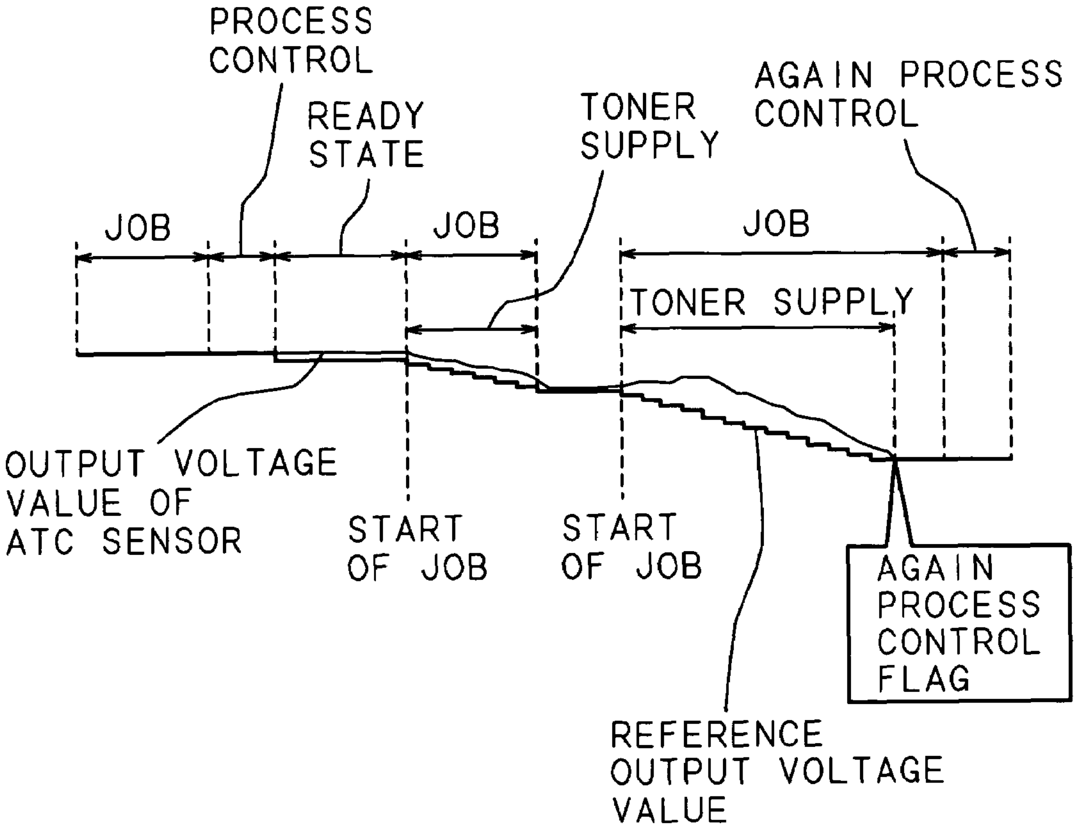
FIG. 16 is a graph showing changes in the output voltage value of the ATC sensor and the reference output voltage value when a correction for decreasing the reference output voltage value was executed in Embodiment 1.

FIG. 16 is a graph showing changes in the output voltage value of the ATC sensor 10 and the reference output voltage value in this case.

The supply of toner is performed while executing the printing operation, and when the output voltage value of the ATC sensor 10 reaches the reference output voltage value, the image density correction is executed again and the image forming condition is changed to an optimum condition. Thereafter, regular toner density supply control is performed.

Although this embodiment illustrates the case where the present invention is applied to a single-color image forming apparatus, the present invention is also applicable to the case including developing devices 4 of a plurality colors, such as a color image forming apparatus.

In an image forming apparatus comprising developing devices 4 of a plurality colors and having an image density correction function, when executing a correction of the reference output voltage value according to a humidity change, it is possible to execute the correction of the reference output voltage value only when the development bias voltage value changes by a predetermined value or more for all the colors with respect to the initial value in correcting the image density, or when the average value of the changes in the development bias voltage values for all the colors is a predetermined value or more.

With this structure, it is possible to execute the toner density correction effectively only when a correction of the reference output voltage value is actually required. Therefore, in the case where a slight correction is necessary for a part of the colors of the developers of a plurality of colors, it is possible to prevent the correction of the reference output voltage value from being performed for all the colors and prevent wasteful developer agitation and a lowering of operation rate. Moreover, in an image forming apparatus having an image density correction function, when executing a correction of the reference output voltage value according to a humidity change, it may be possible to execute the correction of the reference output voltage value for all the colors simultaneously.

In a multi-color image forming apparatus, the color balance is important, and it is possible to hold a good color balance by simultaneously executing the correction of the reference output voltage value for all the colors.

On the other hand, it may be possible to reduce the number of times of the correction of the reference output voltage value for a color less noticeable to the eye of human (for example, Y), and the maximum effect can be produced with a minimum correction of the reference output voltage value.

Embodiment 2

There is a difference in the agitation stress of developer per unit time depending on the frequency of use of the apparatus for copying or printing by the user. The difference in the agitation stress of developer per unit time causes a difference in the charge amount of toner, and consequently causes a difference in the output voltage value of the ATC sensor 10 regardless of the same toner density. In the developer of an apparatus of low frequency of use where the agitation stress per unit time is small, the toner density increases, the charge amount decreases, and the image quality is lowered due to occurrence of toner scattering, adhesion of toner to a non-image area, a broken image, etc. On the other hand, in the developer of an apparatus of high frequency of use where the agitation stress per unit time is large, the toner density decreases, the charge amount increases, the image density decreases, and the image quality is lowered due to occurrence of blurred characters, for example.

In this embodiment, it is possible to prevent failure in the control of toner density from being caused by the difference in the charge amount of the developer due to the difference in the frequency of use of the apparatus by the user.

Similarly to the humidity correction in Embodiment 1, in the correction of the reference output voltage value based on the difference in the frequency of use of the apparatus, in order to determine whether or not it is necessary to correct the reference output voltage value, a toner patch image is created on the photoreceptor drum 1 under a preset image forming condition. In order to hold a uniform image density, when the development bias voltage value is corrected based on the result of detecting the density of the toner patch image by the photo sensor 12, the control device 15 determines whether or not the corrected development bias voltage value is changed by a predetermined amount or more with respect to the initial value at the time the apparatus was installed. Then, when the development bias voltage value is changed by the predetermined amount or more with respect to the initial value at the time of installation, the reference output voltage value is corrected by a predetermined amount.

Figure 17:
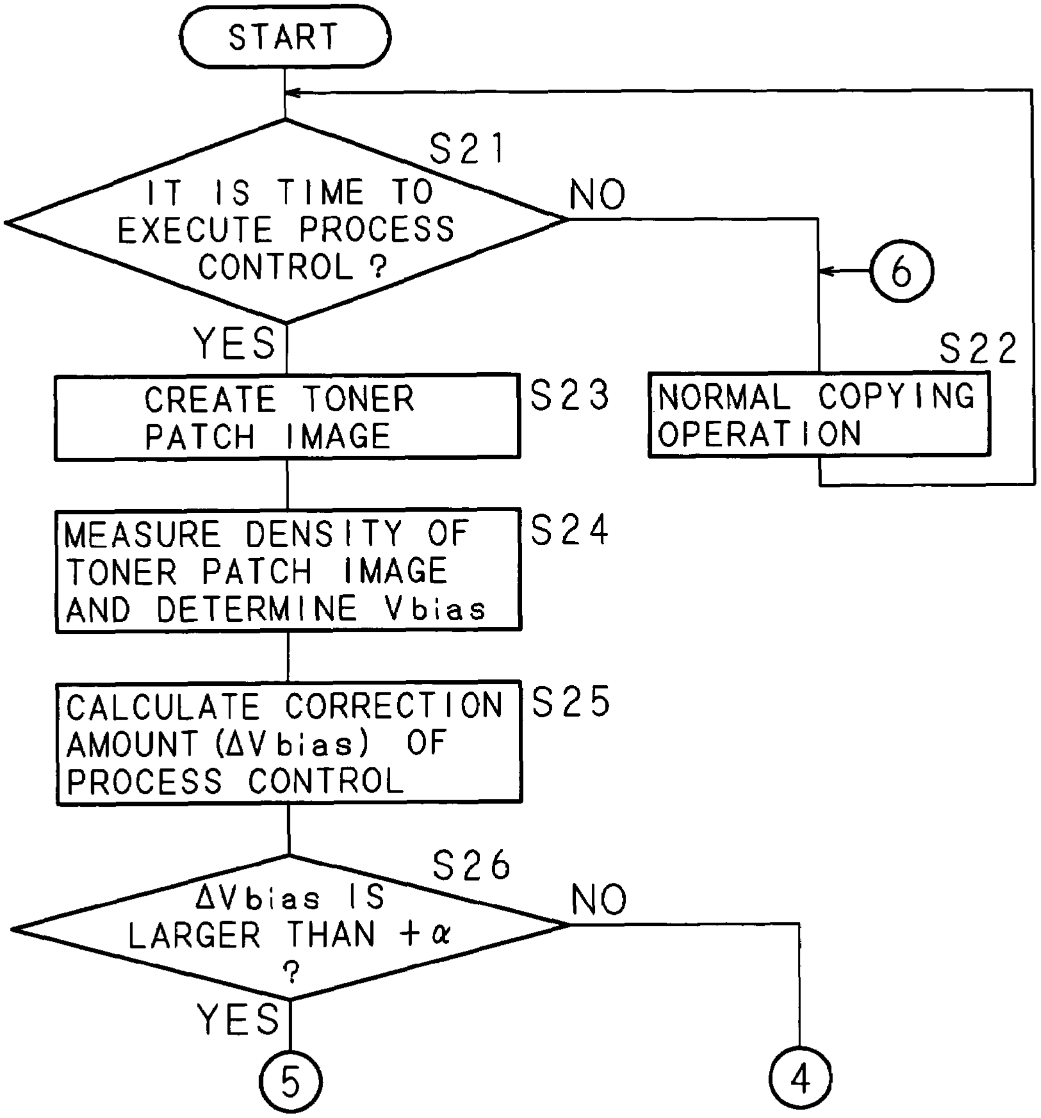
FIG. 17 is a flowchart showing the processing steps of correcting the reference output voltage value based on a humidity change and the difference in the frequency of use of the apparatus by the control device of Embodiment 2.
Figure 18:
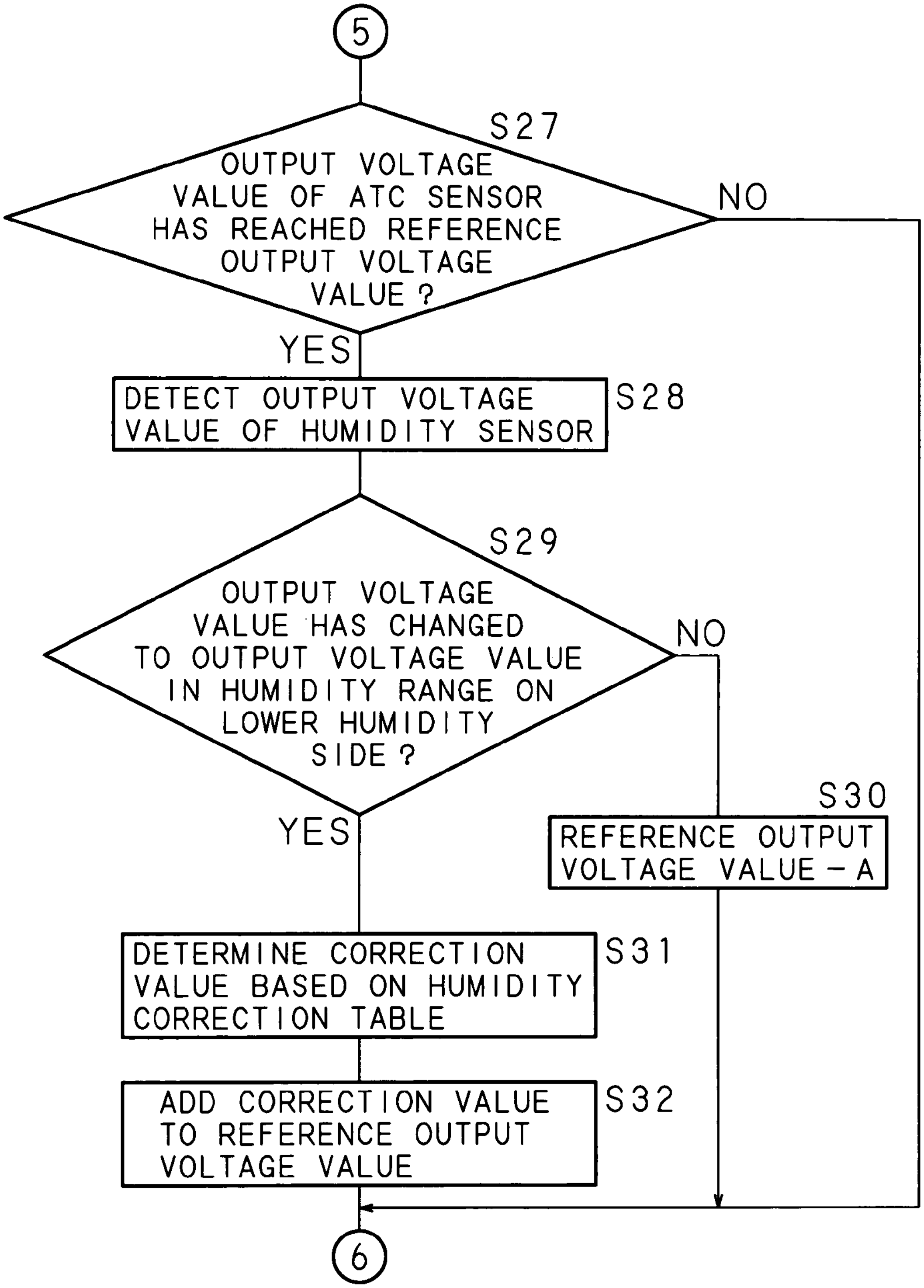
FIG. 18 is a flowchart showing the processing steps of correcting the reference output voltage value based on a humidity change and the difference in the frequency of use of the apparatus by the control device of Embodiment 2.
Figure 19:
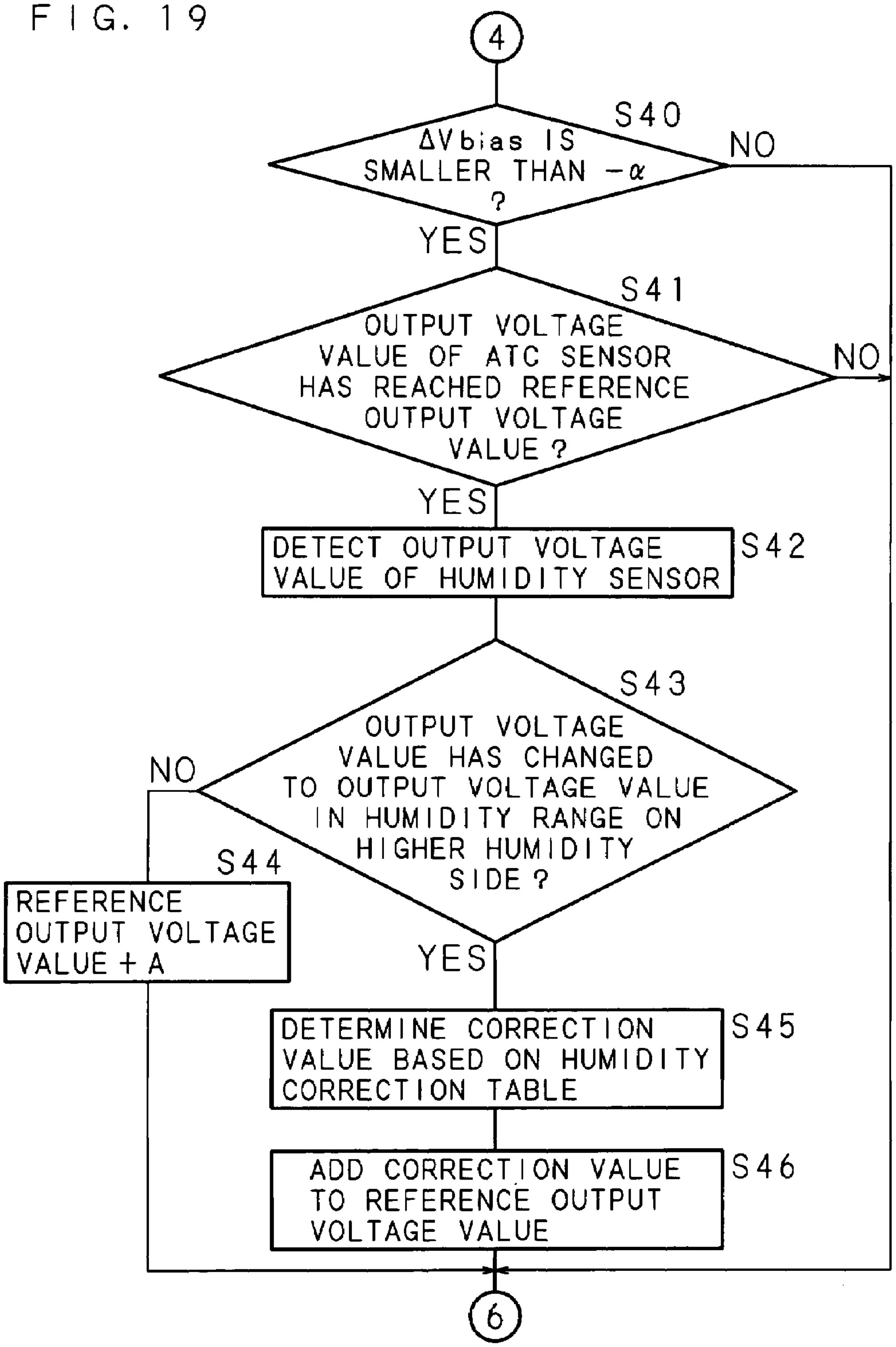
FIG. 19 is a flowchart showing the processing steps of correcting the reference output voltage value based on a humidity change and the difference in the frequency of use of the apparatus by the control device of Embodiment 2.

FIG. 17 through FIG. 19 show a flowchart illustrating the processing steps of correcting the reference output voltage value based on a humidity change and the difference in the frequency of use of the apparatus by the control device 15 of Embodiment 2.

When the power supply is turned on to start processing, the CPU 13 of the image forming apparatus determines whether or not it is the time to execute the process control (step S21). The time to execute the process control is the time at which control is necessary, such as when the power supply is turned on, after elapse of a predetermined time since the power supply was turned on, or a preset timing such as after finishing a predetermined number of copies.

In step S21, when a determination is made that it is not the time to execute the process control, the normal copying operation is repeated until the execute time (step S22).

In step S21, when a determination is made that it is the time to execute the process control, a toner patch image for density measurement is created on the photoreceptor drum 1 by performing the charging, exposure and development processes on the photoreceptor drum 1 (step S23). A plurality of electrostatic latent images of different surface potentials are formed on the surface of the photoreceptor drum 1 by changing the charger output voltage value, development bias voltage value, etc., and then a plurality of toner patch images of different densities are created by visualizing the electrostatic latent images by the developing device 4.

Next, the optical densities of the created toner patch images are measured by the photo sensor 12 (step S24). These densities are detected by the photo sensor 12, and a development bias voltage value (Vbias) corresponding to a toner patch image that matches the reference value is employed as a development bias voltage value for the image forming process performed thereafter.

Next, the difference between the employed development bias voltage value in the process control and the initial value of the development bias voltage value stored in the memory device 17, namely, a correction amount (ΔVbias), is calculated (step S25).

Next, a determination is made as to whether or not the ΔVbias is larger than a predetermined amount +α (step S26). The correction in the direction of increasing the development bias voltage is a correction to increase the image density because the image density is low.

In step S26, when the ΔVbias is determined to be larger than +α, the procedure proceeds to step S27, and then a determination is made as to whether or not, after the reference output voltage value was changed, the output voltage value of the ATC sensor 10 has reached the changed reference output voltage value (step S27).

In step S27, when a determination is made that the output voltage value has not reached the reference output voltage value, the procedure is returned to step S22 without changing the reference output voltage value, and the normal copying operation is repeated until the next process control execute time.

In step S27, when a determination is made that the output voltage value has reached the reference output voltage value, the output voltage value of the humidity sensor 11 is detected (step S28), and a determination is made as to whether or not the detected output voltage value has changed to an output voltage value in a humidity range on the lower humidity side (step S29).

In step S29, when a determination is made that the detected output voltage value has changed to an output voltage value in a humidity range on the lower humidity side, a correction value is determined based on the humidity correction table stored in the memory device 17 (step S31), a new reference output voltage value is calculated by adding the correction value to the reference output voltage value (step S32), and then the procedure is returned to step S22. In this case, since the correction value is a negative value, a correction is made in the direction of decreasing the reference output voltage value.

In step S29, when a determination is made that the detected output voltage value has not changed to an output voltage value in a humidity range on the lower humidity side, the reference output voltage value is changed (to a currently set reference output voltage value −A) (step S30), and the procedure is returned to step S22. The A is determined by performing various aging tests and according to the frequency of use of the apparatus, and is stored in the memory device 17.

In step S26, when the ΔVbias is determined to be smaller than +α, the procedure proceeds to step S40, and then a determination is made as to whether not the ΔVbias is smaller than a predetermined amount −α.

In step S40, when the ΔVbias is determined to be smaller than −α, for example, when the ΔVbias is −110 V when −α is set to −100 V, the procedure proceeds to step S41.

When the ΔVbias is −90 V and between +α and −α, the procedure is returned to step S22 without correcting the reference output voltage value.

In step S41, a determination is made as to whether or not, after the reference output voltage value was changed, the output voltage value of the ATC sensor 10 has reached the changed reference output voltage value.

In step S41, when a determination is made that the output voltage value has not reached the changed reference output voltage value, the procedure is returned to step S22 without changing the reference output voltage value, and the normal copying operation is repeated until the next process control execute time. In step S41, if a determination is made that the output voltage value has reached the changed reference output voltage value, the output of the humidity sensor 11 is detected (step S42), and a determination is made as to whether or not the detected output voltage value has changed to an output voltage value in a humidity range on the higher humidity side (step S43).

In step S43, when a determination is made that the detected output voltage value has changed to an output voltage value in a humidity range on the higher humidity side, a correction value is determined based on the humidity correction table stored in the memory device 17 (step S45), a new reference output voltage value is calculated by adding the correction value to the reference output voltage value (step S46), and then the procedure is returned to step S22. In this case, since the correction value is a positive value, the correction is made in the direction of increasing the reference output voltage value.

In step S43, when a determination is made that the detected output voltage value has not changed to an output voltage value in a humidity range on the higher humidity side, the reference output voltage value is changed (to a currently set reference output voltage value +A) (step S44), and the procedure is returned to step S22. The A is determined by performing various aging tests in advance and according to the frequency of use of the apparatus, and is stored in the memory device 17.

Besides, although the value of α is determined by performing various aging tests in advance, it is not necessarily the same between the correction to increase the reference output voltage value and the correction to decrease the reference output voltage value.

When the frequency of use of the apparatus is extremely low, the charge amount of toner decreases and the developability becomes higher. In such a case, the absolute value of an appropriate development bias voltage value found by the image density correction is larger than the initial value by a predetermined value or more in the negative direction (the direction of decreasing the image density). Therefore, the reference output voltage value is corrected to the positive side as a frequency-of-use correction, and the correction is executed in the direction of decreasing the toner density. As a result, the problems such as an increase in the toner density, toner scattering, and the adhesion of toner to a non-image area will not occur.

On the other hand, when the frequency of use of the apparatus is extremely high, the charge amount of toner increases and the developability becomes lower. In such a case, the absolute value of an appropriate development bias voltage value found by the image density correction is larger than the initial value by the predetermined value or more in the positive direction (the direction of increasing the image density). Therefore, the reference output voltage value is corrected to the negative side as a frequency-of-use correction, and the correction is executed in the direction of increasing the toner density. As a result, the problems such as a decrease in the toner density and blurred images will not occur.

The correction based on the frequency of use of the apparatus and the humidity correction are not performed simultaneously. With this structure, it is possible to avoid oversight of timing at which correction of the reference output voltage value is required due to the difference in the frequency of use of the apparatus instead of the correction required due to a humidity change, and it is possible to prevent the reference output voltage value from being corrected more than necessary.

The determined timing of executing the correction of the reference output voltage value is the same as that in Embodiment 1.

Although this embodiment illustrates the case where the present invention is applied to a single-color image forming apparatus, the present invention is also applicable to the case including developing devices 4 of a plurality of colors, such as a color image forming apparatus. In an image forming apparatus comprising developing devices 4 of a plurality colors and having an image density correction function, when executing a correction of the reference output voltage value according to the difference in the frequency of use of the apparatus by the user, it may be possible to correct the reference output voltage value only when the development bias voltage value changes by a predetermined value or more with respect to the initial value for all the colors in correcting the image density, or when the average value of all the colors changes by a predetermined value or more.

Embodiment 3

Figure 20:
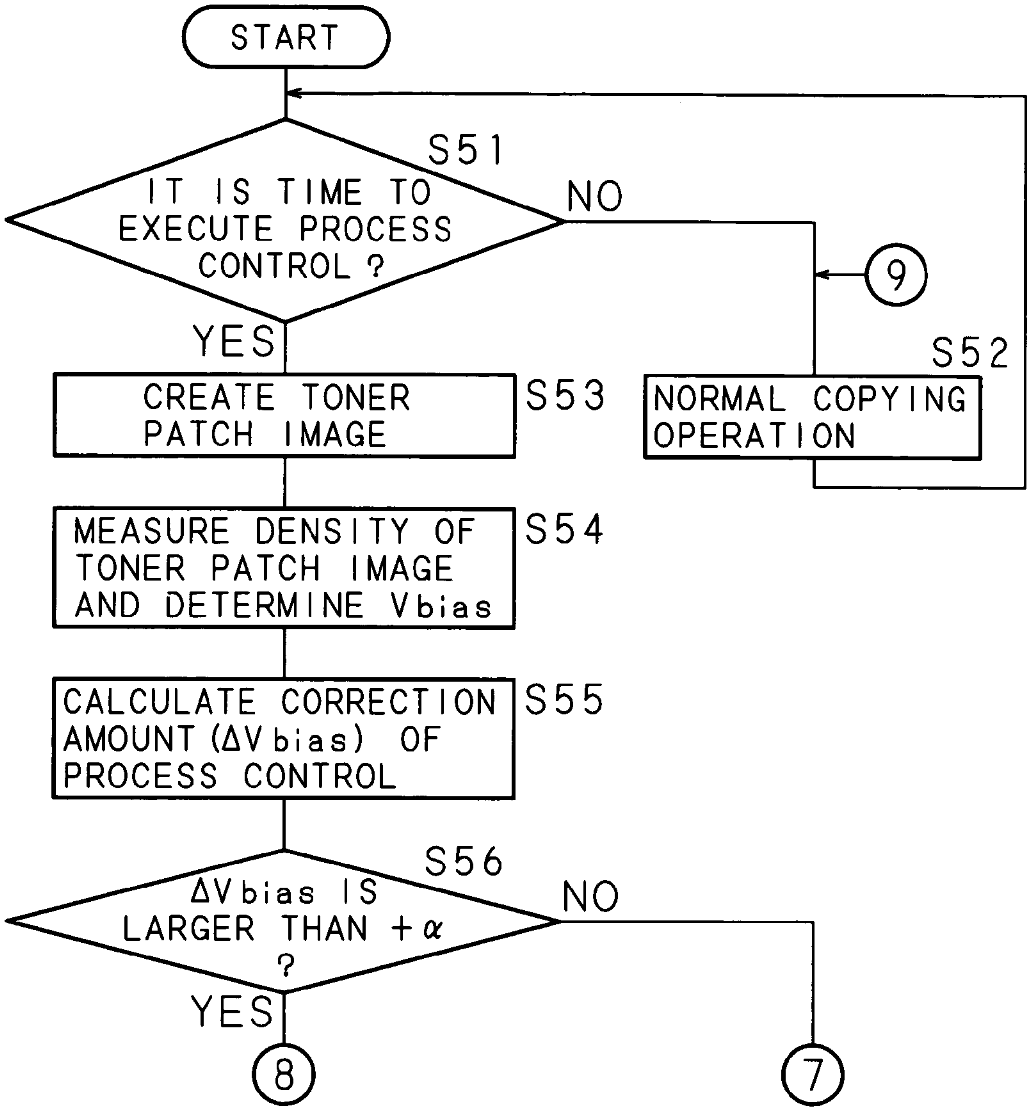
FIG. 20 is a flowchart showing the processing steps of correcting the reference output voltage value based on a humidity change and the difference in the frequency of use of the apparatus by the control device of Embodiment 3.
Figure 21:
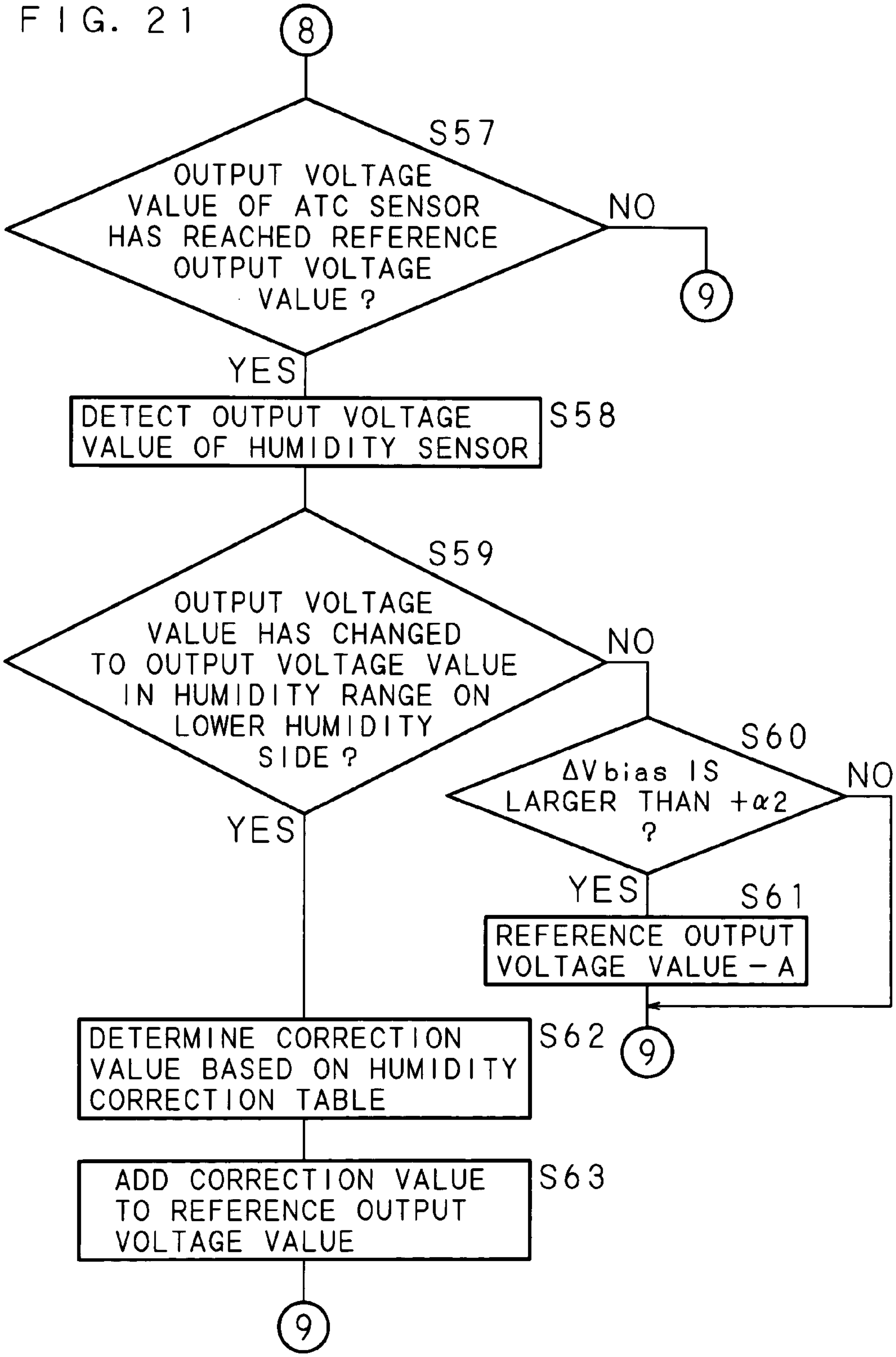
FIG. 21 is a flowchart showing the processing steps of correcting the reference output voltage value based on a humidity change and the difference in the frequency of use of the apparatus by the control device of Embodiment 3.
Figure 22:
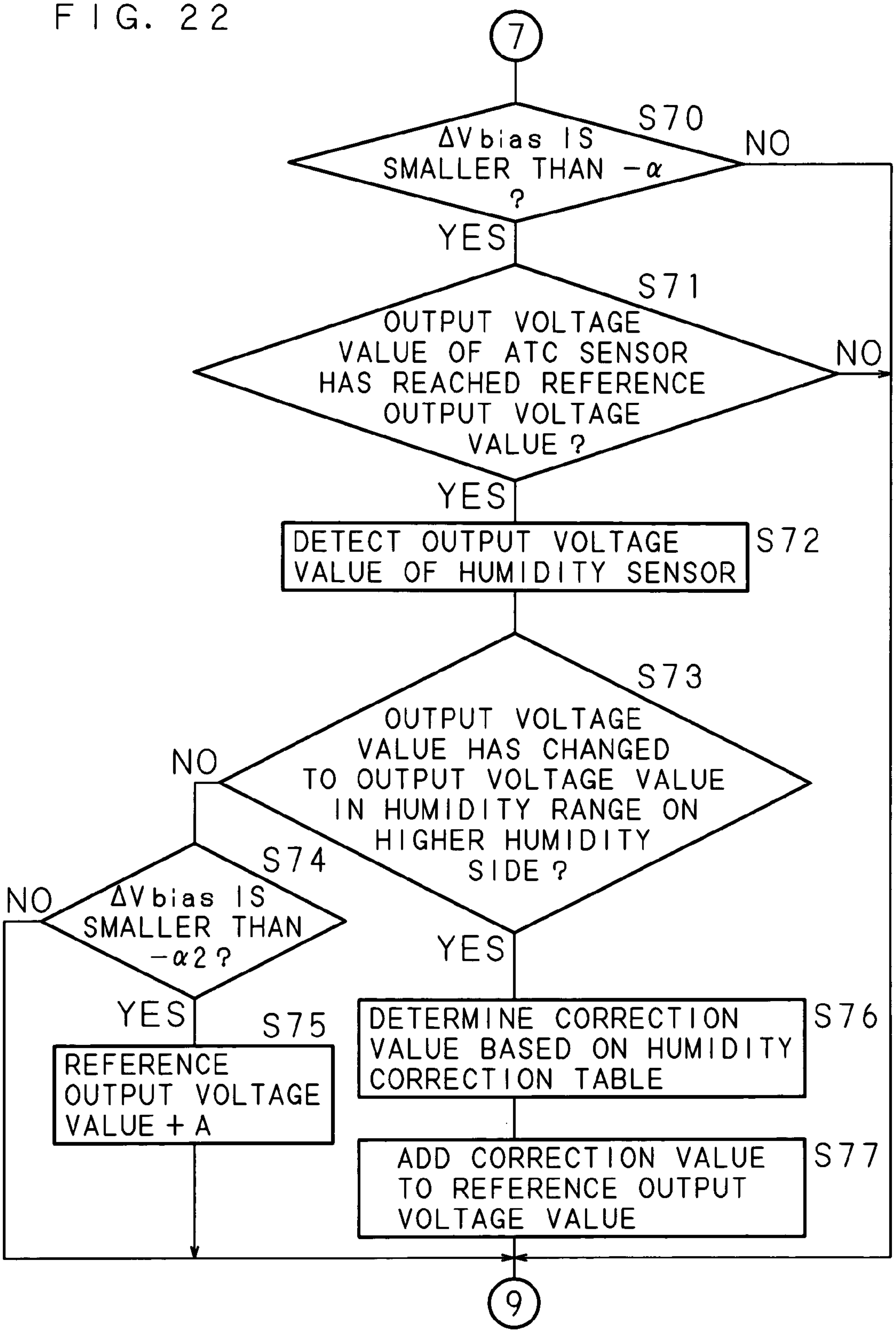
FIG. 22 is a flowchart showing the processing steps of correcting the reference output voltage value based on a humidity change and the difference in the frequency of use of the apparatus by the control device of Embodiment 3.

FIG. 20 through FIG. 22 show a flowchart illustrating the processing steps of correcting the reference output voltage value based on a humidity change and the frequency of use of the apparatus by the control device 15 of Embodiment 3.

When the power supply is turned on to start processing, the CPU 13 of the image forming apparatus determines whether or not it is the time to execute the process control (step S51). The time to execute the process control is the time at which control is necessary, such as when the power supply is turned on, after elapse of a predetermined time since the power supply was turned on, or a preset timing such as after finishing a predetermined number of copies.

In step S51, when a determination is made that it is not the time to execute the process control, the normal copying operation is repeated until the execute time (step S52).

In step S51, when a determination is made that it is the time to execute the process control, a toner patch image for density measurement is created on the photoreceptor drum 1 by performing the charging, exposure and development processes on the photoreceptor drum 1 (step S53). A plurality of electrostatic latent images of different surface potentials are formed on the surface of the photoreceptor drum 1 by changing the charger output voltage value and the development bias voltage value, and then a plurality of toner patch images of different densities are created by visualizing the electrostatic latent images by the developing device 4.

Next, the optical densities of the created toner patch images are measured by the photo sensor 12 (step S54). These densities are detected by the photo sensor 12, and a development bias voltage value (Vbias) corresponding to a toner patch image that matches the reference value is employed as a development bias voltage value for the image forming process performed thereafter.

Next, the difference between the employed development bias voltage value in the process control and the initial value of the development bias voltage value stored in the memory device 17, namely, a correction amount (ΔVbias), is calculated (step S55).

Next, a determination is made as to whether or not the ΔVbias is larger than a predetermined amount +α (step S56). The correction for increasing the development bias voltage is a correction to increase the image density because the image density is low.

In step S56, when the ΔVbias is determined to be larger than +α, the procedure proceeds to step S57, and then a determination is made as to whether or not, after the reference output voltage value was changed, the output voltage value of the ATC sensor 10 has reached the changed reference output voltage value (step S57).

In step S57, when a determination is made that the output voltage value has not reached the reference output voltage value, the procedure is returned to step S62 without changing the reference output voltage value, and the normal copying operation is repeated until the next process control execute time.

In step S57, when a determination is made that the output voltage value has reached the reference output voltage value, the output voltage value of the humidity sensor 11 is detected (step S58), and a determination is made as to whether or not the detected output voltage value has changed to an output voltage value in a humidity range on the lower humidity side (step S59).

In step S59, when a determination is made that the detected output voltage value has changed to an output voltage value in a humidity range on the lower humidity side, a correction value is determined based on the humidity correction table stored in the memory device 17 (step S62), a new reference output voltage value is calculated by adding the correction value to the reference output voltage value (step S63), and then the procedure is returned to step S52. In this case, since the correction value is a negative value, the correction is made in the direction of decreasing the reference output voltage value.

In step S59, when a determination is made that the detected output voltage value has not changed to an output voltage value in a humidity range on the lower humidity side, a determination is made as to whether or not the ΔVbias is larger than +α2 (step S60).

In step S60, when a determination is made that the ΔVbias is not larger than +α2, the procedure is returned to step S52 without changing the reference voltage output value.

In step S60, when a determination is made that the ΔVbias is larger than +α2, the reference output voltage value is changed (to a currently set reference output voltage value −A) (step S61), and the procedure is returned to step S52. The A is determined by performing various aging tests in advance and according to the frequency of use of the apparatus, and is stored in the memory device 17.

In step S56, when the ΔVbias is determined to be smaller than +α, the procedure proceeds to step S70, and then a determination is made as to whether not the ΔVbias is smaller than predetermined −α.

In step S70, when the ΔVbias is determined to be smaller than −α, for example, when the ΔVbias is −110 V when −α is set to −100 V, the procedure proceeds to step S71.

For example, when the ΔVbias is −90 V and between +α and −α, the procedure is returned to step S52 without correcting the reference output voltage value.

In step S71, a determination is made as to whether or not, after the reference output voltage value was changed, the output voltage value of the ATC sensor 10 has reached the changed reference output voltage value.

In step S71, when a determination is made that the output voltage value has not reached the changed reference output voltage value, the procedure is returned to step S52 without changing the reference output voltage value, and the normal copying operation is repeated until the next process control execute time.

In step S71, when a determination is made that the output voltage value has reached the changed reference output voltage value, the output voltage value of the humidity sensor 11 is detected (step S72), and a determination is made as to whether or not the detected output voltage value has changed to an output voltage value in a humidity range on the higher humidity side (step S73).

In step S73, when a determination is made that the detected output voltage value has changed to an output voltage value in a humidity range on the higher humidity side, a correction value is determined based on the humidity correction table stored in the memory device 17 (step S76), a new reference output voltage value is calculated by adding the correction value to the reference output voltage value (step S77), and then the procedure is returned to step S52. In this case, since the correction value is a positive value, the correction is made in the direction of increasing the reference output voltage value.

In step S73, when a determination is made that the detected output voltage value has not changed to an output voltage value in a humidity range on the higher humidity side, a determination is made as to whether not the ΔVbias is smaller than −α2 (step S74).

In step S74, when a determination is made that the ΔVbias is not smaller than −α2, the procedure is returned to step S52 without changing the reference output voltage value.

In step S74, when a determination is made that the ΔVbias is smaller than −α2, the reference output voltage value is changed (to a currently set reference output voltage value +A) (step S75), and the procedure is returned to step S52. The A is determined by performing various aging tests in advance and according to the frequency of use of the apparatus, and is stored in the memory device 17.

Although the value of α2 is determined by performing various aging tests in advance, the α2 is not necessarily the same value between the correction to increase the reference output voltage value and the correction to decrease the reference output voltage value.

In this embodiment, since the degree of agitation stress is recognized by the correction value of the set value of the image forming condition and a correction is made based on this, it is possible to perform the frequency-of-use correction more appropriately.

Embodiment 4

Figure 23:
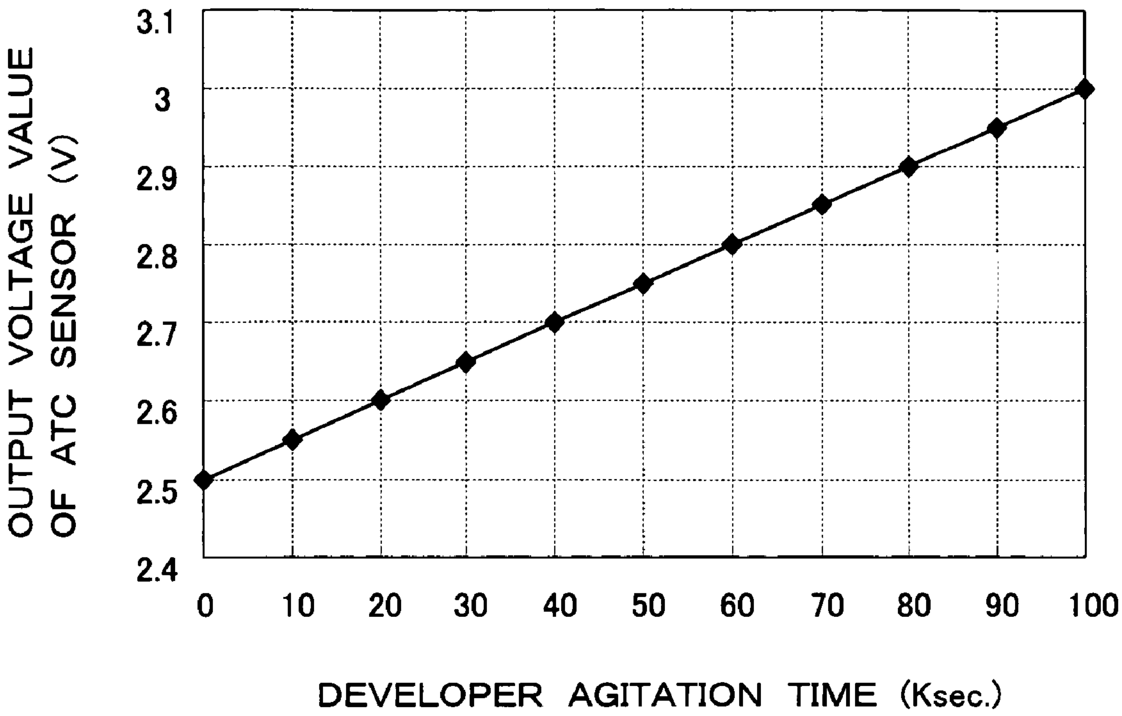
FIG. 23 is a graph showing the relationship between the output voltage value of the ATC sensor and the developer agitation time.

FIG. 23 is a graph showing the relationship between the output voltage value of the ATC sensor 10 and the developer agitation time.

In the phenomenon shown in FIG. 23 in which the output voltage value of the ATC sensor 10 rises with an increase in the developer agitation time, when the apparatus is used without correcting the reference output voltage value, when the developer agitation time increases, the toner density increases and the charge amount of toner decreases with the supply of toner, and problems such as toner scattering and adhesion of toner to an non-image area occur.

In order to solve the problems, in this embodiment, for the initial reference output voltage value of the developer, table data for gradually correcting the reference voltage value is stored in advance as the life correction values of the reference output voltage value with respect to the developer agitation time in the memory device 17 of the CPU 13, a reference is made to the life correction value for the current developer agitation time, and a correction of adding the life correction value to the reference output voltage value is performed together with the correction based on a humidity change of Embodiment 1 and the correction based on a humidity change and the frequency of use of the apparatus of Embodiment 2 or 3. It is therefore possible to stabilize the developability against the deterioration of the developer due to spent toner, etc.

Accordingly, as a method of controlling the reference output voltage value, a correction is performed on the reference output voltage value by taking into account the humidity correction executed against a humidity change, the frequency-of-use correction executed against the difference in the frequency of use of the apparatus, and developer deterioration correction executed based on the developer agitation time. The reference output voltage value for controlling the supply of toner in the developing device 4 is a total value that takes all of these three corrections into account.

With the recent development of techniques for achieving high image quality, there is a tendency towards a decrease in the particle diameter of toner, and toner having an average particle diameter of 8 μm or less and a sharper particle size distribution has been developed. With such a decrease in the particle diameter of toner and carrier, the specific area of the developer per unit weight becomes larger, and accordingly the behavior of the developer changes largely with respect to a change in humidity environment, the difference in the frequency of use of the apparatus, and the difference in the developer agitation stress. In order to solve the problem, in this embodiment, the reference output voltage value is corrected by a correction value obtained by taking all the three changes into account, and therefore it is possible to always control the toner density appropriately and maintain high-quality image formation.

Embodiment 5

When a long time has elapsed since the execution of the previous print job that is a command of a sequence of processes for forming an image, a phenomenon such as precipitation and aggregation of developer may occur in the developing device 4, and the developer density may be uneven. Then, a value deviated from a true toner density value may be detected, and the toner density may be controlled to an erroneous value.

In this embodiment, it is possible to prevent an erroneous operation in which the toner density is controlled to an erroneous value due to the occurrence of a phenomenon such as precipitation and aggregation of the developer when a long time has passed since the end of a print job.

Moreover, in order to realize this embodiment, an erroneous operation prevention table showing the relationship between the elapsed time and a correction coefficient necessary for preventing the erroneous operation as shown in Table 2 below is stored in the memory device 17 in advance.

TABLE 2

| Elapsed Time t second | K (t) |
|---|---|
| 0-1 | 1.00 |
| 1-2 | 0.98 |
| 2-3 | 0.95 |
| 3-4 | 0.90 |
| 4-5 | 0.85 |
| 5-10 | 0.75 |
| 10-15 | 0.60 |
| 15-20 | 0.50 |
| 20-25 | 0.40 |
| 25-30 | 0.30 |
| 30-35 | 0.20 |
| 35-40 | 0.15 |
| 40-45 | 0.10 |
| 45-50 | 0.00 |

As shown in Table 2, in the erroneous operation prevention table stored in the memory device 17, the correction coefficients K (t) corresponding to the elapsed times 0 second to 50 seconds are stored respectively.

In this embodiment, when the correction value for the toner density reference value is TS1, the correction value TS1 for the toner density reference value is determined by Equation 1 and Equation 2 below, based on the previous output value of the toner density, here a toner density output value TS2 after 1.5 seconds from the activation of the image forming apparatus, and the elapsed time t.

If TS2>Vref, then $$TS1=(TS2-V\mathrm{ref})\times K(t)+V\mathrm{ref} \quad \text{Equation 1}$$

If TS2≦Vref, then $$TS1(t)=V\mathrm{ref} \quad \text{Equation 2}$$

Here, Vref toner density reference value

TS1: Correction value

TS2: Previous output value of toner density t: Elapsed time

K(t): Correction coefficient

Figure 24:
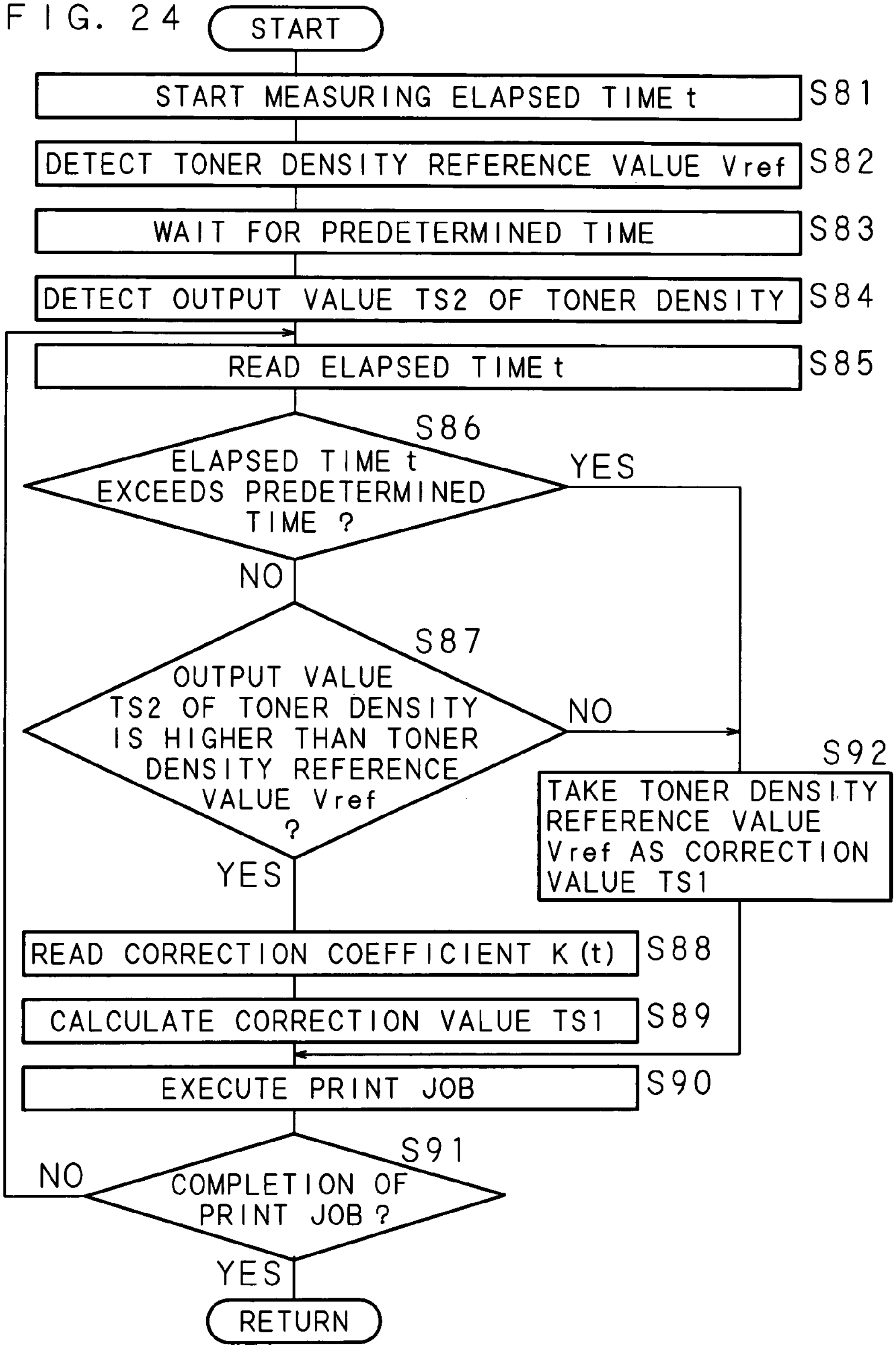
FIG. 24 is a flowchart showing the processing steps of an image forming apparatus of Embodiment 5.

Next, the processing steps of this embodiment will be explained. FIG. 24 is a flowchart showing the processing steps of an image forming apparatus of Embodiment 5.

In the image forming apparatus, based on the control of the CPU 13, the execution of a print job is started, and when the formation of an image has been completed by the execution of the print job, measurement of the elapsed time t is started based on the initial value t=0 (step S81).

Then, when a new print job is received, the toner density reference value Vref indicated as the reference output voltage value is detected (step S82) by the method shown in Embodiments 1 through 4, and after waiting for a predetermined time such as 1.5 second to stabilize the detection (step S83), the output value TS2 of the toner density is detected (step S84).

In the image forming apparatus, the elapsed time t being measured is read (step S85), and a determination is made as to whether or not the read elapsed time t exceeds a predetermined time, for example, 50 seconds, stored in advance in the memory device 17 (step S86). When a determination is made that the read elapsed time t does not exceed the predetermined time (step S86: NO), the output value TS2 of the toner density detected in step S83 and the toner density reference value Vref are compared (step S87).

In step S87, when the output value TS2 of the toner density is determined to be higher than the toner density reference value Vref (step S87: YES), a correction coefficient K (t) corresponding to the elapsed time t read from the erroneous operation prevention table shown as Table 2 is read (step S88), and the correction value TS1 is calculated using the above Equation 1, based on the output value TS2 of the toner density, the toner density reference value, the correction coefficient K (t) and the toner density reference value Vref (step S89). Note that the calculated correction value TS1 is used as a correction value when supplying the toner.

Then, in the image forming apparatus, the newly received print job is executed (step S90), and a determination is made as to whether or not all the processes, such as image formation, based on the print job have been completed (step S91). When a determination is made that the print job has not been completed (step S91: NO), the procedure returns to step S85, and repeats the subsequent processing.

In step S86, when a determination is made that the read elapsed time t exceeds the predetermined time (step S86: YES), the image forming apparatus takes the toner density reference value Vref as the correction value TS1 (step S92), and the procedure proceeds to step S90 and the subsequent processing is performed.

In step S87, when a determination is made that the output value TS2 of the toner density is not higher than the toner density reference value Vref (step S87: NO), the image forming apparatus takes the toner density reference value Vref as the correction value TS1 (step S92), the procedure proceeds to step S90 and the subsequent processing is performed.

In step S91, when a determination is made that the print job has been completed (step S91: YES), the image forming apparatus finishes the processing.

Thus, in this embodiment, when the elapsed time t since the previous formation of image based on the execution of the print job is within 50 seconds set as a predetermined time beforehand, the correction value TS1 for the toner density reference value Vref is determined based on the correction coefficient K (t) corresponding to the elapsed time t recorded in the erroneous operation prevention table and the previously detected output value TS2 of the toner density.

On the other hand, when the elapsed time t exceeds the preset predetermined time of 50 seconds, the correction value TS1 for correcting the toner density reference value Vref is determined based on the elapsed time t, regardless of the output value TS2 of the toner density.

Figure 25:
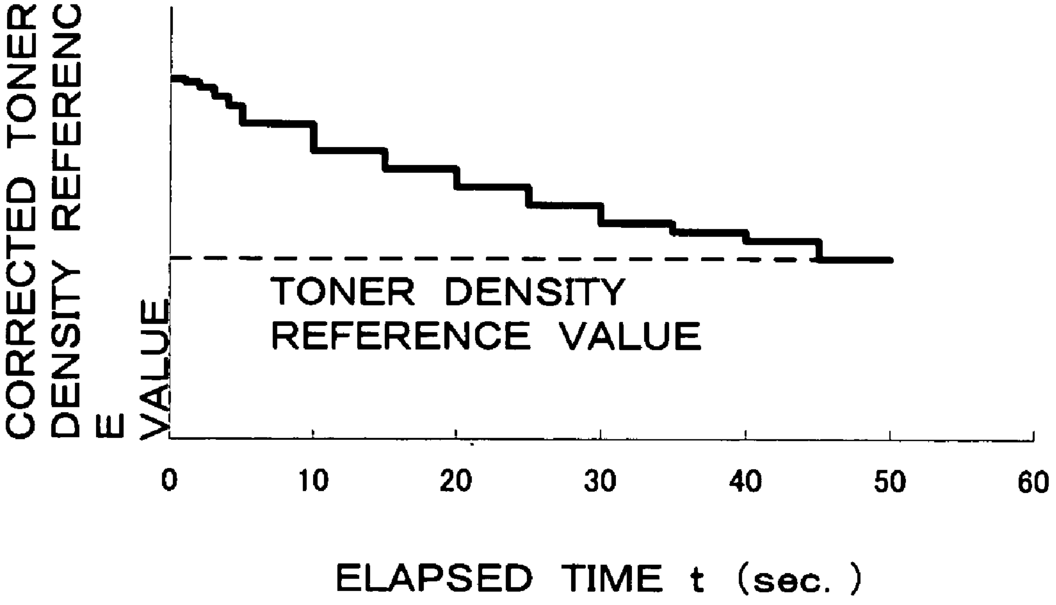
FIG. 25 is a graph showing the relationship between the elapsed time t and the corrected toner density reference value of Embodiment 5.

FIG. 25 is a graph showing the relationship between the elapsed time t and the corrected toner density reference value of Embodiment 5.

As shown in FIG. 25, since the corrected toner density reference value is corrected based on the correction coefficient K (t) recorded in the erroneous operation prevention table until the elapsed time t reaches the predetermined time of 50 seconds, it changes gradually in the decreasing direction with time, and takes a fixed value after the elapsed time t reaches the predetermined time of 50 seconds.

Embodiment 6

An object of this embodiment is to prevent deterioration of image quality due to a delay in the supply of toner when forming an image with high coverage rate, and to prevent deterioration of image quality due to a long toner unsupplied time in which toner supply is not performed when continuously forming images with low coverage rate.

Figure 26:
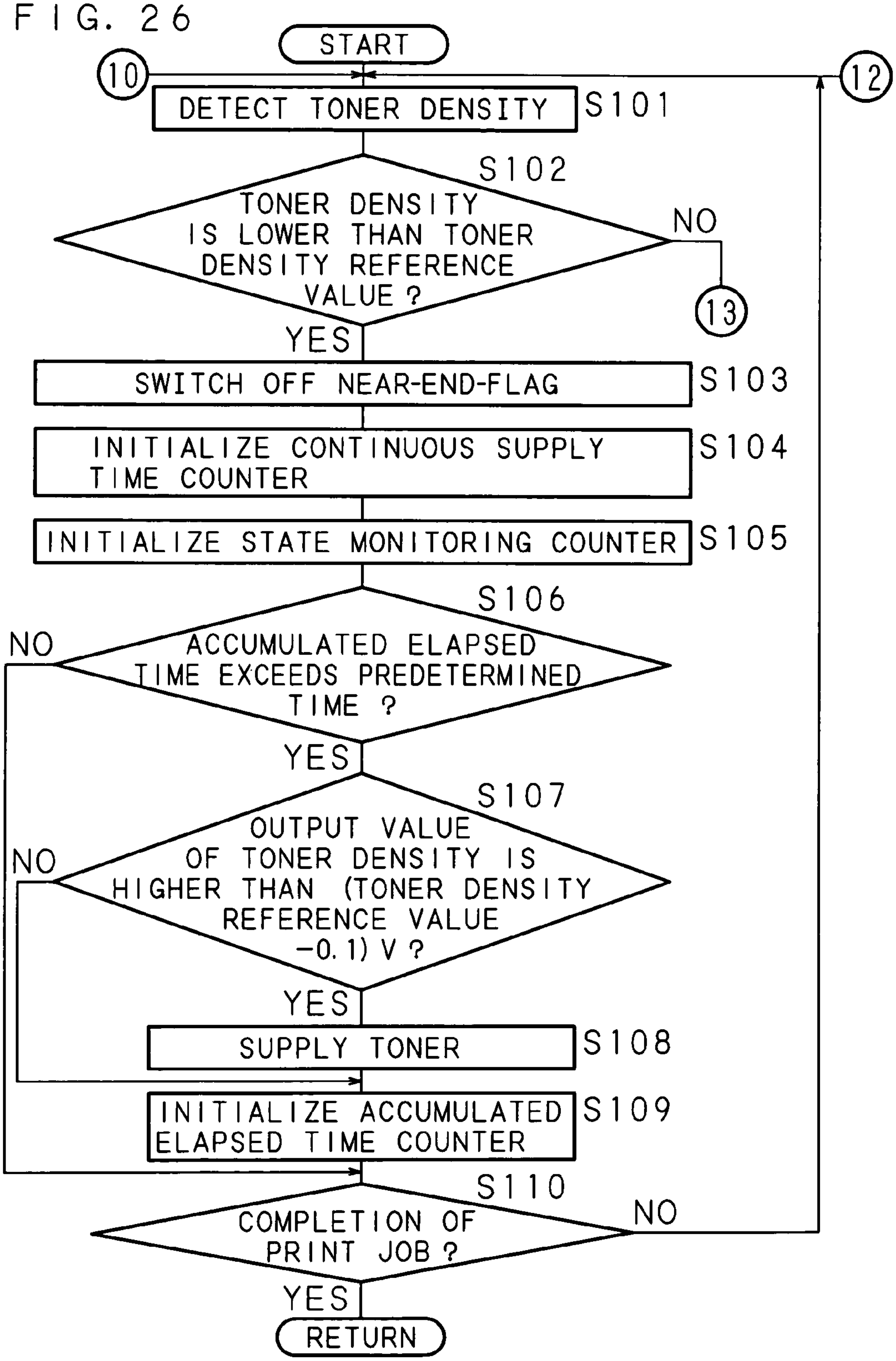
FIG. 26 is a flowchart showing the processing steps of an image forming apparatus of Embodiment 6.
Figure 27:
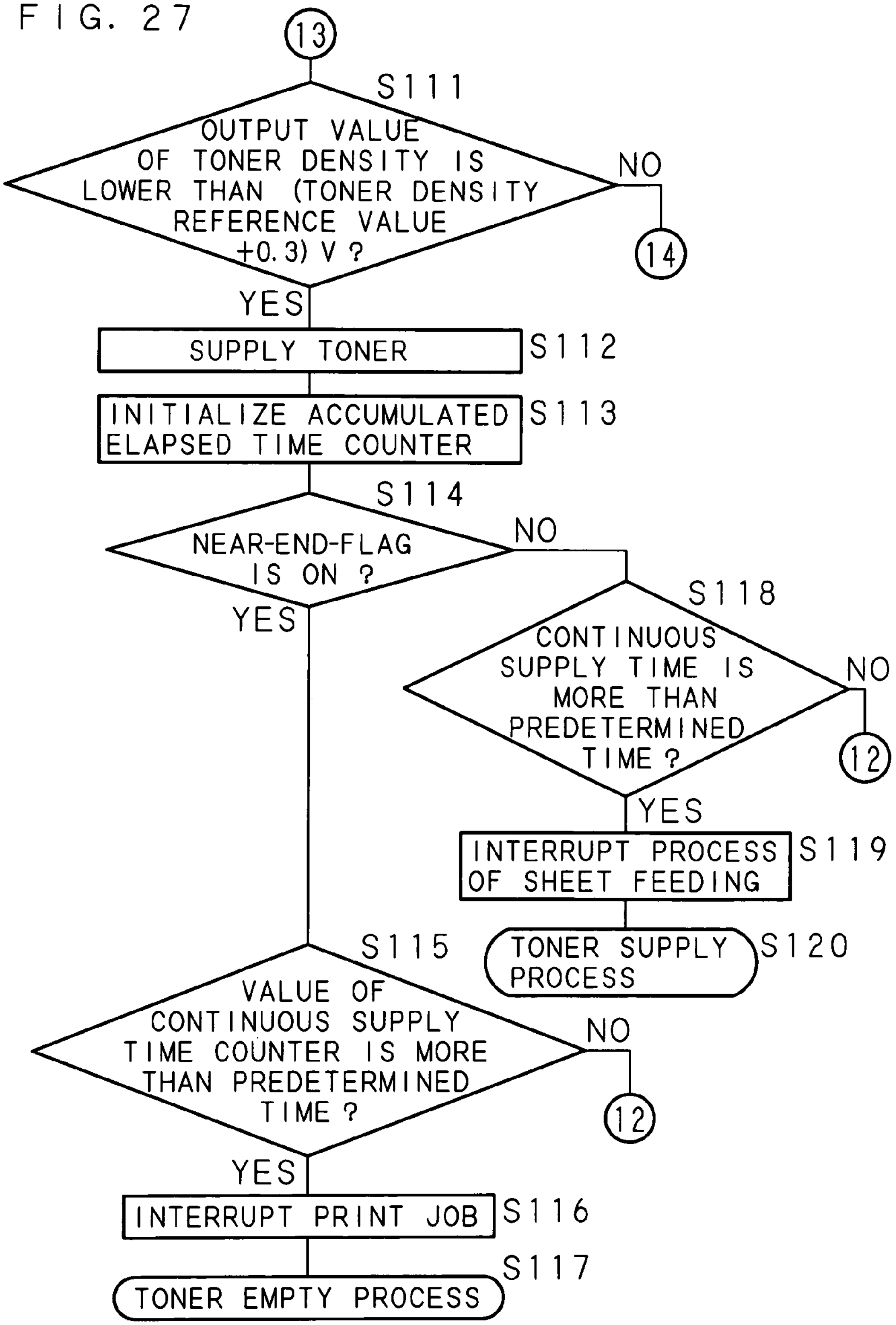
FIG. 27 is a flowchart showing the processing steps of the image forming apparatus of Embodiment 6.
Figure 28:
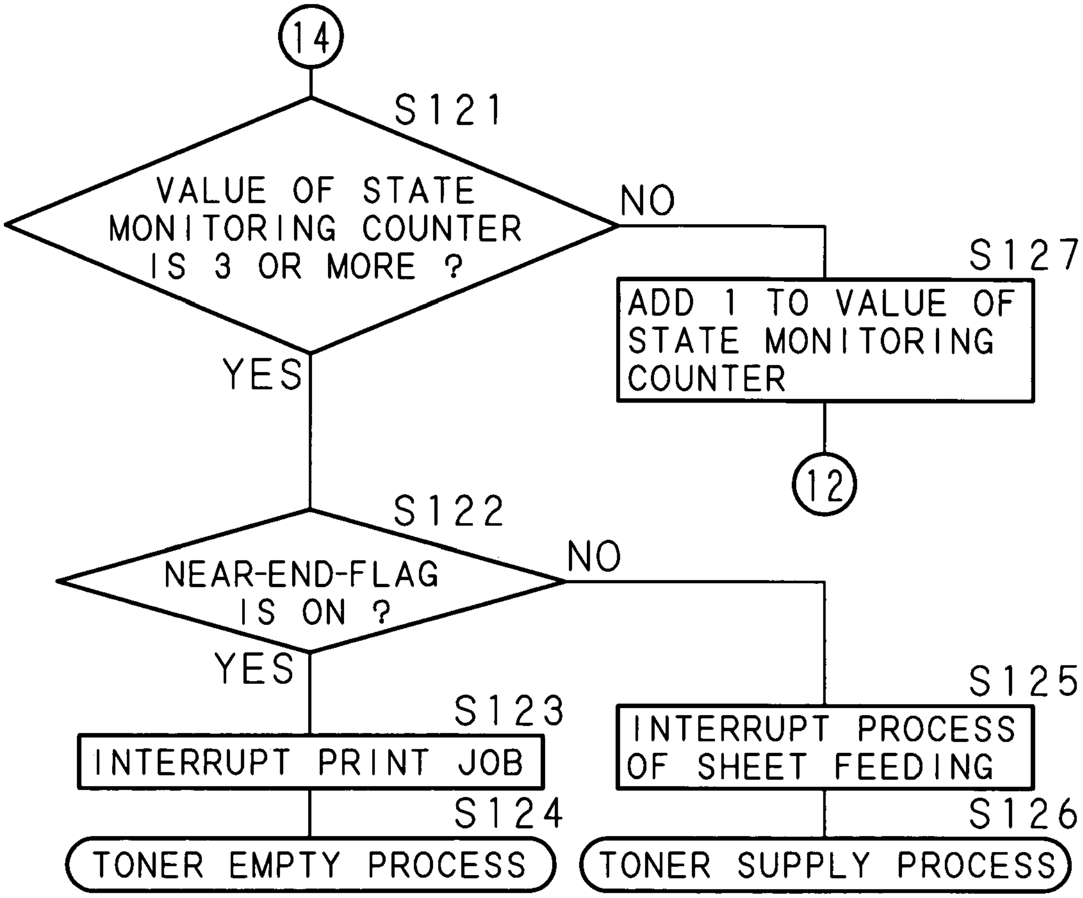
FIG. 28 is a flowchart showing the processing steps of the image forming apparatus of Embodiment 6.

FIG. 26 through FIG. 28 show a flowchart illustrating the processing steps of an image forming apparatus of Embodiment 6.

In the image forming apparatus, a print job that is a command of a sequence of processes for forming an image is received, and when performing an image forming process based on the received print job, under the control of the CPU 13, idling is performed for 1.5 second to stabilize the detection value, the toner density indicated as an output voltage value is detected by the method described in Embodiments 1 through 4 (step S101), and the detected toner density is compared with the toner density reference value (step S102).

When a determination is made by the comparison in step S102 that the detected toner density is lower than the toner density reference value (step S102: YES), the image forming apparatus switches off the near-end-flag that is set to indicate the remaining amount of toner (step S103), initializes a continuous supply time counter for measuring the continuous supply time in which the toner is continuously supplied since the start of toner supply (step S104), and further initializes a state monitoring counter for counting the number of times the state in which the toner density is higher than a value obtained by adding 0.3 V to the toner reference value continues (step S105).

In the image forming apparatus, the accumulated elapsed time required for the image forming process since the previous supply of toner is counted as the toner unsupplied time by using an accumulated elapsed time counter, and a determination is made as to whether or not the counted accumulated elapsed time exceeds 30 seconds set as a predetermined time (step S106). When a determination is made that the accumulated elapsed time exceeds the predetermined time (step S106: YES), the image forming apparatus compares the output value of the toner density with a value obtained by subtracting 0.1 V from the toner density reference value (step S107). When a determination is made that the output value of the toner density is higher than the value obtained by subtracting 0.1 V from the toner density reference value (step S107: YES), the image forming apparatus supplies toner for 1 second, for example (step S108), and initializes the accumulated elapsed time counter measuring the toner unsupplied time (step S109).

By the supply of toner in step S108, it is possible to prevent deterioration of image quality for a low coverage rate.

Moreover, in the image forming apparatus, a determination is made as to whether or not the print job has been completed (step S110). When a determination is made that the print job has been completed (step S100: YES), the procedure is finished.

In step S106, when a determination is made that the accumulated elapsed time does not exceed the predetermined time (step S106: NO), the procedure proceeds to step S110 and a determination is made as to whether or not the print job has been completed.

In step S107, when a determination is made that the output value of the toner density is lower than a value obtained by subtracting 0.1 V from the toner density reference value (step S107: NO), the image forming apparatus does not perform the toner supply process for the purpose of preventing excessive supply of toner, and the procedure proceeds to step S109 and the subsequent processing is executed.

In step S110, when a determination is made that the print job has not been completed (step S110: NO), the procedure returns to step S101 and the subsequent processing is repeated.

In step S102, when a determination is made that the detected toner density is higher than the toner density reference value (step S102: NO), the image forming apparatus compares the output value of the toner density with a value obtained by adding 0.3 V to the toner density reference value (step S111). When a determination is made that the output value of the toner density is lower than the value obtained by adding 0.3 V to the toner density reference value (step S111: YES), the image forming apparatus supplies toner for 1 second, for example (step S112), and initializes the accumulated elapsed time counter measuring the measured toner unsupplied time (step S113).

Then, the image forming apparatus determines whether or not the near-end-flag that is set to indicate the remaining amount of toner is ON (step S114). When a determination is made that the near-end-flag is ON (step S114: YES), the image forming apparatus determines whether or not the value of the continuous supply time counter measuring the continuous supply time is 3 minutes or more, for example (step S115).

In step S115, when a determination is made that the continuous supply time is 3 minutes or more (step S115: YES), the image forming apparatus determines that the amount of toner remaining in the toner cartridge 8 is small and interrupts the print job (step S116), and performs a toner empty process for requesting the supply of toner by the replacement of the toner cartridge (step S117). After completing the toner empty process, the procedure returns to step S101 and the subsequent processing is executed.

In step S115, when a determination is made that the continuous supply time is less than 3 minutes (step S115: NO), the procedure returns to step S101 and the subsequent processing is executed.

In step S114, when a determination is made that the near-end-flag is OFF (step S114: NO), the image forming apparatus determines whether or not the continuous supply time measured using the continuous supply time counter is longer than 1 minute, for example (step S118). If a determination is made that the continuous supply time is longer than 1 minute (step S118: YES), the image forming apparatus determines that there is a delay in the supply of toner and interrupts the process of forming an image by feeding a sheet (step S119), and then performs the toner supply process for supplying the toner (step S120).

In step S118, when a determination is made that the continuous supply time is shorter than 1 minute (step S118: NO), the procedure returns to step S101 and performs the subsequent processing is executed.

In step S111, when a determination is made that the output value of the toner density is higher than the value obtained by adding 0.3 V to the toner density reference value (step S111: NO), the image forming apparatus determines whether or not the value of the state monitoring counter is 3 or more (step S121). When a determination is made that the value of the state monitoring counter is 3 or more (step S121: YES), the image forming apparatus further determines whether or not the near-end-flag is ON (step S122). When a determination is made that the near-end-flag is ON (step S122: YES), the image forming apparatus interrupts the print job (step S123), and performs the toner empty process (step S124). Note that after completing the toner empty process, the procedure returns to step S101 and the subsequent processing is executed.

In step S122, when a determination is made that the near-end-flag is OFF (step S122: NO), the image forming apparatus interrupts the process of forming an image by feeding a sheet (step S125), and then performs the toner supply process for supplying the toner (step S126).

In step S121, when a determination is made that the value of the state monitoring counter is less than 3 (step S121: NO), the image forming apparatus adds 1 to the value of the state monitoring counter (step S127), and the procedure returns to step S101 and the subsequent processing is executed.

Figure 29:
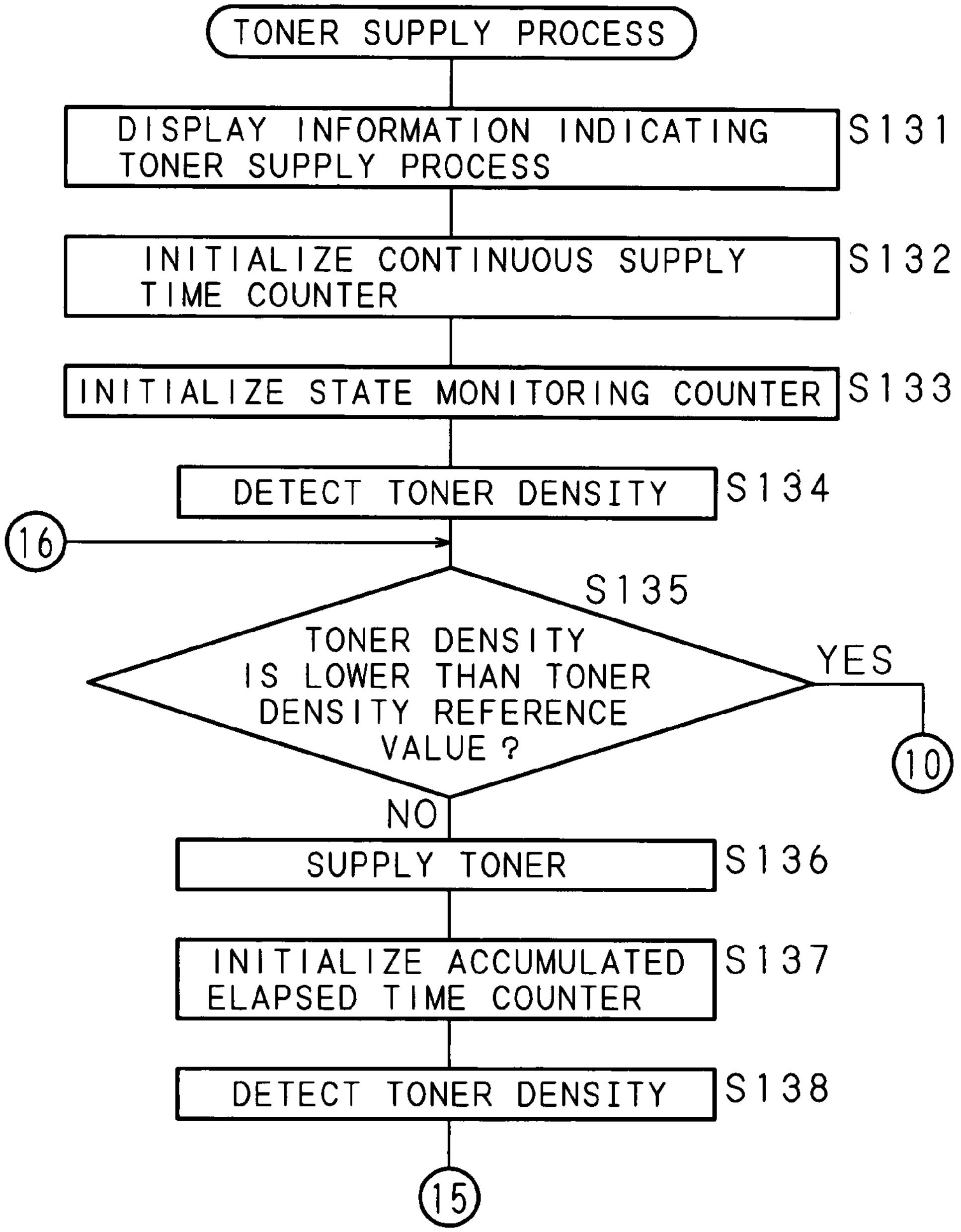
FIG. 29 is a flowchart showing a toner supply process of the image forming apparatus of Embodiment 6.
Figure 30:
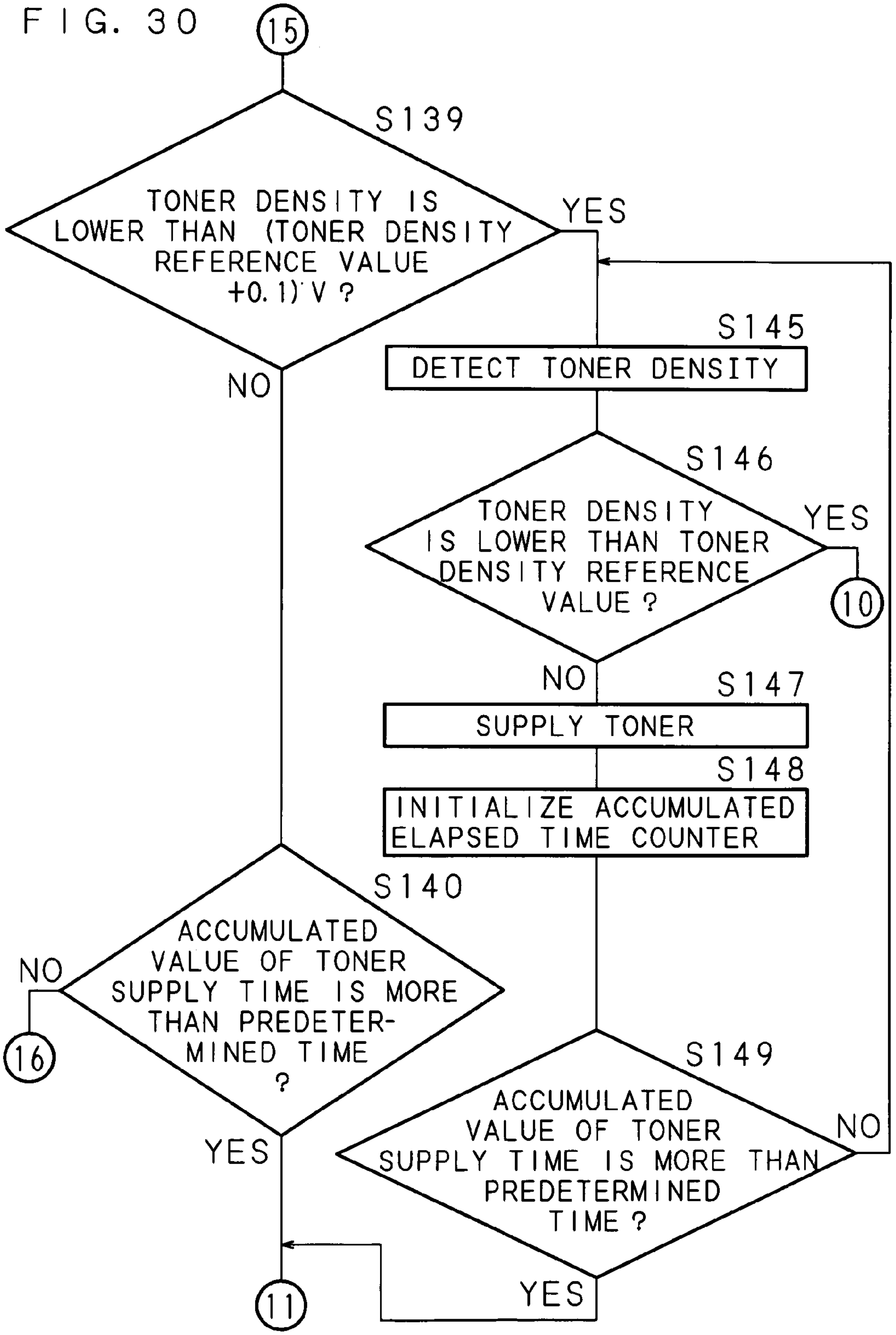
FIG. 30 is a flowchart showing the toner supply process of the image forming apparatus of Embodiment 6.
Figure 31:
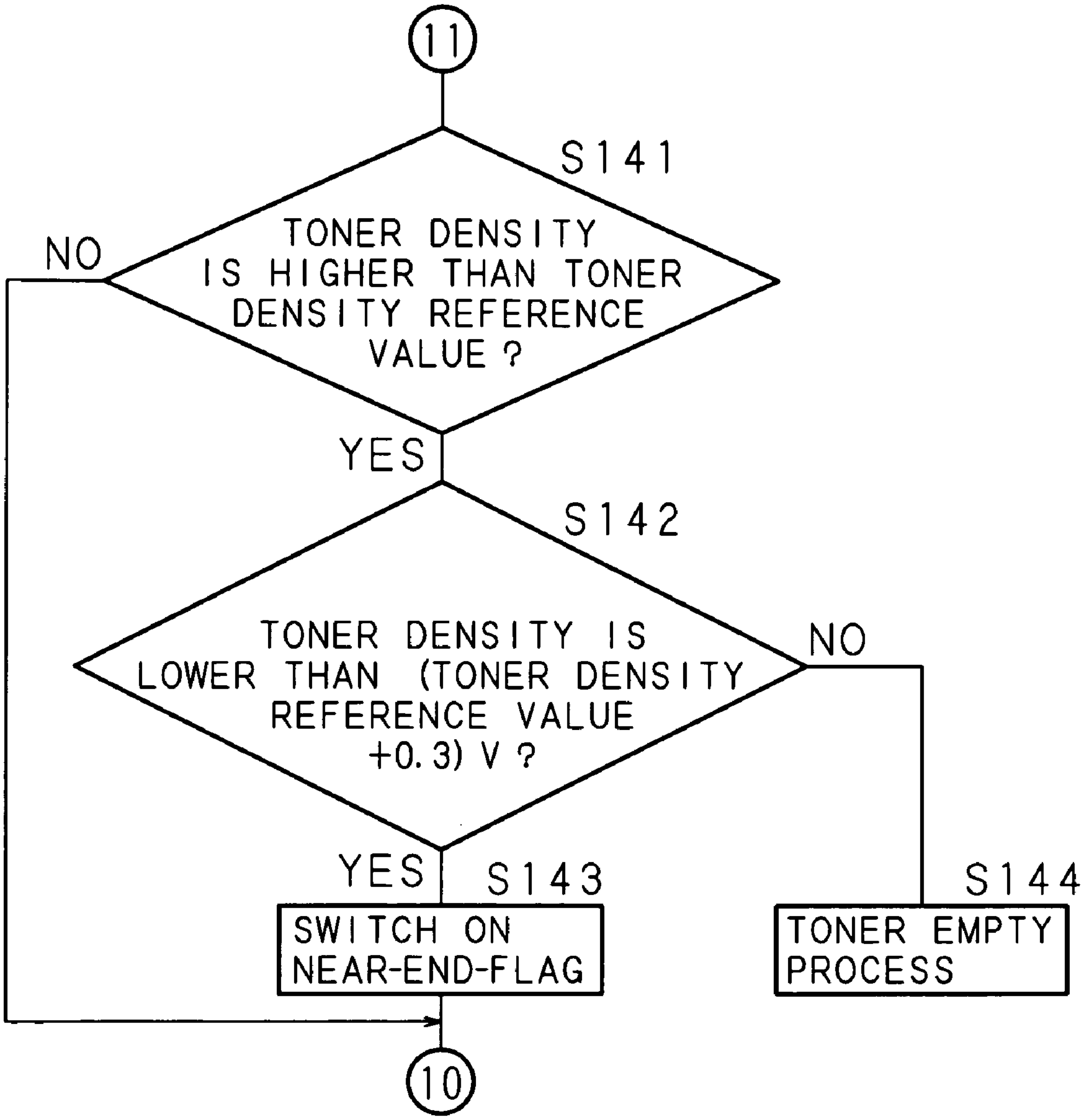
FIG. 31 is a flowchart showing the toner supply process of the image forming apparatus of Embodiment 6.

Next, the following description will explain the toner supply process executed in step S120 of FIG. 27 and step S126 of FIG. 28. FIG. 29 through FIG. 31 illustrate a flowchart showing the toner supply process of the image forming apparatus of Embodiment 6.

As the toner supply process executed in step S120 of FIG. 27 and step S126 of FIG. 28 to prevent deterioration of an image which is caused by a delay in the supply of toner when forming an image with high coverage rate, under the control of the CPU 13, the image forming apparatus displays information indicating that the toner supply process is being executed through display means such as a liquid crystal panel mounted on the external surface of the image forming apparatus (step S131), initializes the continuous supply counter measuring the continuous supply time indicating the time when toner is continuously supplied since the start of the supply of toner (step S132), and initializes the state monitoring counter for counting the number of times the state in which the toner density is larger than a value obtained by adding 0.3 V to the toner reference value continues (step S133).

Then, based on the control of the CPU 13, after performing idling for 30 seconds to stabilize the detection value in the developing device 4, the image forming apparatus detects an output voltage value of the toner density (step S134), and compares the detected output value of the toner density with the toner density reference value (step S135). When the toner density output value is lower than the toner density reference value (step S135: YES), the image forming apparatus finishes the toner supply process, and the procedure returns to step S101 of FIG. 26 and the subsequent processing is executed so as to resume the process interrupted in step S119 of FIG. 27 or step S125 of FIG. 28.

In step S135, when the detected output value of the toner density is higher than the toner density reference value (step S135: NO), the image forming apparatus supplies toner for 1 second, for example (step S136), initializes the accumulated elapsed time counter measuring the toner unsupplied time (step S137), detects the output value of the toner density after the supply (step S138), and compares the detected output value of the toner density with a value obtained by adding 0.1 V to the toner density reference value (step S139). When the output value of the toner density detected after the supply is lower than the value obtained by adding 0.1 V to the toner density reference value (step S139: NO), the image forming apparatus determines whether or not the accumulated value of the toner supplied time in step S136 is or more than 2 minutes and 30 seconds (step S140). When the accumulated value is less than 2 minutes and 30 seconds (step S140: NO), the procedure returns to step S135 and the subsequent processing is repeated.

In step S140, when a determination is made that the accumulated value of the toner supplied time in step S136 is more than 2 minutes and 30 seconds (step S140: YES), the image forming apparatus compares the detected output value of the toner density with the toner density reference value (step S141). When the detected output value of the toner density is lower than the toner density reference value (step S141: NO), the image forming apparatus finishes the toner supply process, and the procedure returns to step S101 of FIG. 26 and the subsequent processing is executed so as to resume the process interrupted in step S119 of FIG. 27 or step S125 of FIG. 28.

In step S141, when the detected output value of the toner density is higher than the toner density reference value (step S141: YES), the image forming apparatus compares the output value of the toner density with a value obtained by adding 0.3 V to the toner density reference value (step S142). When the output value of the toner density is smaller than the value obtained by adding 0.3 V to the toner density reference value (step S142: YES), the image forming apparatus switches on the near-end-flag that is set to indicate the remaining amount of toner (step S143), finishes the toner supply process, and the procedure returns to step S101 of FIG. 26 and executes the subsequent processing is executed so as to resume the process interrupted in step S119 of FIG. 27 or step S125 of FIG. 28.

In step S142, when the output value of the toner density is larger the value obtained by adding 0.3 V to the toner density reference value (step S142: NO), the image forming apparatus performs the toner empty process for requesting the supply of toner by replacement of the toner cartridge (step S144).

In step S139, when the output value of the toner density detected after the supply is higher than the value obtained by adding 0.1 V to the toner density reference value (step S139: YES), the image forming apparatus performs idling for 30 seconds to stabilize the detection value in the developing device 4 and then detects an output value of the toner density (step S145), and compares the detected output value of the toner density with the toner density reference value (step S146). When the detected output value of the toner density is lower than the toner density reference value (step S146: YES), the image forming apparatus finishes the toner supply process, and the procedure returns to step S101 of FIG. 26 and the subsequent processing is executed so as to resume the process interrupted in step S119 of FIG. 27 or step S125 of FIG. 28.

In step S146, when the detected output value of the toner density is higher than the toner density reference value (step S146: NO), the image forming apparatus supplies toner for 1 second, for example (step S147), initializes the accumulated elapsed time counter measuring the toner unsupplied time (step S148), and determines whether or not the accumulated value of the toner supplied time in steps S136 and S146 is more than a predetermined value of 3 minutes (step S149). When the accumulated value is less than 3 minutes (step S149: NO), the procedure returns to step S145 and the subsequent processing is repeated.

In step S149, when a determination is made that the accumulated value of the toner supply time in steps S136 and S146 is more than 3 minutes (step S149: YES), the procedure proceeds to step 141 and the subsequent processing is executed.

In step S149, if a determination is made that the accumulated value of the toner supply time in steps S136 and S146 is less than 3 minutes (step S149: NO), the procedure returns to step 145 and the subsequent processing is repeated.

Thus, when the correction value of the toner density reference value is positive, by initializing the accumulated elapsed time counter measuring the toner unsupplied time indicating the time required for the image forming process after the previous supply of toner, it is possible to prevent excessive supply of toner.

Alternatively, instead of initializing the accumulated elapsed time counter, after supplying toner based on the toner density reference value, it may also be possible to interrupt the measurement of the accumulated elapsed time by the accumulated elapsed time counter until the toner density reaches a toner density reference value after correction.

Note that since Embodiment 6 is implemented by suitably combining Embodiment 1 through Embodiment 5 described above, the explanation of contents which have already been explained in Embodiment 1 through Embodiment 5 is omitted by referring to Embodiment 1 through Embodiment 5 described above.

Embodiment 7

Since the toner density in the developing device 4 sometimes becomes uneven at the time of activation, reactivation or returning from a standby state, when control is performed by detecting the toner density immediately after activation, etc. it may cause an erroneous operation.

In order to prevent an erroneous operation due to an erroneous detection caused by uneven toner density in the developing device 4, this embodiment illustrates process control and a preparation operation to be performed prior to the toner density correction for equalizing the toner density by idling the developing device 4 in a state in which toner is not supplied.

Figure 32:
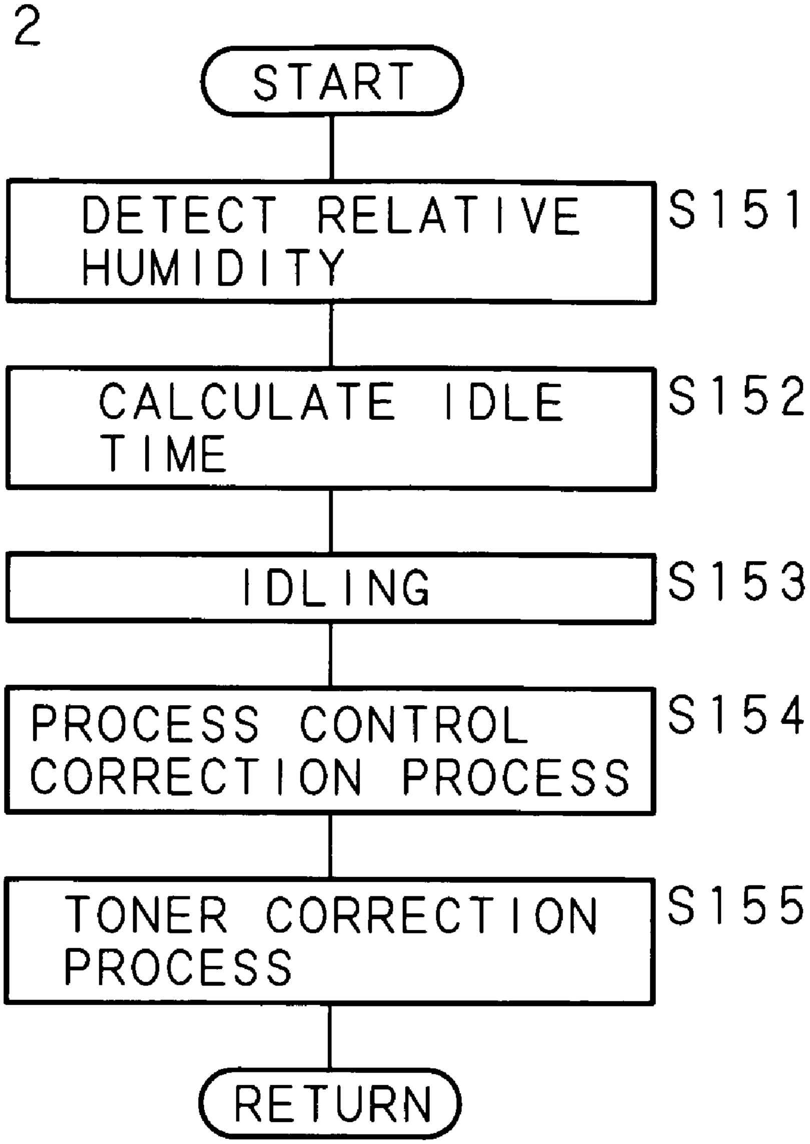
FIG. 32 is a flowchart showing the processing steps of an image forming apparatus of Embodiment 7.

FIG. 32 is a flowchart showing the processing steps of an image forming apparatus of Embodiment 7.

At the time of activation, reactivation or returning from a standby state, under the control of the CPU 13, the image forming apparatus detects relative humidity in the image forming apparatus by a humidity sensor disposed in the vicinity of the developing device 4 (step S151), calculates an idle time by using a calculation formula or a correspondence table stored in the memory device 17, according to the detected humidity (step S152), idles the developing device 4 without supplying toner for the calculated idle time (step S153), and equalizes the toner density and the charge amount.

After idling for the calculated idle time, the image forming apparatus performs a process control correction process (S154), and further performs a toner correction process (step S155).

Thus, the preparation operation for executing a print job is completed.

Embodiment 8

Figure 33:
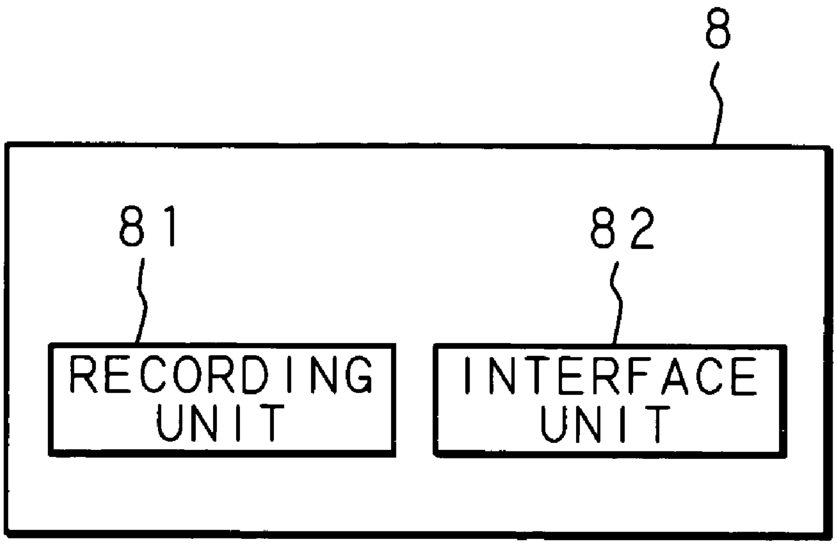
FIG. 33 is a block diagram showing schematically a toner cartridge of an image forming apparatus of Embodiment 8 of the present invention.

FIG. 33 is a block diagram showing schematically a toner cartridge in an image forming apparatus of Embodiment 8 of the present invention.

As shown in FIG. 33, a toner cartridge 8 of Embodiment 8 of the present invention has a recording unit 81 such as an IC memory and an interface unit 82 as an interface for recording information in the recording unit 81. Information about the use status of the toner cartridge 8 is recorded in the recording unit 81.

Further, in the image forming apparatus, there is an access unit for accessing the interface unit 82 and recording and reading information in the recording unit 81 when the toner cartridge 8 is attached.

The information about the use status of the toner cartridge 8 recorded in the recording unit 81 is information indicating the status such as "unused", "in use" and "used". The information indicating "unused" is recorded in the recording unit 81 of the toner cartridge 8 before attached, and the information is rewritten to information indicating "in use" when starting to use the attached toner cartridge 8, and rewritten to information indicating "used" when executing the toner empty process.

As the information about the use status, not only general information such as "unused", "in use" and "used", but also the information indicating the detailed information, such as the accumulated time required for supply using the toner cartridge 8, more specifically, the accumulated drive time obtained by measuring the accumulated drive time of the toner cartridge drive motor 21, are recorded.

Moreover, at the time of activation, reactivation or returning from a standby state, a preparation operation for changing the operating condition according to the use status of the toner cartridge is performed.

Figure 34:
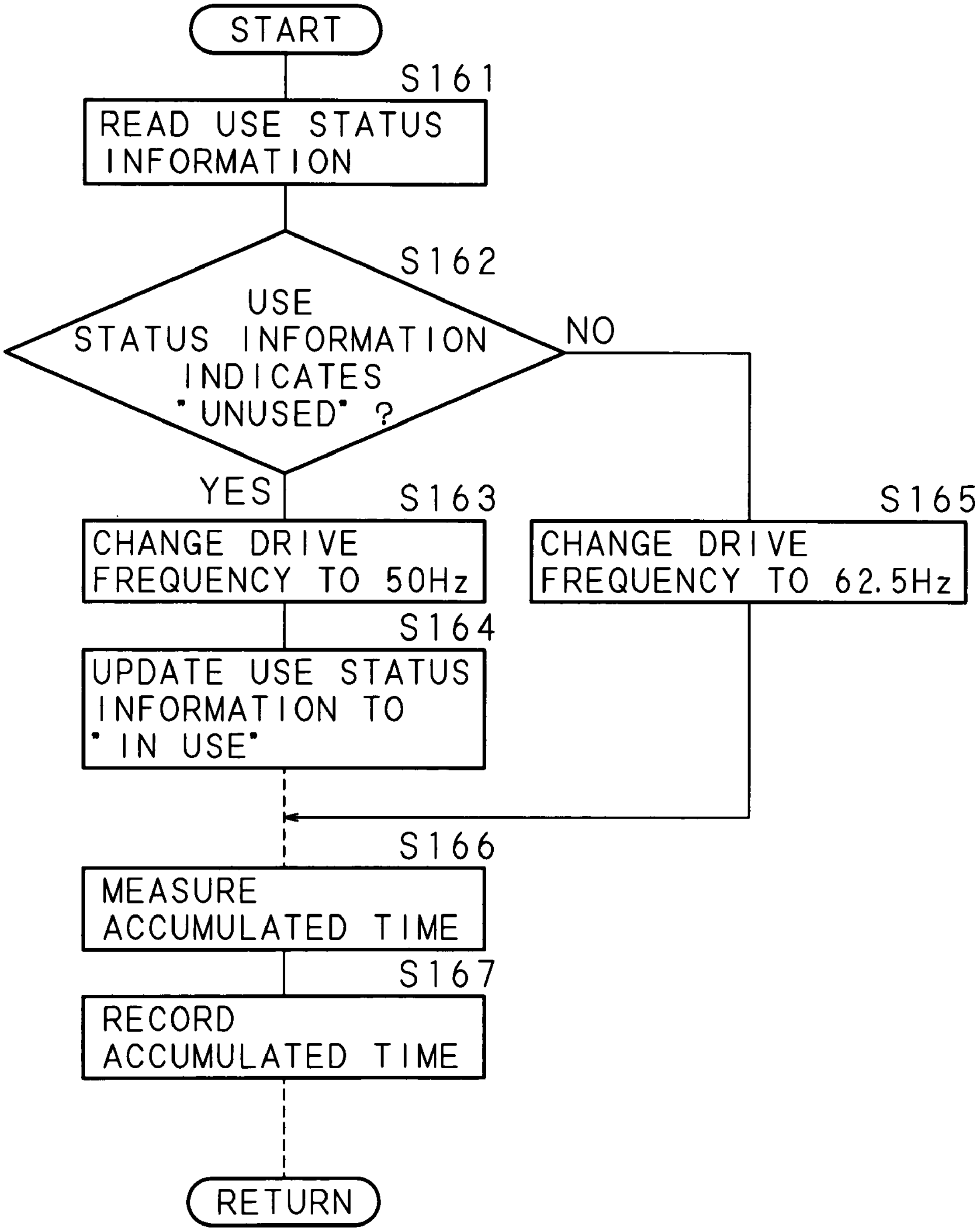
FIG. 34 is a flowchart showing the processing steps of the image forming apparatus of Embodiment 8 of the present invention.

FIG. 34 is a flowchart showing the processing steps of the image forming apparatus of Embodiment 8 of the present invention.

At the time of activation, reactivation or returning from a standby state, under the control of the CPU 13, the image forming apparatus reads the use status information indicating the use status recorded in the recording unit 81 of the toner cartridge 8 (step S161), and determines whether or not the read use status information indicates "unused" (step S162). When the information indicates "unused" (step S162: YES), the image forming apparatus changes the operating condition so that the drive frequency of the drive power source for the toner cartridge drive motor 21 that is toner supplying means becomes 50 Hz (step S163), and updates the use status information to the information indicating "in use" (step S164).

In step S162, when a determination is made that the information does not indicate "unused" (step S162: NO), the image forming apparatus changes the operating condition so that the drive frequency of the drive power source for the toner cartridge drive motor 21 becomes 62.5 Hz (step S165).

Thus, when the toner cartridge 8 is unused, by decreasing the drive frequency, the torque of the toner cartridge drive motor 21 is improved, and it is possible to prevent troubles caused by lack of torque due to blocking of toner that tends to happen when the unused toner cartridge 8 is stored.

Note that in the case where the accumulated drive time of the toner cartridge drive motor 21 is recorded as the use status information in the recording unit 81, when the accumulated drive time is equal to or less than a predetermined value, for example, 120 seconds, the toner cartridge 8 is determined to be unused.

In the case where the accumulated drive time is used as the use status information, the image forming apparatus needs to measure the accumulated time required for the supply of toner (step S166), and perform the process of recording the use status based on the measured accumulated time, here the information indicating the accumulated time, in the recording unit 81 of the toner cartridge 8 (step S167).

Note that although Embodiment 1 through Embodiment 8 have explained the case where a correction value for the reference output voltage value of the ATC sensor 10 is added, the present invention is not limited to this, and may multiply the reference output voltage value of the ATC sensor 10 by a correction value.

Further, although Embodiment 1 through Embodiment 8 have explained the case where the reference output voltage value of the ATC sensor 10 is the toner density reference value, the present invention is not limited to this, and it may be possible to use the toner density as the toner density reference value.

INDUSTRIAL APPLICABILITY

According to an image forming method of the present invention, since the toner density reference value is corrected based on a correction value of the currently set value with respect to the initial value of the set value of an image forming condition, it is possible to certainly correspond to an environmental change in humidity, always hold a toner density at an appropriate value, stabilize the developability and form a satisfactory image.

According to an image forming method of the present invention, when the set value of the image forming condition is corrected to increase the image density, when the humidity changes to the lower humidity side, a correction is performed to increase the supply amount of toner, and therefore the correction of the image forming condition works more effectively and it is possible to always stabilize the developability and obtain a satisfactory image.

According to an image forming method of the present invention, when the set value of the image forming condition is corrected to decrease the image density, when the humidity changes to the higher humidity side, a correction is performed to decrease the supply amount of toner, and therefore the correction of the image forming condition works more effectively and it is possible to always stabilize the developability and obtain a satisfactory image.

According to an image forming method of the present invention, since the toner density reference value is corrected against changes in the toner density and developability caused by a difference in the frequency of use of an image forming apparatus, it is possible to hold the toner density appropriately, stabilize the developability and form a satisfactory image.

According to an image forming method of the present invention, when performing the correction to decrease the supply amount of toner, the correction is made at one time, whereas when performing the correction to increase the supply amount of toner, the correction is made gradually. It is therefore possible to form an image without causing a decrease in the efficiency of printing operation of the apparatus and an abrupt change in the printed image density.

According to an image forming method of the present invention, a determination is made as to whether or not a detection value outputted by the toner density detecting means has reached a toner density reference value after correction, and when a determination is made that the detection value has reached a toner density reference value after correction, a correction of the toner density reference value is performed. It is therefore possible to prevent excessive correction of the toner density reference value.

According to an image forming method of the present invention, when a determination is made that the detection value has reached a toner density reference value after correction, a correction of the set value of the image forming condition is performed. Hence, when the developability is optimized by the toner supply control, the set value of the image forming condition is corrected again, and therefore it is possible to perform image formation with better image density.

According to an image forming method of the present invention, the developer agitation time since the initial time of the developer contained in the developing device is stored, and the toner density reference value is corrected using the correction values corresponding to the stored developer agitation time gradually. Therefore, for example, when the detection value is a voltage value outputted by the toner density detecting means, it is possible to make a correction by taking into account an increase in the voltage value due to spent toner caused by an increase in the developer agitation time, and it is possible to more appropriately correct the toner density, stabilize the developability and form a satisfactory image by performing the correction that take into account all the humidity change, agitation stress of developer depending on the frequency of use of the apparatus, and deterioration of the developer depending on the developer agitation time.

According to an image forming method of the present invention, since the image forming condition is corrected by making one or a plurality of corrections on the development bias voltage value applied to develop an electrostatic latent image, the charging voltage value for charging the photoreceptor, the transfer voltage value applied to transfer a developing image to the transfer member, and the exposure amount for exposing the photoreceptor, it is possible to obtain satisfactory printed image density and correct the toner density reference value based on the result of correcting the image forming condition when correction is necessary.

According to an image forming method of the present invention, when a determination is made that the elapsed time since forming an image exceeds a predetermined time, a correction value is determined based on the elapsed time, regardless of the output value from the toner density detecting means. Therefore, it is possible to avoid troubles, for example, when a long time has elapsed since the completion of image formation, a phenomenon such as precipitation and aggregation of the developer occurs in the developing device, the density of the developer becomes uneven, the toner density detecting means detects a value deviated from a true toner density value, a correction value is determined based on the value deviated from the true density value and consequently an appropriate amount of toner cannot be supplied, and it is possible to stabilize the developability and form a satisfactory image.

According to an image forming method of the present invention, the elapsed time since forming an image is measured, and regardless of the output value from the toner density detecting means, a correction value is determined based on a output value from the toner density detecting means outputted previously, such as when the image forming process was started, and the elapsed time. Therefore, it is possible to avoid troubles, for example, when a long time has elapsed since the completion of image formation, a phenomenon such as precipitation and aggregation of the developer occurs in the developing device, the density of the developer becomes uneven, the toner density detecting means detects a value deviated from a true density value, a correction value is determined based on the value deviated from the true density value and consequently an appropriate amount of toner cannot be supplied, and it is possible to stabilize the developability and form a satisfactory image.

According to an image forming method of the present invention, the continuous supply time in which the toner is supplied continuously since the start of supply of toner is measured, and when a determination is made that the measured continuous supply time exceeds a predetermined time, a determination is made that images with high coverage rate such as black solid images are continuously formed, and a process for restricting the image formation, such as a temporarily interrupting the image formation, is performed. Therefore, it is possible to predict a situation where of the supply of toner cannot follow the continuous formation of images with high coverage rate, restrict the image formation, and supply the toner sufficiently while the image formation is restricted. Thus, after the toner density is restored by the supply of toner, it is possible to resume the image forming process and obtain stable image quality.

According to an image forming method of the present invention, the accumulated elapsed time required for the image forming process performed after the supply of toner is measured, and when a determination is made that the measured accumulated elapsed time exceeds a predetermined time, a determination is made that images with high coverage rate are continuously formed, and the supply of a predetermined amount of toner by the toner supply means is started regardless of the output value from the toner density detecting means. Therefore, since it is possible to predict a decrease in the image density by continuous printing of images with low coverage rate and supply a predetermined amount of toner, it is possible to hold the toner density at an appropriate value, stabilize the developability and form a satisfactory image.

According to an image forming method of the present invention, when a correction value of the toner density reference value determined in the correction value determination step is positive, a clear process for returning the accumulated elapsed time to the initial value is performed. Therefore, when the toner density reference value is corrected to the positive side, it becomes higher than the previous toner density reference value. However, since the accumulated elapsed time is cleared, it is possible to prevent the accumulated elapsed time from exceeding a predetermined time and prevent the toner from being supplied excessively. Consequently, it is possible to hold the toner density at an appropriate value, stabilize the developability and form a satisfactory image.

According to an image forming method of the present invention, when a correction value of the toner density reference value determined in the correction value determination step is positive, the measurement of the accumulated elapsed time is interrupted until the toner density detected by toner density detecting means after correction reaches the toner density reference value after correction. Therefore, when the toner density reference value is corrected to the positive side, it becomes higher than the previous toner density reference value. However, since the accumulated elapsed time is cleared, it is possible to prevent the accumulated elapsed time from exceeding a predetermined time and prevent the toner from being supplied excessively. Consequently, it is possible to hold the toner density at an appropriate value, stabilize the developability and form a satisfactory image.

According to an image forming method of the present invention, since the average particle size of toner is within a range of 4 to 7 μm, it is possible to form a high-definition, high-quality image with less dirt on the back side in a state in which there is less toner scattering in the device.

According to an image forming method of the present invention, since the content of pigment in the toner is within 8 to 20%, it is possible to reduce the copying cost and form an image with high fixing performance.

According to an image forming apparatus of the present invention, since the toner density reference value is corrected based on a correction value of the currently set value with respect to the initial value of the set value of an image forming condition, the image forming apparatus has strength against an environmental change, durability, and causes less change in the image density.

According to an image forming apparatus of the present invention, since a developing device containing developers of a plurality of colors is incorporated, it is possible to hold a good color balance.

According to an image forming apparatus of the present invention, since the use status of toner can be detected by providing the toner container means such as a toner cartridge with a memory unit such as an IC memory and recording the information about the use status, such as "unused", "in use" and "used", in the memory unit, it is possible to operate the image forming apparatus according to the use status. Therefore, it is possible to prevent the image density from becoming unstable immediately after the replacement of the toner container means, for example, and it is further possible to prevent a situation where image formation is started when the used toner container means is still attached.

According to an image forming apparatus of the present invention, by measuring the accumulated time required for the supply by the toner supply means and recording the use status determined based on the accumulated time required for the supply, it is possible accurately estimate the used amount of toner.

According to an image forming apparatus of the present invention, the information about the use status recorded in the recording unit of the toner container means is read. When the read information about the use status is information indicating an unused status, by changing the condition of the toner supply means, for example, the drive frequency, even when blocking that tends to happen in brand new toner supply means occurs and there is a possibility of a lack of drive torque during operation, it is possible to improve the torque and perform appropriate operation by automatically changing the operating condition such as the drive frequency.

The invention claimed is:

1. An image forming method for forming an image using an image forming apparatus comprising:

a developing unit for containing a two-component developer including toner and carrier;

a toner density detecting unit for detecting a toner density in the developing unit;

a humidity detecting unit for detecting humidity information around the developing unit;

a toner supply unit for supplying toner to the developing means;

a toner supply control unit for controlling the toner supply unit by comparing an output value from the toner density detecting unit with a toner density reference value stored in memory unit; and an image density correction control unit for forming a reference developing image based on a set value of a predetermined image forming condition, detecting a density of the formed reference developing image, and correcting the set value, the method by comprising:

a determination step for determining whether or not a set value of an image forming condition has been corrected beyond a predetermined range with respect to an initial value;

a humidity detection step for detecting humidity by the humidity detecting unit when a determination is made in the determination step that a correction value with respect to the initial value exceeds the predetermined range;

a correction value determination step for determining a correction value of the toner density reference value, based on the humidity detected in the humidity detection step; and a step of correcting the toner density reference value using the correction value of the toner density reference value determined in the correction value determination step.

2. The image forming method as set forth in claim 1, wherein the determination step is a first determination step for determining whether or not a correction value with respect to the initial value of the set value of the image forming condition is equal to or larger than a comparative reference value, and further comprises a second determination step for determining that the correction value is negative when a determination is made in the first determination step that the correction value is not equal to or larger than the comparative reference value, and determining whether or not an absolute value of the correction value is equal to or larger than the comparative reference value, and the humidity detection step is a step of detecting humidity when a determination is made in the first determination step or the second determination step that the absolute value of the correction value is equal to or larger than the comparative reference value.

3. The image forming method as set forth in claim 2, wherein the comparative reference value differs depending on whether the correction value of the set value of the image forming condition is positive or negative.

4. The image forming method as set forth in claim 2, further comprising a humidity change determination step for determining whether or not the humidity detected in the humidity detection step has changed and become lower by an amount equal to or larger than a predetermined value from the humidity when the toner density reference value was corrected previously, when a determination is made in the first determination step that the correction value is equal to or larger than the comparative reference value, wherein when a determination is made in the humidity change determination step that the humidity has changed and become lower by an amount equal to or larger than the predetermined value, a correction value of the toner density reference value is determined based on the changed value to increase a supply amount of toner by the correction value determination step.

5. The image forming method as set forth in claim 2, further comprising:

a humidity change determination step for determining whether or not the humidity detected in the humidity detection step has changed and become lower by an amount equal to or larger than a predetermined value from the humidity when the toner density reference value was corrected previously, when a determination is made in the first determination step that the correction value is equal to or larger than the comparative reference value; and a step of determining a correction value of the toner density reference value to increase a supply amount of toner, when a determination is made in the humidity change determination step that the humidity change is a change within the predetermined value.

6. The image forming method as set forth in claim 5, wherein said step is a step of determining the correction value by a correction value of the image forming condition.

7. The image forming method as set forth in claim 2, further comprising a humidity change determination step for determining whether or not the humidity detected in the humidity detection step has changed and become higher by an amount equal to or larger than a predetermined value from the humidity when the toner density reference value was corrected previously, when a determination is made in the second determination step that the correction value of the image forming condition is negative and the absolute value of the correction value is equal to or larger than the comparative reference value, wherein when a determination is made in the humidity change determination step that the humidity has changed and become higher by an amount equal to or larger than the predetermined value, a correction value of the toner density reference value is determined based on the changed value to decrease a supply amount of toner.

8. The image forming method as set forth in claim 2, further comprising:

a humidity change determination step for determining whether or not the humidity detected in the humidity detection step has changed and become higher by an amount equal to or larger than a predetermined value from the humidity when the toner density reference value was corrected previously, when a determination is made in the second determination step that the correction value of the image forming condition is negative and the absolute value of the correction value is equal to or larger than the comparative reference value; and a correction value determination step for determining a correction value of the toner density reference value to decrease a supply amount of toner, when a determination is made in the humidity change determination step that the humidity change is a change within the predetermined value.

9. The image forming method as set forth in claim 8, wherein said step is a step of determining the correction value by a correction value of the image forming condition.

10. The image forming method as set forth in claim 1, wherein when making a correction to decrease the supply amount of toner, the correction is performed at one time.

11. The image forming method as set forth in claim 1, wherein when making a correction to increase the supply amount of toner, the correction is made gradually.

12. The image forming method as set forth in claim 1, further comprising a step of determining whether or not a detection value outputted by the toner density detecting unit has reached the toner density reference value after correction, when the toner density reference value is corrected, wherein when a determination is made in said step that the detection value has reached the toner density reference value after correction, the correction of the toner density reference value is executed.

13. The image forming method as set forth in claim 1, further comprising a step of determining whether or not a detection value outputted by the toner density detecting unit has reached the toner density reference value after correction, when the toner density reference value is corrected, wherein when a determination is made in said step that the detection value has reached the toner density reference value after correction, the correction of the set value of the image forming condition is executed.

14. The image forming method as set forth in claim 1, further comprising:

a step of storing a developer agitation time since an initial time of the developer contained in the developing unit; and a step of correcting the toner density reference value using a correction value corresponding to the developer agitation time stored in said step.

15. The image forming method as set forth in claim 1, wherein the correction of the image forming condition is one or a plurality of corrections on a development bias voltage value applied to develop an electrostatic latent image, a charging voltage value for charging a photoreceptor, a transfer voltage value for transferring the developing image to a transfer material, and an exposure amount for exposing the photoreceptor.

16. The image forming method as set forth in claim 1, further comprising:

a step of measuring an elapsed time since forming an image;

a step of determining whether or not the measured elapsed time exceeds a predetermined time; and a step of determining a correction value of the toner density reference value based on the elapsed time, regardless of an output value from the toner density detecting unit, when a determination is made in the determination step that the elapsed time exceeds the predetermined time.

17. The image forming method as set forth in claim 1, further comprising:

a step of measuring an elapsed time since forming an image; and a step of determining a correction value of the toner density reference value, based on a previous output value from the toner density detecting unit and the elapsed time.

18. The image forming method as set forth in claim 1, further comprising:

a step of measuring a continuous supply time in which the toner is continuously supplied since the start of toner supply;

a step of determining whether or not the measured continuous supply time exceeds a predetermined time; and a step of restricting forming an image, when a determination is made in the determination step that the continuous supply time exceeds the predetermined time.

19. The image forming method as set forth in claim 1, further comprising:

a step of measuring an accumulated elapsed time required for an image forming process after supplying the toner;

a step of determining whether or not the measured accumulated elapsed time exceeds a predetermined time; and a step of starting to supply a predetermined amount of toner by the toner supply unit, regardless of an output value from the toner density detecting unit, when a determination is made in the determination step that the accumulated elapsed time exceeds the predetermined time.

20. The image forming method as set forth in claim 19, further comprising:

a step of returning the accumulated elapsed time to an initial value without supplying toner, when the output value of the toner density detecting unit is smaller than the toner density reference value determined in the correction value determination step by a predetermined amount.

21. The image forming method as set forth in claim 19, further comprising:

a step of returning the accumulated elapsed time to an initial value when the correction value of the toner density reference value determined in the correction value determination step is positive.

22. The image forming method as set forth in claim 19, further comprising:

a step of interrupting the measurement of the accumulated elapsed time until the toner density detected by the toner density detecting unit reaches the toner density reference value after correction, after supplying toner by the toner supply unit based on the toner density reference value after correction, when the correction value of the toner density reference value determined in the correction value determination step is positive.

23. The image forming method as set forth in claim 1, wherein an average particle diameter of toner is within a range of 4 to 7 μm.

24. The image forming method as set forth in claim 1, wherein a content of pigment in toner is within a range of 8 to 20%.

25. An image forming apparatus comprising:

a developing unit for containing a two-component developer including toner and carrier;

a toner density detecting unit for detecting a toner density in the developing unit;

a humidity detecting unit for detecting humidity information around the developing unit;

a toner supply unit for supplying toner to the developing unit;

a toner supply control unit for controlling the toner supply unit by comparing an output value from the toner density detecting unit with a toner density reference value stored in memory unit; and an image density correction control unit for forming a reference visible image based on a set value of a predetermined image forming condition, detecting a density of the formed reference visible image, and correcting the set value;

a judging unit for determining whether or not a set value of an image forming condition has been corrected beyond a predetermined range with respect to an initial value;

a detecting unit for detecting a humidity change by monitoring an output of the humidity detecting unit, when said unit determines that a correction value with respect to the initial value exceeds the predetermined range;

a determining unit for determining a correction value of the toner density reference value, based on the humidity change detected by the detecting unit; and a correcting unit for correcting the toner density reference value using the correction value determined by the determining unit.

26. The image forming apparatus as set forth in claim 25, comprising a developing device for containing developers of a plurality of colors.

27. The image forming apparatus as set forth in claim 25 or 26, comprising a detachable toner container unit for storing toner to be supplied by the toner supply unit, wherein the toner container unit includes a recording unit for recording information about use status.

28. The image forming apparatus as set forth in claim 27, comprising:

a measuring unit for measuring an accumulated time required for supply by the toner supply unit, and wherein the recording unit of the toner container unit records the use status based on the measured accumulated.

29. The image forming apparatus as set forth in claim 27, comprising:

a recording unit for reading the information about the use status recorded in the recording unit of the toner container unit; and a changing unit for changing a preset operating condition when the read information about the use status is information indicating an unused status.

* * * * *